US012577996B2

(12) United States Patent (10) Patent No.: US 12,577,996 B2
Bowden et al. (45) Date of Patent: Mar. 17, 2026

(54) BRAKE SYSTEMS HAVING BACK PLATES WITH THERMAL MANAGEMENT FEATURES

(71) Applicant: Transportation IP Holdings, LLC, Norwalk, CT (US)

(72) Inventors: A. Gary Bowden, Laurinburg, NC (US); James Wesley Sugg, Pinehurst, NC (US); Matthew P. Jarusinski, Jackson Springs, NC (US)

(73) Assignee: Transportation IP Holdings, LLC, Norwalk, CT (US)

( * ) Notice: Subject to any disclaimer, the term of this patent is extended or adjusted under 35 U.S.C. 154(b) by 161 days.

(21) Appl. No.: 18/316,356

(22) Filed: May 12, 2023

(65) Prior Publication Data

US 2023/0279915 A1 Sep. 7, 2023

Related U.S. Application Data

(63) Continuation-in-part of application No. 17/512,986, filed on Oct. 28, 2021, now Pat. No. 11,686,358.
(Continued)

(51) Int. Cl.
*F16D 65/807* (2006.01)
*F16D 65/00* (2006.01)
(Continued)

(52) U.S. Cl.
CPC ....... *F16D 65/807* (2013.01); *F16D 65/0037* (2013.01); *F16D 65/062* (2013.01); *F16D 2065/789* (2013.01)

(58) Field of Classification Search
CPC .. F16D 65/807; F16D 65/062; F16D 65/0037; F16D 2065/789
See application file for complete search history.

(56) References Cited

U.S. PATENT DOCUMENTS

| | | | | | |
|---|---|---|---|---|---|
| 3,776,333 | A | * | 12/1973 | Mathauser | ............... B62L 3/023 |
| | | | | | 188/344 |
| 4,036,333 | A | * | 7/1977 | Mathauser | ................ B62L 1/16 |
| | | | | | 188/24.11 |

(Continued)

FOREIGN PATENT DOCUMENTS

| | | | | |
|---|---|---|---|---|
| CN | 109236898 | A | * | 1/2019 |
| CN | 212028395 | U | * | 11/2020 |

(Continued)

OTHER PUBLICATIONS

Fras-le Launches New Railway Shoe, available in TheBrakeReport. com, announced Year 2019 [online], [site visited Sep. 19, 2023], 1 nternet URL: https ://thebrakereport.com/fras-le-launches-new-railway-shoe/.
(Continued)

*Primary Examiner* — Vishal R Sahni
(74) *Attorney, Agent, or Firm* — K&L Gates LLP

(57) ABSTRACT

A vehicle brake system is provided that includes (or is formed from) a back plate configured to support a composite pad, at least one conditioning insert coupled to the back plate and configured to contact a surface of a wheel during a braking event and thereby to condition at least a portion of the surface of the wheel, and fins coupled with the at least one conditioning insert and configured to conduct heat generated by contact of the at least one conditioning insert with the at least the portion of the surface of the wheel away from the at least one conditioning insert.

22 Claims, 56 Drawing Sheets

Related U.S. Application Data

(60) Provisional application No. 63/163,482, filed on Mar. 19, 2021.

(51) Int. Cl.
   *F16D 65/06*     (2006.01)
   *F16D 65/78*     (2006.01)

(56)        References Cited

U.S. PATENT DOCUMENTS

| | | | | |
|---|---|---|---|---|
| 4,441,592 A * | 4/1984 | Everett | | B62L 1/005 |
| | | | | 411/DIG. 2 |
| 6,206,151 B1 * | 3/2001 | Nakamura | | B62L 3/023 |
| | | | | 188/73.1 |
| 2014/0151168 A1 * | 6/2014 | Wen | | F16D 65/847 |
| | | | | 188/251 R |
| 2015/0090543 A1 * | 4/2015 | Moore | | F16D 69/00 |
| | | | | 188/250 G |
| 2022/0049749 A1 * | 2/2022 | Bowden | | F16D 69/026 |
| 2022/0299076 A1 * | 9/2022 | Bowden | | F16D 65/0037 |

FOREIGN PATENT DOCUMENTS

| | | | | | |
|---|---|---|---|---|---|
| DE | 102007020884 A1 | * | 11/2008 | .......... | F16D 65/092 |
| DE | 202007013143 U1 | * | 2/2009 | .............. | B61H 1/00 |
| DE | 202013104619 U1 | * | 12/2013 | .......... | F16D 65/092 |
| DE | 102016212878 A1 | * | 1/2018 | | |
| JP | 56031534 A | * | 3/1981 | | |
| JP | S5631534 A | | 3/1981 | | |
| JP | 2873569 B2 | * | 3/1999 | | |
| JP | 2014098407 A | * | 5/2014 | | |
| WO | WO-2020252109 A1 | * | 12/2020 | ......... | F16D 65/0037 |

OTHER PUBLICATIONS

European Search Report dated Feb. 9, 2022 for corresponding European Application No. 21192768.6.

* cited by examiner

BRAKE SYSTEMS HAVING BACK PLATES WITH THERMAL MANAGEMENT FEATURES

CROSS-REFERENCE TO RELATED APPLICATIONS

This application is a continuation-in-part of U.S. patent application Ser. No. 17/512,986 (filed 28 Oct. 2021), which claims priority to U.S. Provisional Application No. 63/163, 482 (filed 19 Mar. 2021), the entire disclosures of which are incorporated herein by reference.

BACKGROUND

Technical Field

The subject matter described herein relates to brake systems that brake wheels of a vehicle while also directing heat out of brake pads of the brake systems, or other devices that contact a rotating part other than a wheel.

Discussion of Art

Some brake systems can condition surfaces of wheels while also slowing or stopping rotation of the wheels. These brake systems include brake pads that move toward surfaces of the wheels to generate friction and slow or stop rotation of the wheels. Rigid bodies in the brake pads can concurrently condition the wheel surfaces by removing protrusions, debris, etc. from surfaces of the wheels.

The rubbing contact between the brake pads and the wheel surfaces can generate significant thermal energy (e.g., heat). Some currently known brake systems do not have features for managing the thermal energy. For example, some known brake systems do not have components for directing the heat away and/or out of the brake pads. Significant heat without directing the heat out of the brake pads can damage and/or shorten the useful life of the brake pads.

BRIEF DESCRIPTION

In one example, a vehicle brake system is provided that includes (or is formed from) a back plate configured to support a composite pad, at least one conditioning insert coupled to the back plate and that may contact a surface of a wheel during a braking event and thereby to condition at least a portion of the surface of the wheel, and fins coupled with the at least one conditioning insert and that may conduct heat generated by contact of the at least one conditioning insert with the at least the portion of the surface of the wheel away from the at least one conditioning insert.

In one example, a vehicle brake system is provided. The system can include a back plate to support a composite pad, at least one conditioning insert coupled to the back plate and that may contact a surface of a wheel during a braking event and thereby to condition at least a portion of the surface of the wheel, and thermal transfer bodies coupled with the at least one conditioning insert and that may conduct heat generated by contact of the at least one conditioning insert with the at least the portion of the surface of the wheel away from the at least one conditioning insert.

In one example, a method is provided that includes forming or obtaining a back plate configured to support a composite pad, forming or obtaining at least one conditioning insert coupled to the back plate in a position to contact a surface of a wheel during a braking event and thereby to condition at least a portion of the surface of the wheel, and forming or obtaining thermal transfer bodies with the at least one conditioning insert in positions to conduct heat generated by contact of the at least one conditioning insert with the at least the portion of the surface of the wheel away from the at least one conditioning insert.

In one example, a method of operating a vehicle includes (with a brake control system of the vehicle) actuating a braking device to cause a composite pad portion of the braking device to contact a wheel surface. The braking device includes a back plate, the composite pad portion attached to the back plate, at least one conditioning insert coupled to the back plate, and thermal transfer bodies coupled with the at least one conditioning insert. The method also includes (with the at least one conditioning insert and while the braking device is actuated) contacting the wheel surface to condition at least a portion of the wheel surface. The method also includes (with the thermal transfer bodies and while the braking device is actuated) conducting heat generated by contact of the at least one conditioning insert with the at least the portion of wheel surface away from the at least one conditioning insert.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
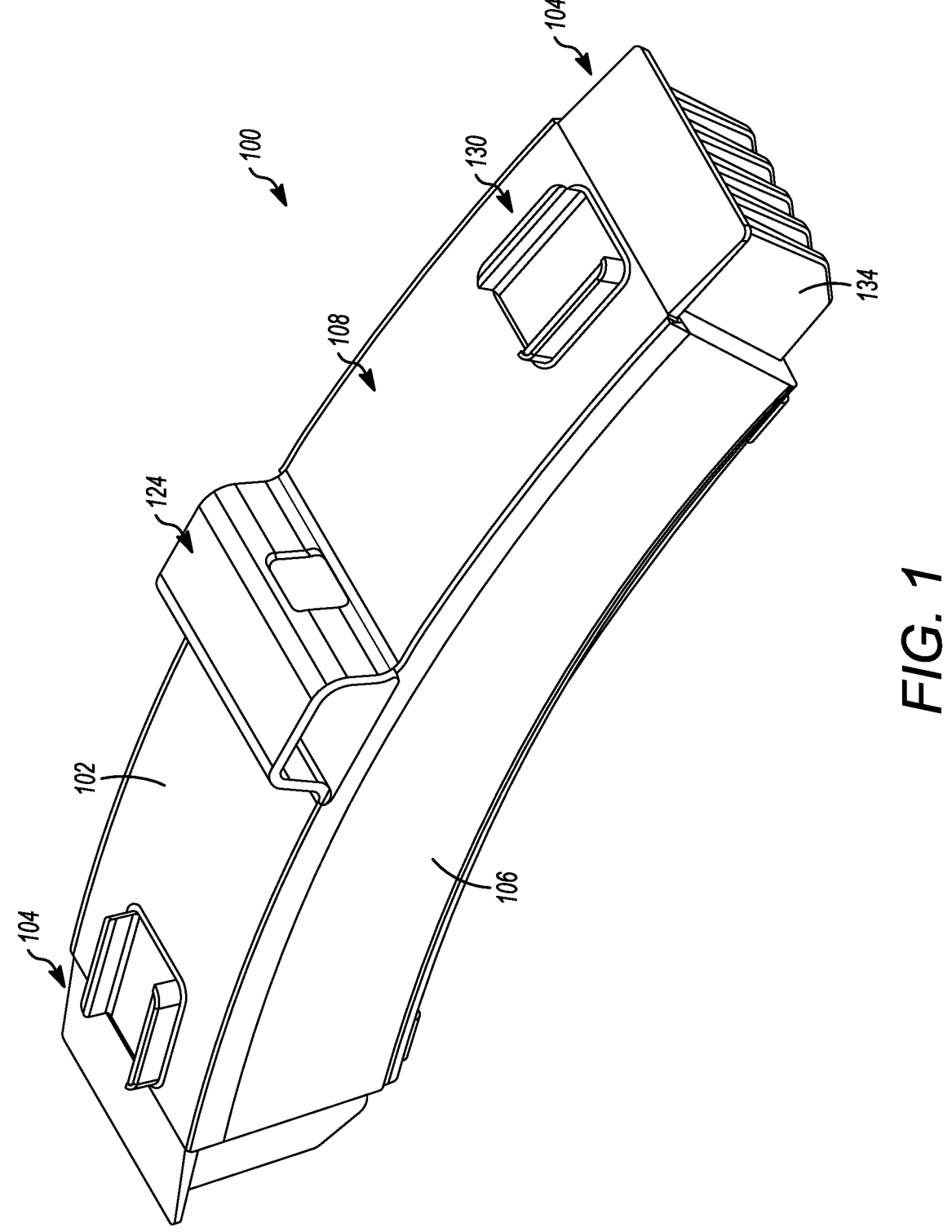
FIG. 1 illustrates a perspective view of an example of a brake system.

Embodiments of the subject matter described herein relate to systems having back plates with thermal management features. These thermal management features optionally can be referred to as thermal transfer bodies as these features or bodies can direct heat generated by rubbing contact between brake pads of the brake systems and surfaces of wheels that are engaged by the brake pads to slow or stop rotation of the wheels. The thermal management features can direct the heat out of the brake pads and/or dissipate the heat more rapidly (e.g., at a greater rate) compared to other known brake pads that do not include the thermal management features. Optionally, the thermal management features can be used to control the temperature of the back plates, brake pads, or the like, such as by heating or cooling these components by directing heat into or drawing heat out of the components via the thermal management features from outside.

The brake pads also can be formed around conditioning inserts that are coupled with the back plates. During braking, the brake systems move toward the surface of a wheel (e.g., the outer circumferential surface) to cause the brake pads to engage the wheel surface and slow or stop rotational movement of the wheel. The inserts projecting from the back plates can be rigid bodies that contact the surface of the wheel to condition the wheel, such as by removing debris or otherwise contact cleaning the wheel surface. The back plates optionally can be referred to as backing plates.

The thermal management features described herein can be coupled with the back plates and/or conditioning inserts. For example, the thermal management features can be formed as part of the inserts and/or back plates, can be mechanically coupled to the back plates and/or inserts (e.g., through a press-fit, friction fit, or the like), or may be welded (or otherwise adhered) to the inserts and/or back plates. The thermal management features inserts can be integrally formed with the back plates and/or inserts such that there are no seams, couplings, or the like between the thermal management features and the inserts or back plates. The thermal management features, inserts, and/or back plates can be formed from a metal such as iron, an iron alloy, cast iron, ductile cast iron, malleable cast iron, gray cast iron, white cast iron, sintered metal, a sintered metal alloy, one or more steels (e.g., carbon steel, cast steel, etc.), another metal or metal alloy, a composite material, or the like. The thermal management features, inserts, and/or back plates can be cast, extruded, additively manufactured, or the like. These and other features, aspects, and variations on embodiments of the inventive brake systems are shown and described herein. In one embodiment, the thermal management features can be formed from a different material than the inserts and/or back plates. Alternatively, the thermal management features may be formed from the same material as the inserts and/or as the back plates.

Not all embodiments of the subject matter described herein are limited to brakes and wheels. For example, one or more embodiments of the back plates, conditioning inserts, and/or thermal management features may be used to direct heat away from the systems while in contact with a rotating part other than a wheel.

Figure 2:
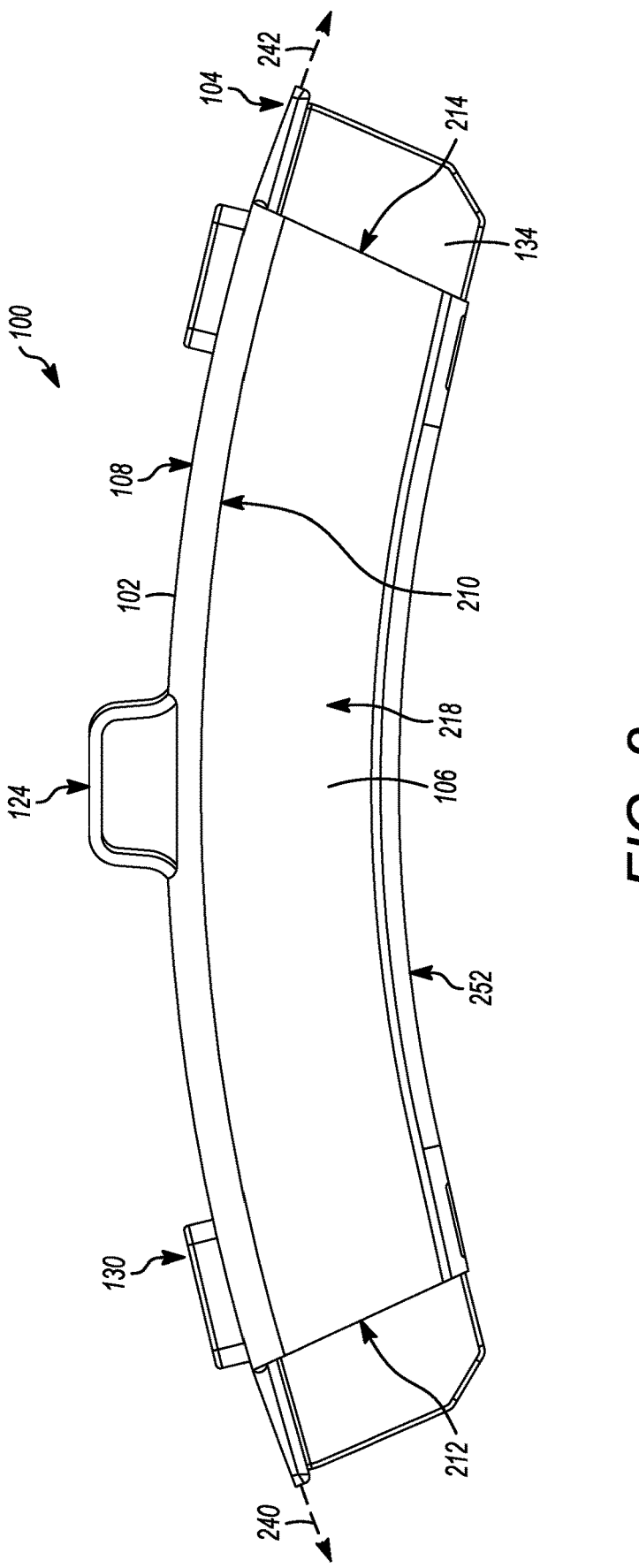
FIG. 2 illustrates an elevational view of an outer side of the brake system shown in FIG. 1.
Figure 3:
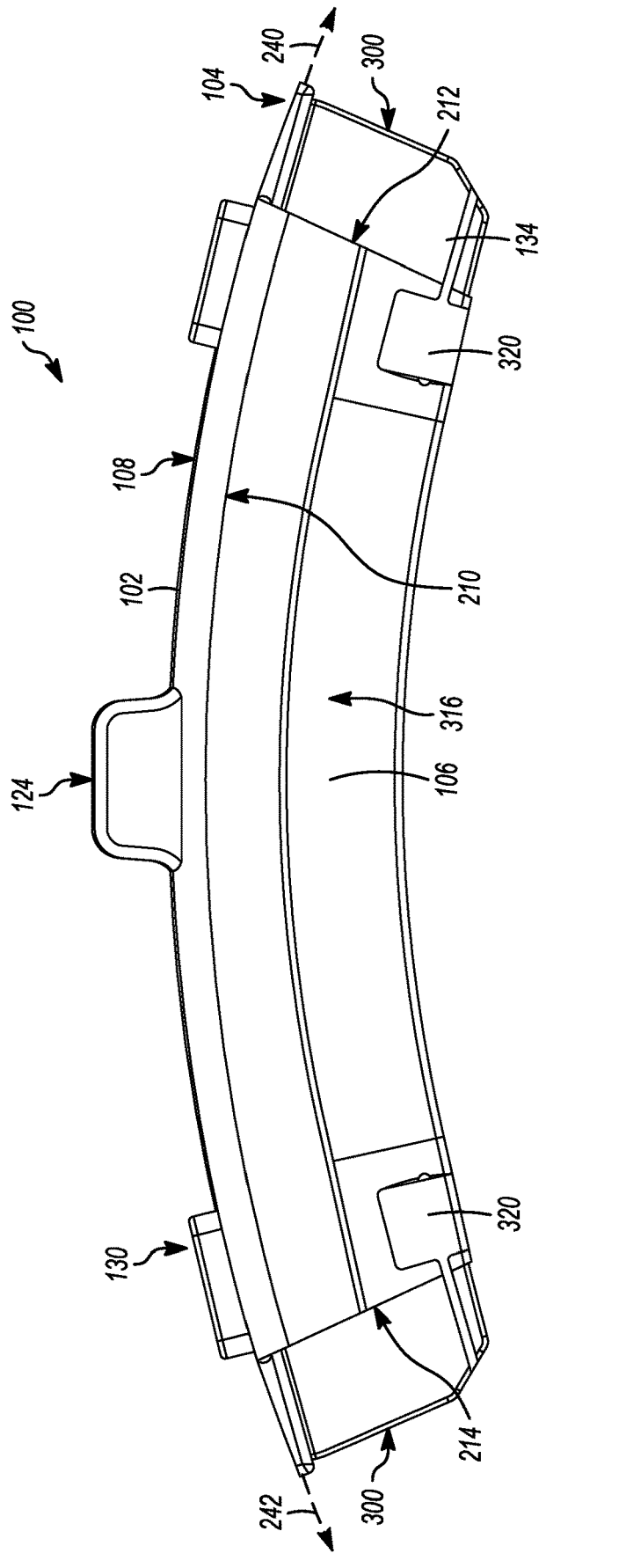
FIG. 3 illustrates an elevational view of an inner side of the brake system shown in FIG. 1.
Figure 4:
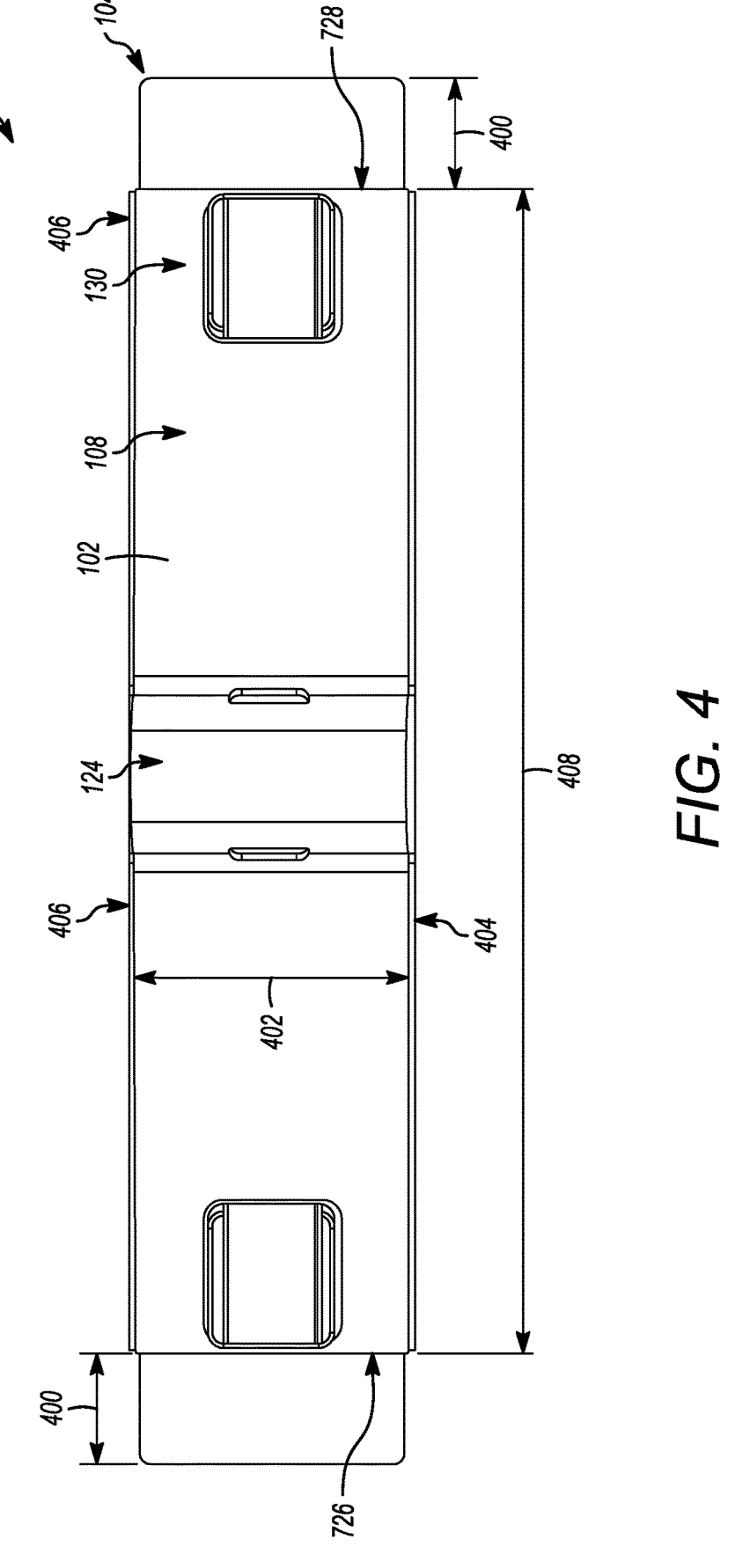
FIG. 4 illustrates a plan view of a top side of the brake system shown in FIG. 1.
Figure 5:
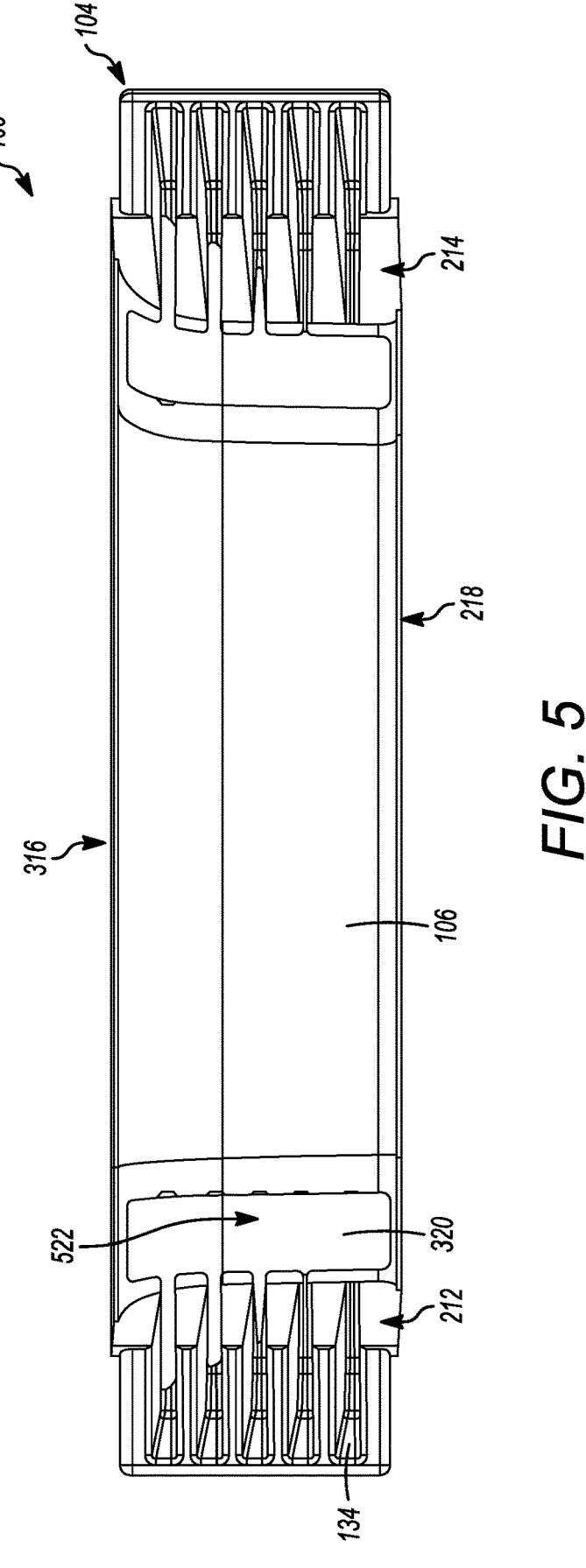
FIG. 5 illustrates a plan view of a bottom side of the brake system shown in FIG. 1.
Figure 6:
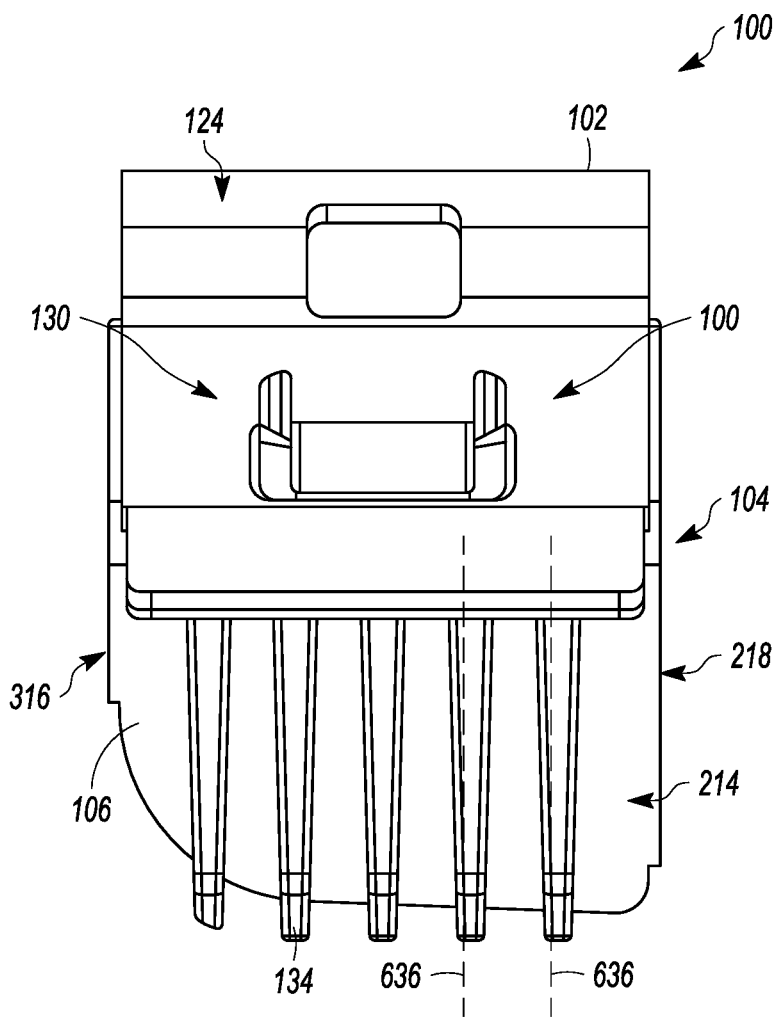
FIG. 6 illustrates an elevational view of an end of the brake system shown in FIG. 1.
Figure 7:
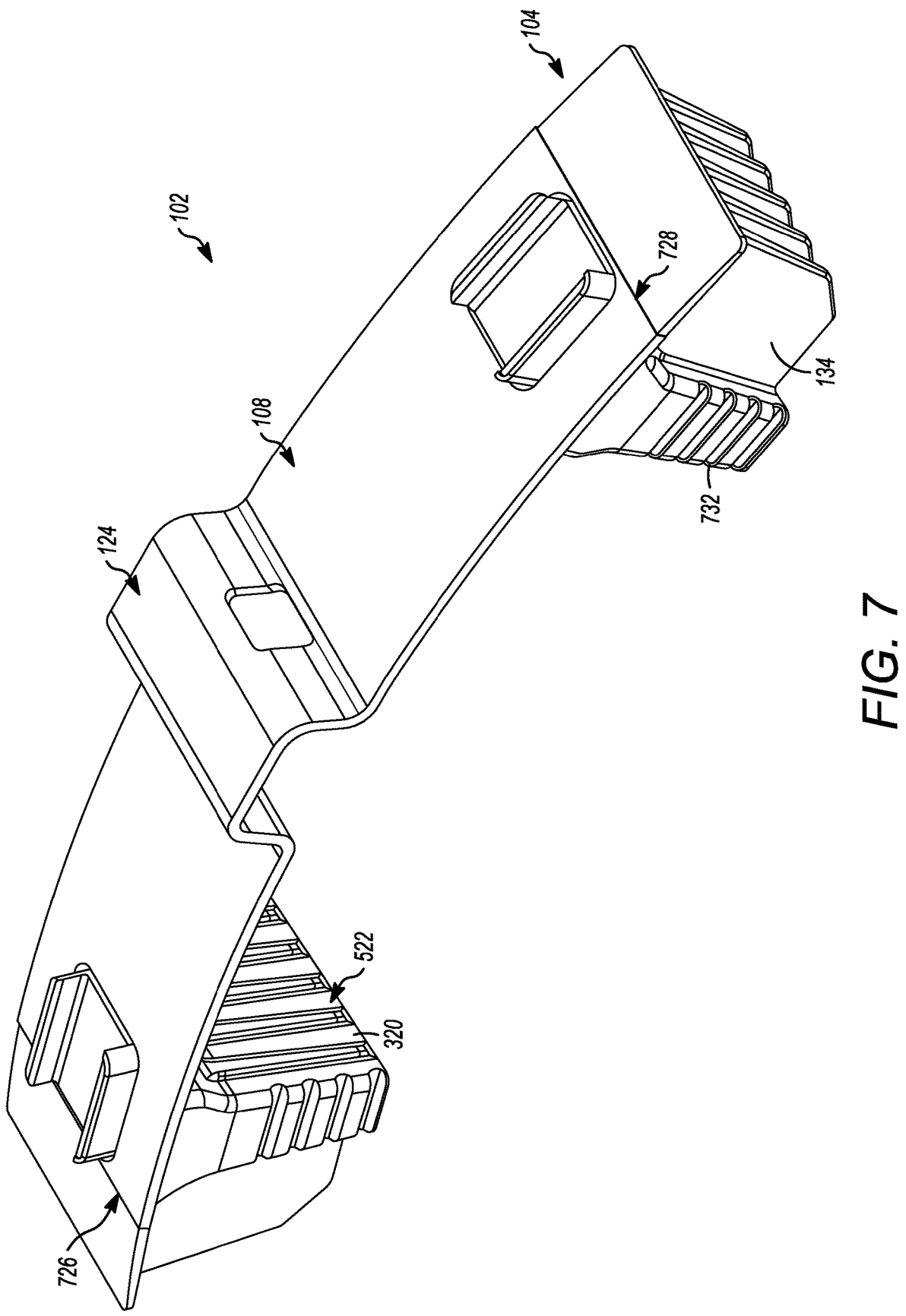
FIG. 7 illustrates a perspective view of the back plate shown in FIG. 1.
Figure 8:
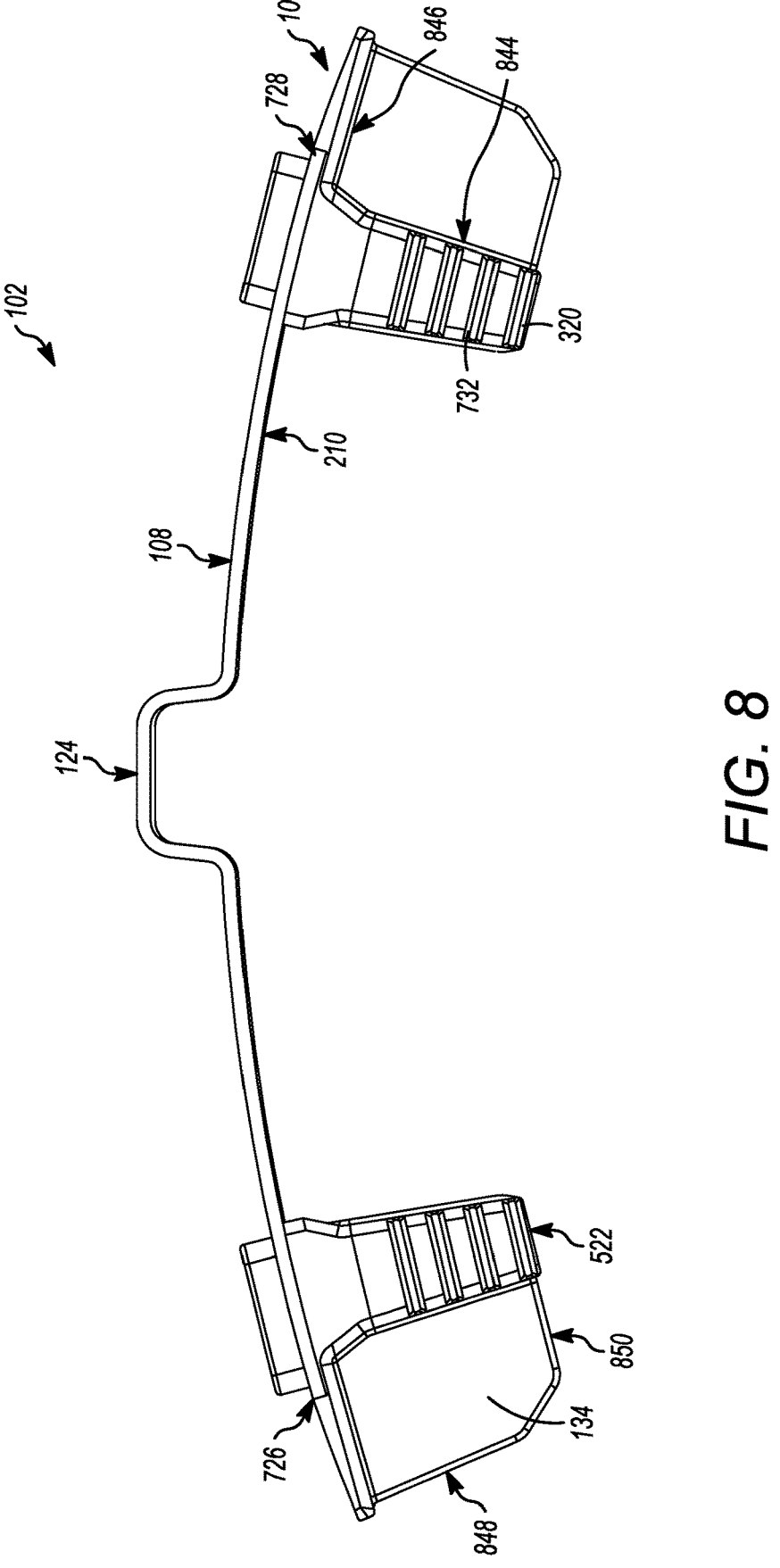
FIG. 8 illustrates an elevational view of an outer side of the back plate shown in FIG. 1.
Figure 9:
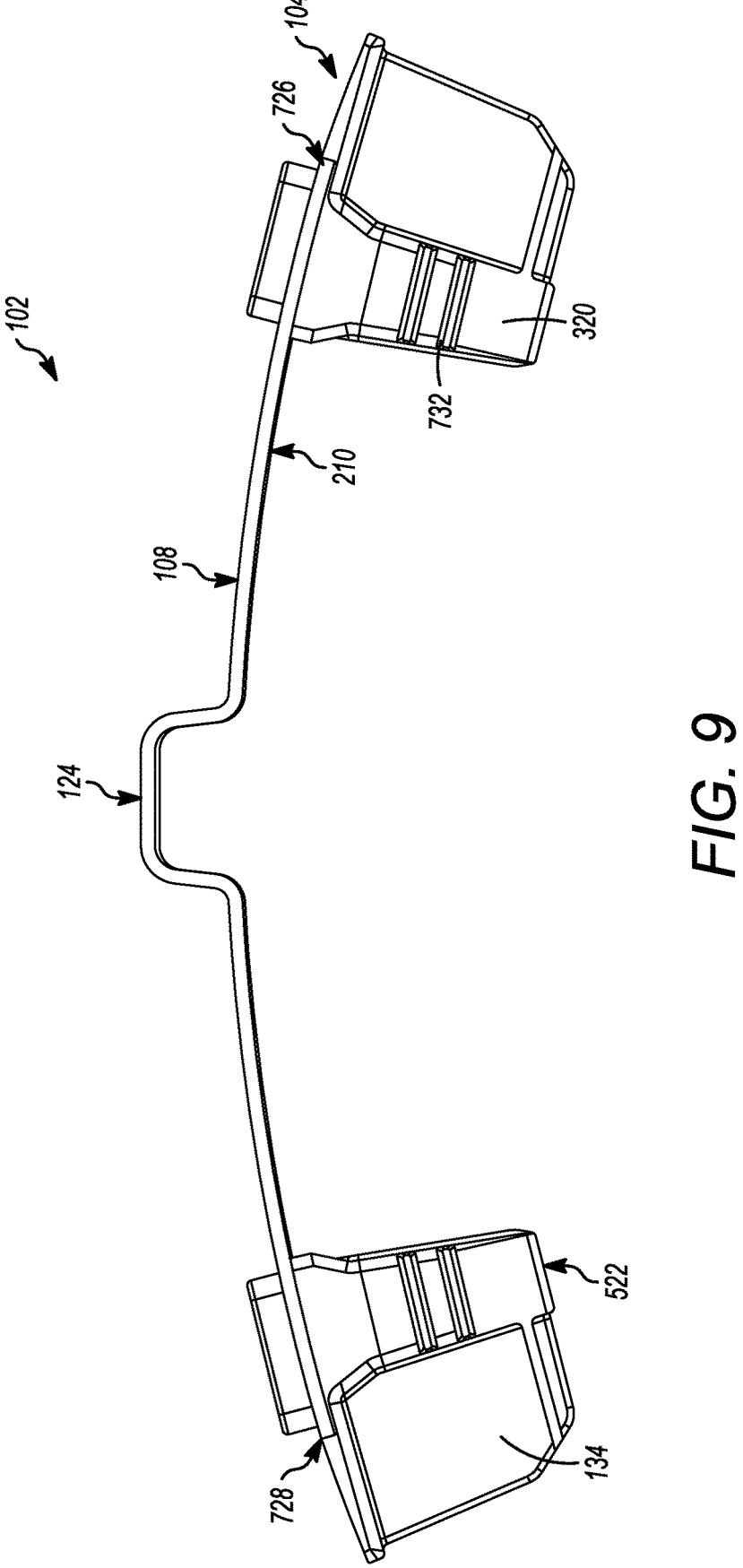
FIG. 9 illustrates an elevational view of an inner side of the back plate shown in FIG. 1.
Figure 10:
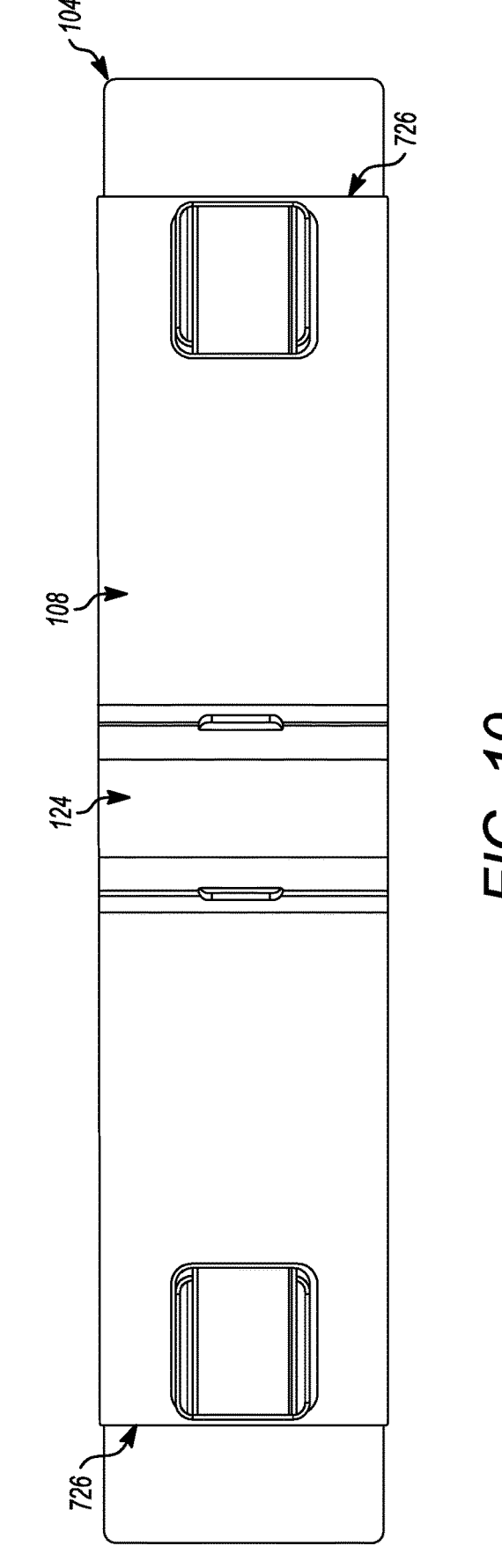
FIG. 10 illustrates a plan view of a top side of the back plate shown in FIG. 1.
Figure 11:
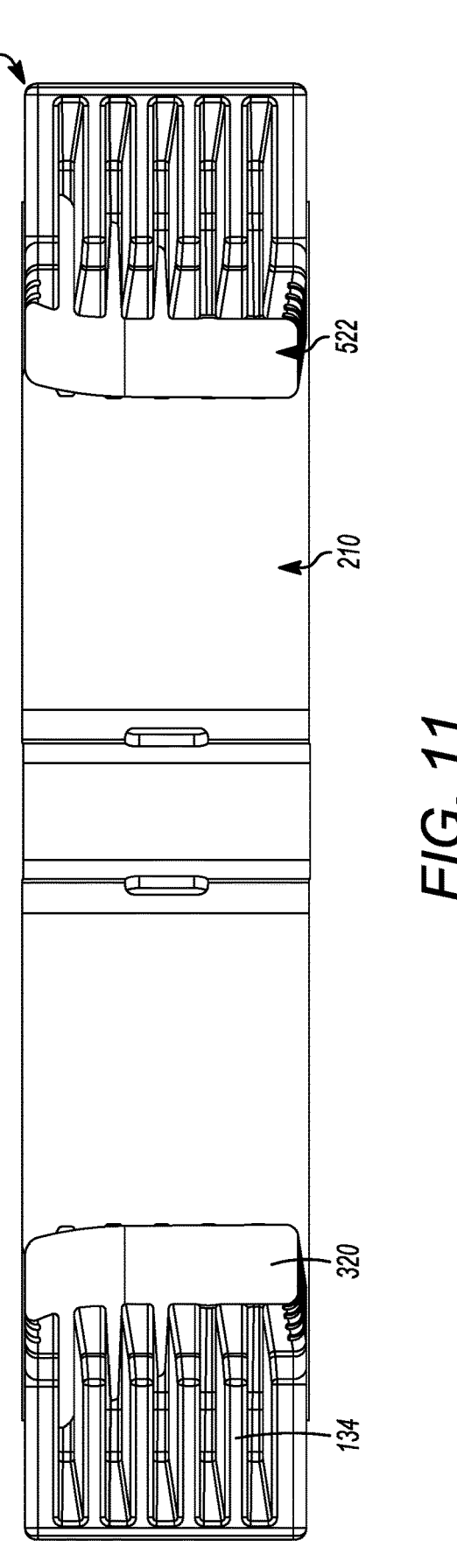
FIG. 11 illustrates a plan view of a bottom side of the back plate shown in FIG. 1.
Figure 12:
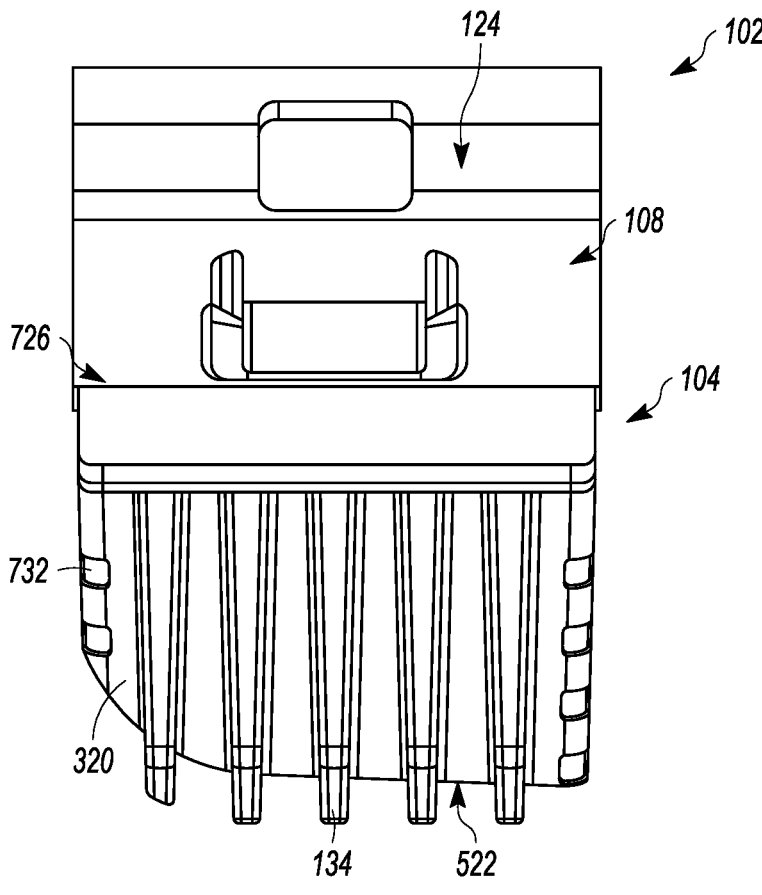
FIG. 12 illustrates an elevational view of an end of the back plate shown in FIG. 1.

FIGS. 1 through 6 illustrate an example of a brake system 100 having a back plate 102 with thermal management features 104 and a composite brake pad 106. FIGS. 7 through 12 illustrate an example of the back plate of the brake system shown in FIGS. 1 through 6. FIG. 1 illustrates a perspective view of the brake system, FIG. 2 illustrates an elevational view of an outer side of the brake system, FIG. 3 illustrates an elevational view of an inner side of the brake system, FIG. 4 illustrates a plan view of a top side of the brake system, FIG. 5 illustrates a plan view of a bottom side of the brake system, FIG. 6 illustrates an elevational view of an end of the brake system, FIG. 7 illustrates a perspective view of the back plate, FIG. 8 illustrates an elevational view of an outer side of the back plate, FIG. 9 illustrates an elevational view of an inner side of the back plate, FIG. 10 illustrates a plan view of a top side of the back plate, FIG. 11 illustrates a plan view of a bottom side of the back plate, and FIG. 12 illustrates an elevational view of an end of the back plate.

The brake system 100 includes the back plate 102 that may support the composite brake pad 106. A head surface 108 of the back plate engages a brake head, which is moved toward a surface of a wheel to move the brake system into contact with the wheel surface to slow or stop rotation of the wheel (and moved away from the wheel surface to move the brake pad and inserts away from and out of contact with the wheel surface). This wheel surface can extend along a circular path along the outer circumference of the wheel. For example, in rail vehicles, the wheel surface may be the outer circumference of the wheel that also contacts the rail during rotation of the wheel. A pad surface 210 (shown in FIG. 2) of the back plate is opposite the head surface such that the pad surface and the head surface. The pad surface faces the wheel surface when the brake system is disposed on a vehicle. The pad surface also is coupled with the brake pad.

The brake pad may be formed from a composite material on the pad surface of the back plate (e.g., in a mold). Alternatively, the brake pad may be formed from another material and/or may be adhered to the pad surface or otherwise mechanically coupled with the pad surface (e.g., through a press fit, friction fit, or other connection). The brake pad extends from one end surface 212 to an opposite end surface 214 (shown in FIG. 2), and from an inner surface 316 (shown in FIG. 3) to an opposite outer surface 218 (shown in FIG. 2). The inner and outer surfaces may extend from one end surface to the other end surface. The inner surface can face the vehicle and/or the flange of the wheel, and the outer surface can face away from the vehicle and/or flange of the wheel.

The back plate includes one or more conditioning inserts 320 (shown in FIG. 3) coupled to the back plate and at least partially enclosed within the brake pad. While two inserts are shown in the illustrated embodiment, optionally, the brake system may include a single insert or three or more inserts. The conditioning inserts project from the pad surface toward the wheel surface and have lower contact surfaces 522 (shown in FIG. 5) that are positioned to engage the wheel surface. The contact surfaces may be rounded or round surfaces. Alternatively, the contact surfaces may not be rounded (e.g., may be formed from one or more planes) or may be a combination of planar surfaces and rounded surfaces. These contact surfaces can engage the wheel surface while the brake pad engages the wheel surface.

The back plate (including the inserts) can be formed from a more rigid material (e.g., iron, an iron alloy, cast iron, ductile cast iron, malleable cast iron, gray cast iron, white cast iron, sintered metal, a sintered metal alloy, one or more steels (e.g., carbon steel, cast steel, etc.), sintered metal, a sintered metal alloy, another metal or metal alloy, a composite material, or the like) than the pad so that contact between the pad and the wheel surface during a braking event generates friction to slow or stop wheel rotation while contact between the contact surfaces of the inserts and the wheel surface can scrape away or otherwise remove debris and clean the wheel surface during rotation of the wheel in the braking event. This contact between the contact surfaces and the wheel surface also can remove any protrusions, undulations, or the like, in the wheel surface (e.g., by grinding or otherwise removing small portions of the wheel surface). This cleaning, removal of debris or other objects, and/or smoothing out of the wheel surface can be referred to as conditioning the wheel surface. The inserts have tapered shapes such that the inserts have a smaller cross-sectional surface area at the outer ends than closer to the back plate. This can allow for the area of rubbing contact between the inserts and the wheel surface to increase over time and use as the inserts are worn down.

The conditioning inserts include engagement features 732 (shown in FIG. 7) that assist in coupling the inserts with the brake pad. In the illustrated example, the engagement features are troughs, grooves, valleys, or other recesses that extend inward and into the bodies of the inserts. The material forming the brake pad can flow into the engagement features during molding of the brake pad. This can increase the surface area of the inserts that engages the brake pad (relative to the inserts not having the engagement features), which can increase the bonding strength between the inserts and the brake pad.

The back plate has an arcuate shape with a U-shaped (e.g., the shape of the letter U) coupler 124 that is centrally located between opposite ends 726, 728 (shown in FIG. 7) of the back plate. The coupler alternatively can be referred to as a keybridge. While the couplers shown and/or described herein are shown as being centrally located, optionally, the coupler may be closer to one of the opposite ends of the back plates and/or a back plate may have two or more couplers. The coupler may be connected with the brake head so that movement of the brake head toward or away from the wheel surface moves the back plate and brake pad toward and away from the wheel surface. The back plate includes rejection lugs 130 that engage the brake head. These rejection lugs can be tabs that are bent away from the head surface of the back plate. For example, each rejection lug can be bent tabs that are disposed on opposite sides of an opening through the back plate. Optionally, the tabs are not part of the back plate, but are part of the thermal management features described herein. Alternatively, the back plate may not include the openings. The rejection lugs can be elongated in directions that extend from one end of the back plate to the opposite end of the back plate. Alternatively, the rejection lugs can have another shape and/or the openings through the back plate may not be present. The rejection lugs engage a brake head (in addition to or instead of the coupler engaging the brake head) to secure the back plate and the brake pad to the brake head. The rejection lugs can assist with heat transfer out of the brake system. For example, the tabs can transfer heat from the back plate out of the brake system and/or the openings between the tabs can provide a channel through which heat is dissipated.

The thermal management features 104 are formed from one or more thermally conductive materials, such as metal or a metal alloy (e.g., iron, an alloy containing iron, another metal, or another metal alloy). The thermal management features conduct the thermal energy in the conditioning inserts and/or in the brake pad to locations outside of the brake pad. For example, the thermal management features can conduct heat away from the conditioning inserts and out of the brake pads and dissipate the heat to the ambient environment outside of the brake system.

In the illustrated example, the thermal management features include heat fins 134 that are coupled with the conditioning inserts. The heat fins can be planar bodies oriented parallel to each other or substantially parallel to each other. For example, in different embodiments, center planes 636 (shown in FIG. 6) of the heat fins may be parallel to each other or may be oriented at angles that differ by no more than one degree, two degrees, three degrees, or five degrees. The heat fins provide increased surface area (e.g., relative to the exposed portions of the conditioning inserts that are not enclosed by the brake pad) for the dissipation of heat outside of the brake pad. There are five heat fins in the illustrated example, but alternatively there may be fewer heat fins (as few as one heat fin) or more than five heat fins. As shown in FIG. 5, part of the brake pad may be disposed between the heat fins in locations that are outside of the conditioning inserts. Alternatively, no part of the brake pad may be disposed between the heat fins.

The thermal management features also include head plates 138. The head plates can extend from the ends of the back plate in opposite directions. For example, the back plate and head plates may be elongated along circumferential directions 240, 242 (shown in FIG. 2). These circumferential directions extend along a circular path that does not intersect and is spaced apart from the outer circumference of the wheel that faces the bottom side of the brake pad. Alternatively, the brake system may not include the head plates.

The thermal management features protrude or otherwise extend beyond the components in which heat is generated during braking to carry the heat away from those components and to dissipate the heat out of the components. In the illustrated example, the head plates and heat fins laterally protrude beyond the opposite ends 212, 214 of the brake pad. The thermal management features may extend far beyond the brake pad to help dissipate heat. For example, as shown in FIG. 4, the head plates and/or heat fins may extend beyond or outside of the brake pad by an extension length 400 that is more than one third of a width 402 of the back plate. This width 402 also can be the width of the inserts 320. Alternatively, the head plates and/or heat fins may extend beyond or outside of the brake pad by the extension length that is more than one half of the width of the back plate. The extension length can be measured from the end 726 or 728 of the back plate to an outer end 408 of the heat plate and/or can be measured from the end 726 or 728 of the back plate to outer edges 300 (shown in FIG. 3) of the heat fins. The width can be measured along the upper or head surface 108 of the back plate from one lateral side or edge 404 of the back plate to an opposite lateral side or edge 406 of the back plate. Optionally, the extension length of the head plate and/or heat fins may be at least one eleventh, at least one tenth, at least one eighth, or at least one quarter of a length 408 of the back plate (that is measured from one end 726 or 728 to the other end 728 or 726 of the back plate along the arcuate path or shape of the back plate).

The head plates are joined with the heat fins in the illustrated example. Each of the heat fins can be coupled with the conditioning inserts along an inner edge 844 and can be coupled with the head plates along an upper edge 846 (shown in FIG. 8). The inner edge and the upper edge can intersect each other at an intersection between the heat plate and the conditioning insert. Each fin can extend from the insert to an outer edge 848 (shown in FIG. 8) along the circumferential directions (or directions that are parallel to the circumferential directions). Each fin also can extend from the head plate to a lower edge 850 (shown in FIG. 8) that faces the wheel surface. The outer edge and the lower edge may be outer edges of the heat fins such that each heat fin is bounded by the inner edge, the upper edge, the outer edge, and the lower edge. When installed on a vehicle, the heat fins are disposed between the head plates and the wheel surface along radial directions of the wheel (e.g., directions that radially extend outward from a center of the wheel). Accordingly, the upper edge can be referred to as a radially outer or outward edge and the lower edge can be referred to as a radially inward or inner edge as the upper edge is farther from the wheel along the radial directions of the wheel than the lower edge. The outer edge optionally can be referred to as a circumferentially outer or outward edge and the inner edge optionally can be referred to as a circumferentially inner or inward edge along the circumferential directions.

In operation, a working surface 252 (shown in FIG. 2) of the brake pad engages the outer circumference of a wheel surface during a braking event to slow or stop rotation of the wheel. The lower surfaces of the inserts also contact the wheel surface to condition the wheel surface. The rubbing contact between the working surface of the brake pad and the lower surfaces of the conditioning inserts generates heat. This heat is conducted through the inserts to exposed portions of the heat fins that are outside of the brake pad. The heat is then dissipated from surfaces of the heat fins outside of the brake pad. This can help cool or reduce the temperature rise of the brake pad and/or inserts, which can reduce wear and tear of the brake system.

Figure 13:
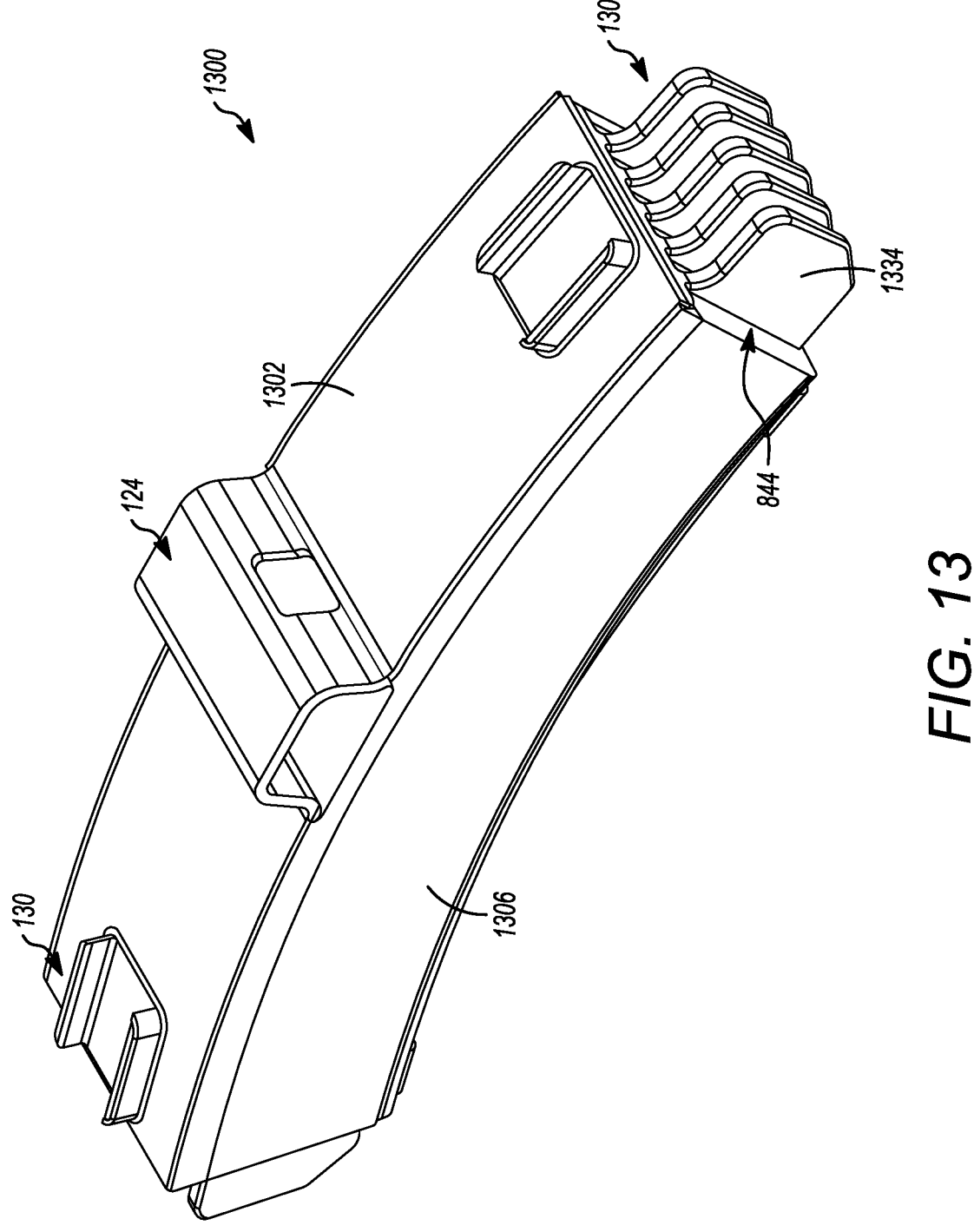
FIG. 13 illustrates a perspective view of another brake system.
Figure 14:
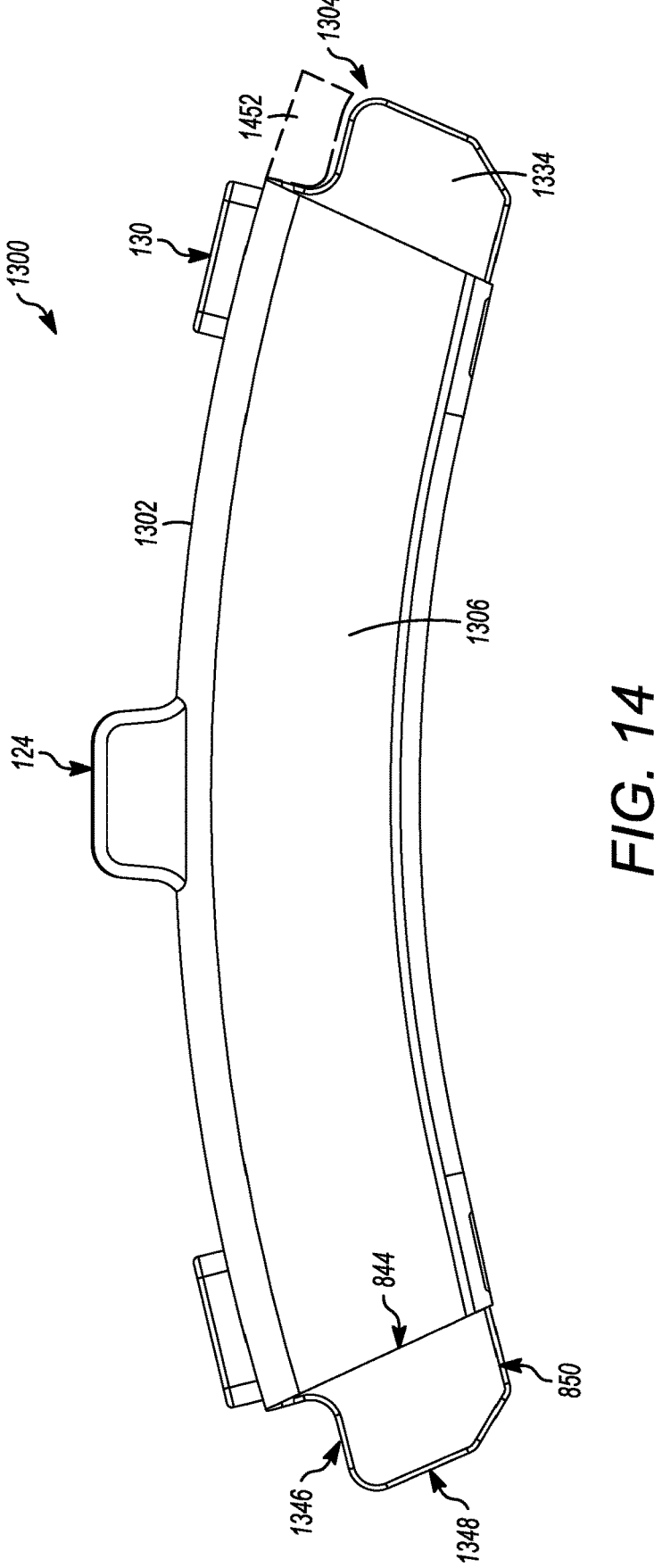
FIG. 14 illustrates an elevational view of an outer side of the brake system shown in FIG. 13.
Figure 15:
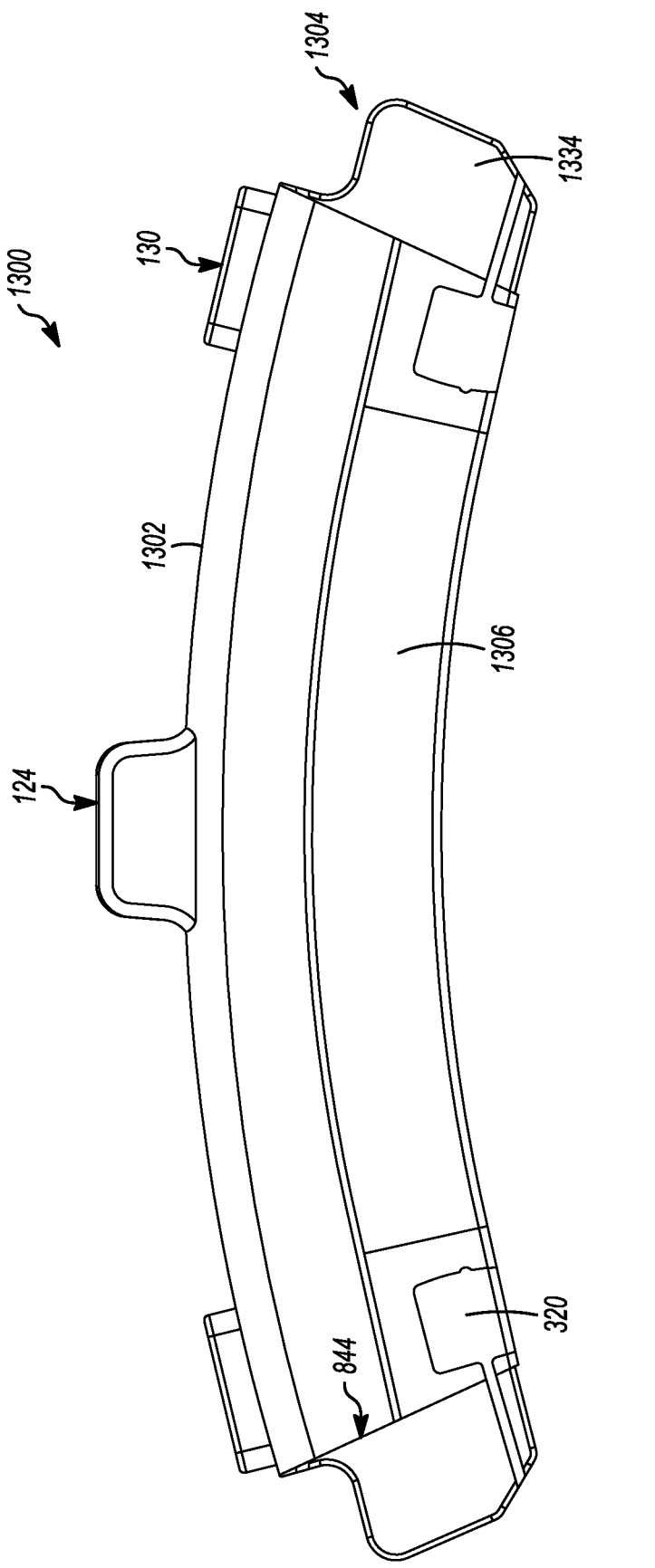
FIG. 15 illustrates an elevational view of an inner side of the brake system shown in FIG. 13.
Figure 16:
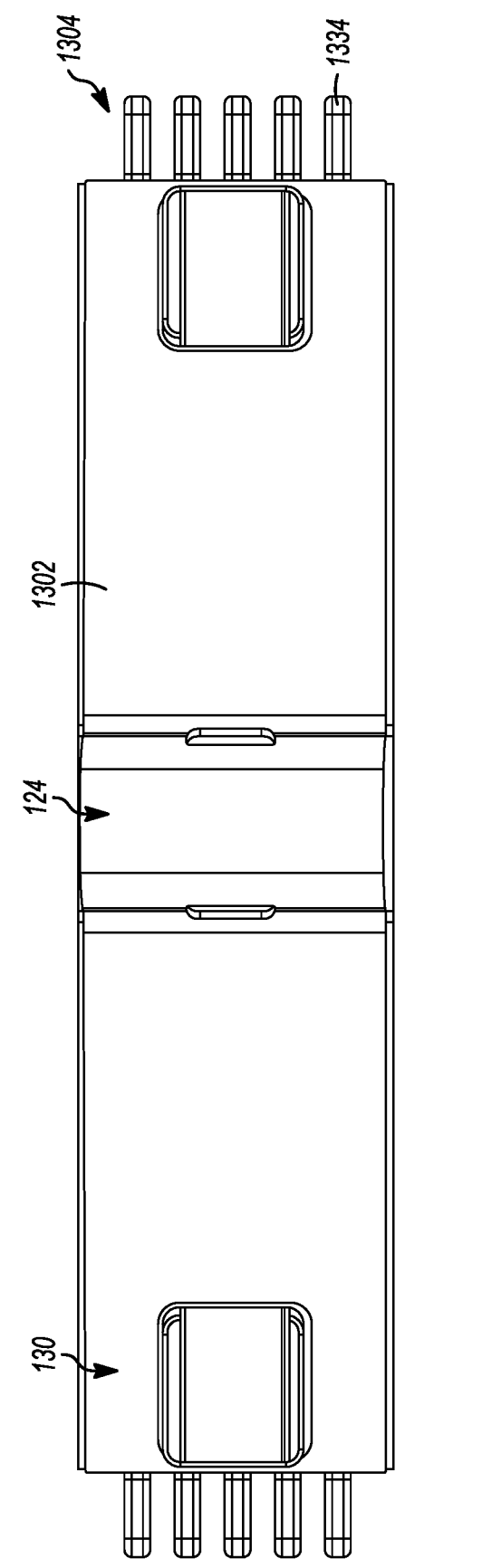
FIG. 16 illustrates a plan view of a top side of the brake system shown in FIG. 13.
Figure 17:
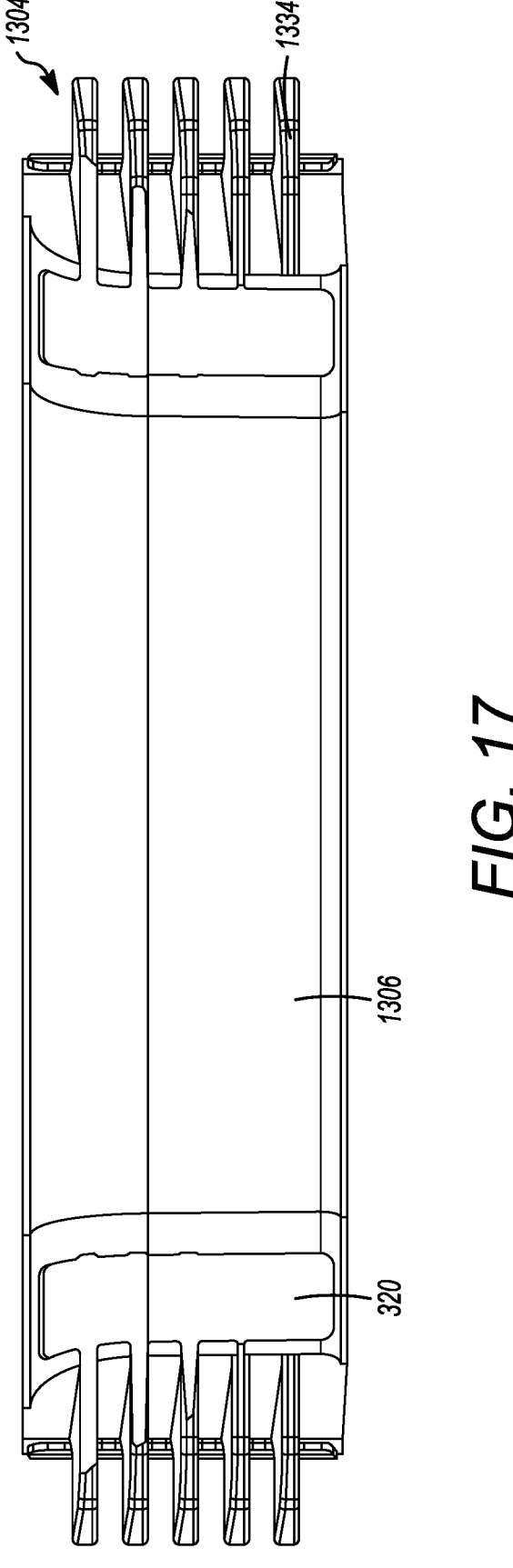
FIG. 17 illustrates a plan view of a bottom side of the brake system shown in FIG. 13.
Figure 18:
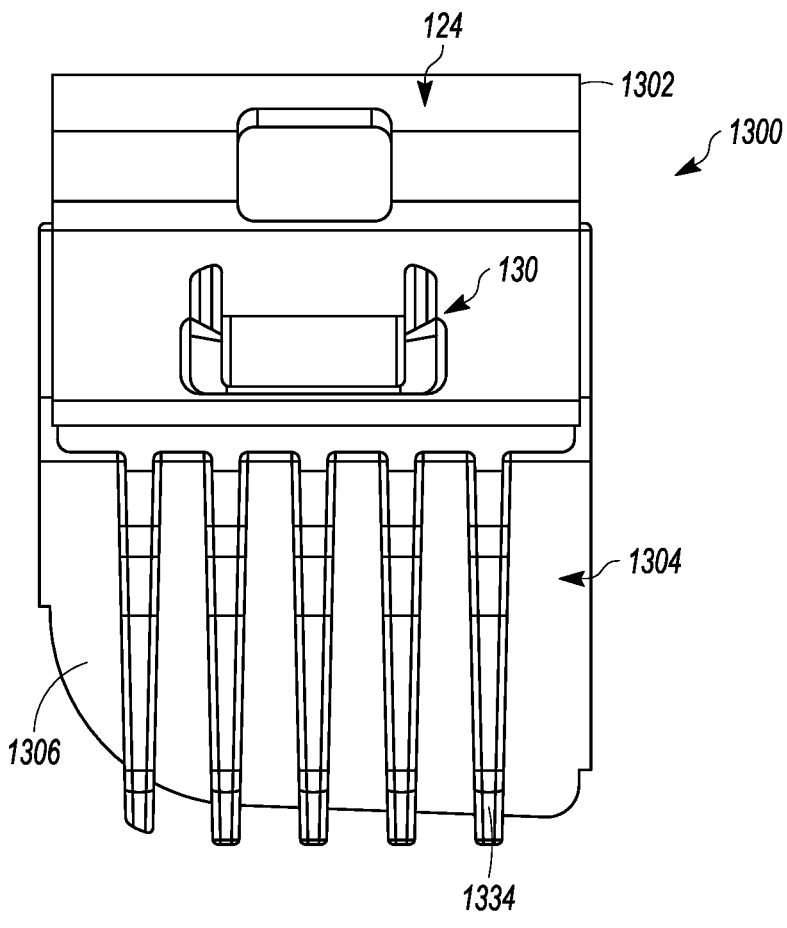
FIG. 18 illustrates an elevational view of an end of the brake system shown in FIG. 13.
Figure 19:
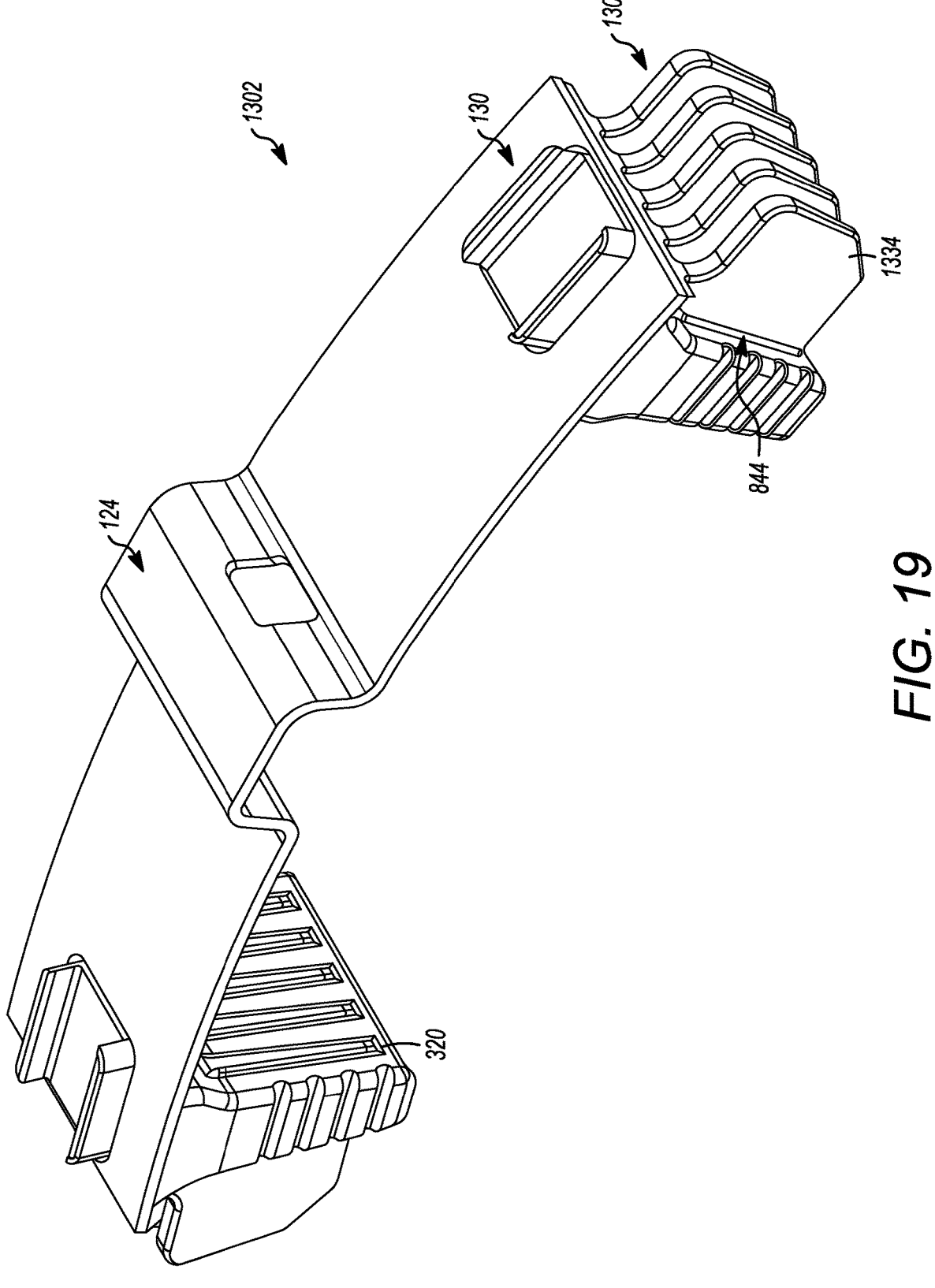
FIG. 19 illustrates a perspective view of a back plate of the brake system shown in FIG. 13.
Figure 20:
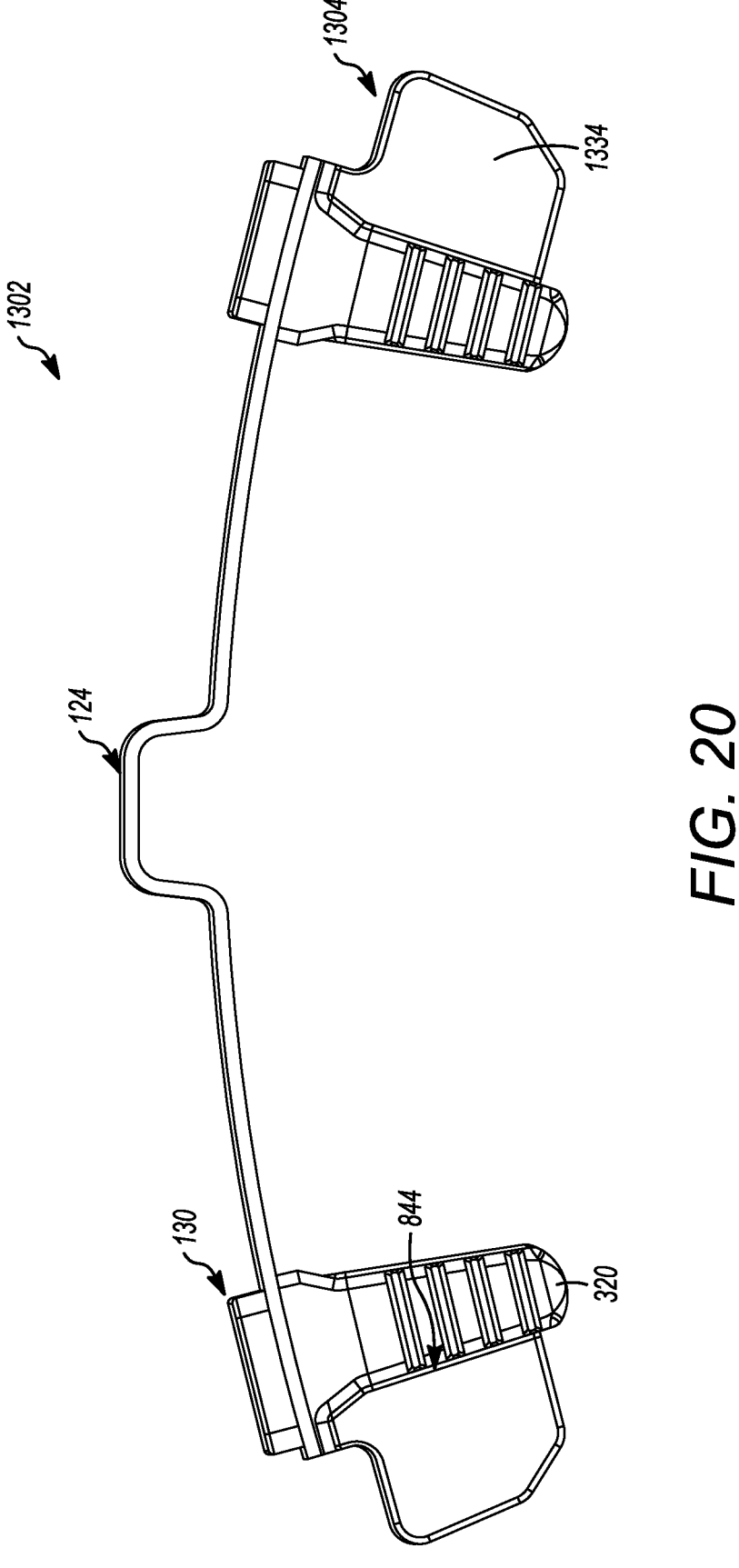
FIG. 20 illustrates an elevational view of an inner or outer side of the back plate shown in FIG. 19.
Figure 21:
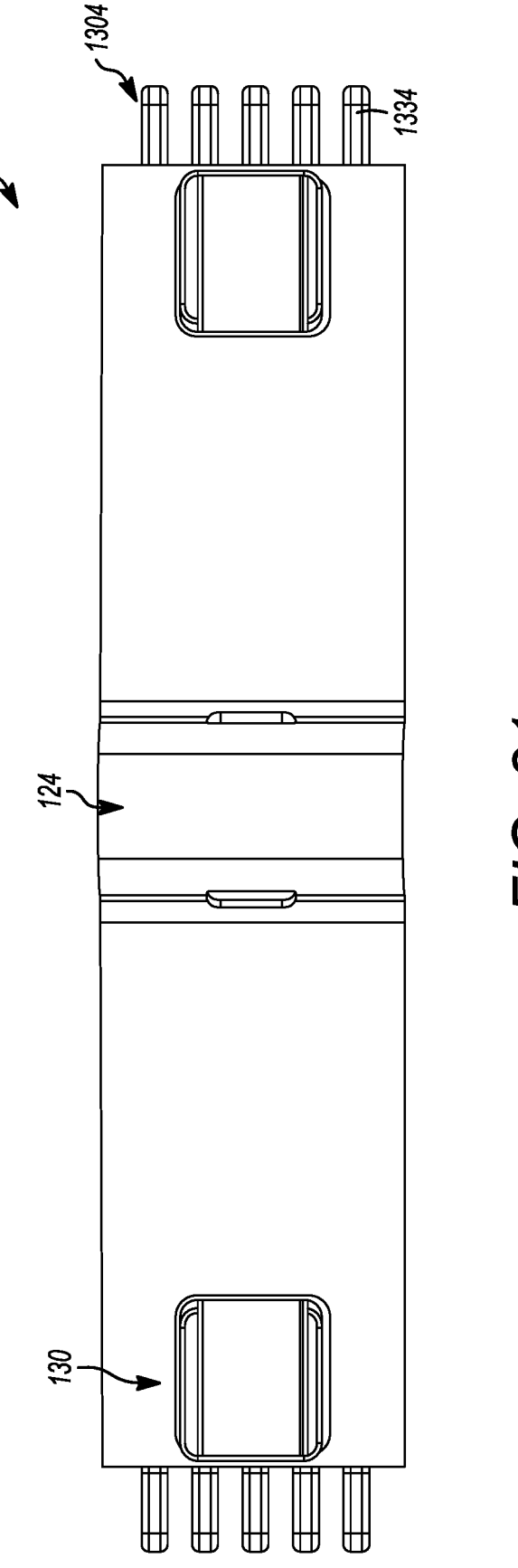
FIG. 21 illustrates a plan view of a top side of the back plate shown in FIG. 19.
Figure 22:
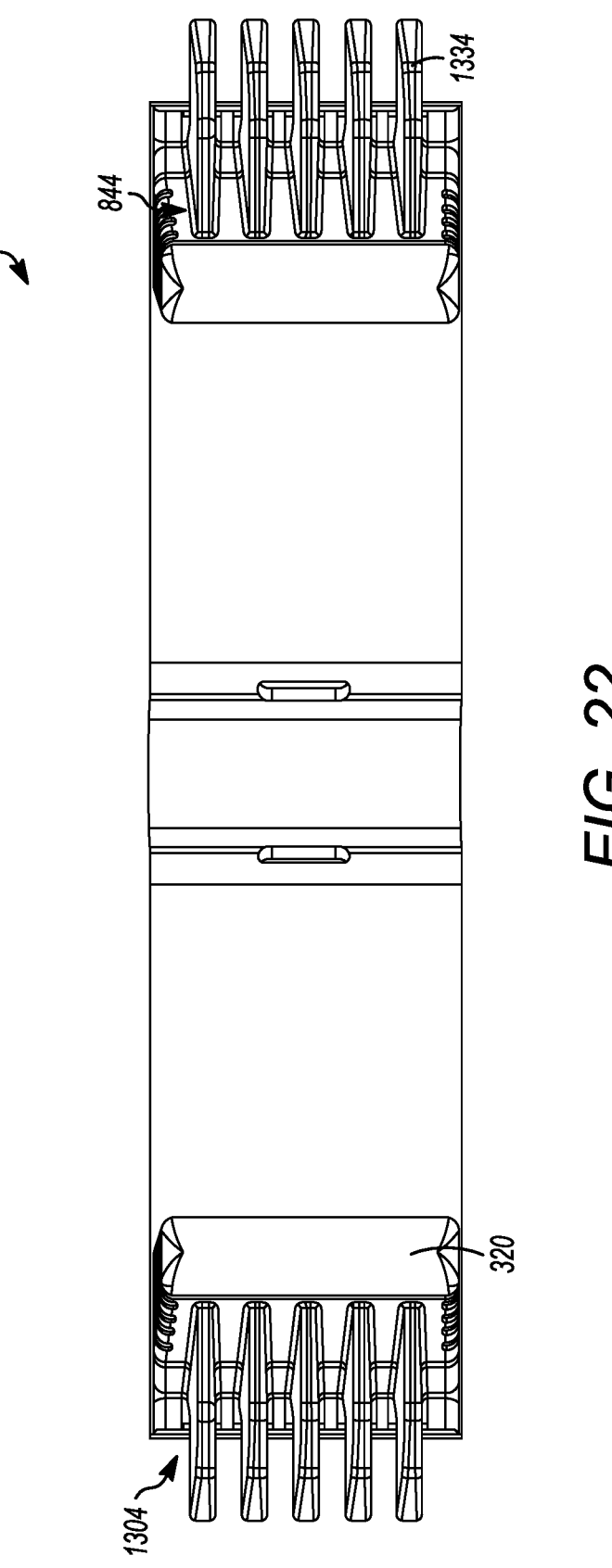
FIG. 22 illustrates a plan view of a bottom side of the back plate shown in FIG. 19.
Figure 23:
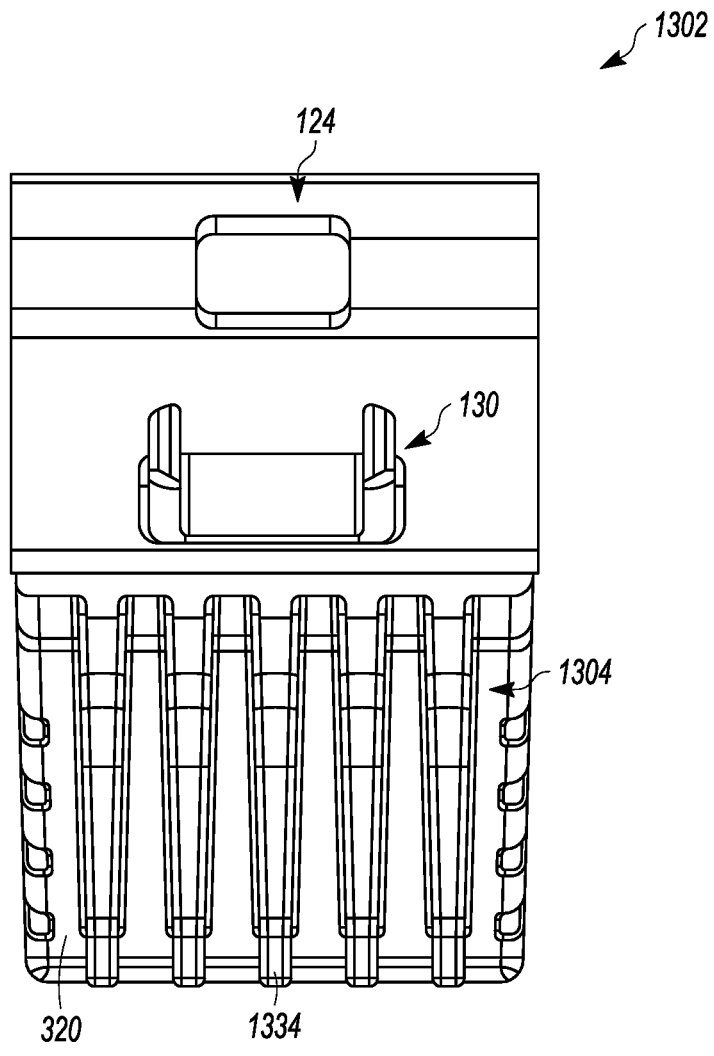
FIG. 23 illustrates an elevational view of an end of the back plate shown in FIG. 19.

FIGS. 13 through 18 illustrate another example of a brake system 1300 having a back plate 1302 with thermal management features 1304 and a composite brake pad 1306. FIGS. 19 through 23 illustrate an example of the back plate of the brake system shown in FIGS. 13 through 18. FIG. 13 illustrates a perspective view of the brake system, FIG. 14 illustrates an elevational view of an outer side of the brake system, FIG. 15 illustrates an elevational view of an inner side of the brake system, FIG. 16 illustrates a plan view of a top side of the brake system, FIG. 17 illustrates a plan view of a bottom side of the brake system, FIG. 18 illustrates an elevational view of an end of the brake system, FIG. 19 illustrates a perspective view of the back plate, FIG. 20 illustrates an elevational view of an inner or outer side of the back plate, FIG. 21 illustrates a plan view of a top side of the back plate, FIG. 22 illustrates a plan view of a bottom side of the back plate, and FIG. 23 illustrates an elevational view of an end of the back plate.

The brake system 1300 includes the back plate 1302 that may support the composite brake pad 1306. A head surface of the back plate engages a brake head and an opposite pad surface of the back plate is coupled with the brake pad, similar to as described above in connection with the brake system 100 shown in FIGS. 1 through 6. The brake pad may be formed from a composite material or another material on the pad surface of the back plate, also as described above.

The back plate also includes one or more of the conditioning inserts 320 described above. The back plate also has an arcuate shape with the centrally-located coupler 124 and/or rejection lugs 130 described above.

The thermal management features 1304 are formed from one or more thermally conductive materials, such as metal or a metal alloy (e.g., iron, an alloy containing iron, another metal, or another metal alloy). The thermal management features conduct the thermal energy in the conditioning inserts and/or in the brake pad to locations outside of the brake pad. For example, the thermal management features can conduct heat away from the conditioning inserts and out of the brake pads and dissipate the heat to the ambient environment outside of the brake system.

Similar to the thermal management features 104 shown in FIGS. 1 through 12, the thermal management features 1304 include heat fins 1334 that are coupled with the conditioning inserts. The heat fins can be planar bodies oriented parallel to each other or substantially parallel to each other, similar to the heat fins 134 described above. The heat fins provide increased surface area (e.g., relative to the exposed portions of the conditioning inserts that are not enclosed by the brake pad) for the dissipation of heat outside of the brake pad. There are five heat fins in the illustrated example, but alternatively there may be fewer heat fins (as few as one heat fin) or more than five heat fins.

In contrast to the back plate 102 shown in FIGS. 1 through 12, the thermal management features 1304 do not include the head plates 138. Instead, the heat fins 1334 of the thermal management features 1304 are cantilevered bodies that are coupled to the conditioning inserts along only the insert or inner edges 844 of the heat fins 1334. The heat fins circumferentially extend from the insert or inner edges to circumferentially outer edges 1348 and radially extend from the lower or radially inward edges 850 to upper or radially outer edges 1346. In contrast to the heat fins 134 shown in FIGS. 1 through 12, the heat fins 1334 are shorter along radial directions that extend from the lower edges 850 to the upper edges 1346. For example, the heat fins 1334 are smaller between the radially inner and outer edges when compared to the heat fins 134 due to notches 1452 (shown in FIG. 14), cutout notches. The notches represent open areas or volumes where the heat fins are not present, e.g., relative to an outer volume envelope defined by (i) a surface coincident with the radially-outermost curved main surface of the back plate— see line L in FIG. 14—and (ii) the side edges of the heat fins. Alternatively, the heat fins 1334 may have another shape or size, such as the heat fins 134.

The notched heat fins may protrude or otherwise extend beyond the components in which heat is generated during braking to carry the heat away from those components and to dissipate the heat out of the components. In the illustrated example, the heat fins laterally protrude beyond the opposite ends of the brake pad. The thermal management features may extend far beyond the brake pad to help dissipate heat. For example and similar to as shown in FIG. 4, the head plates and/or heat fins may extend beyond or outside of the brake pad by the extension length that is more than one third of the width of the back plate. Alternatively, the heat fins may extend beyond or outside of the brake pad by the extension length that is more than one half of the width of the back plate. Optionally, the extension length of the heat fins may be at least one twentieth, at least one fifteenth, at least one eleventh, at least one tenth, at least one eighth, or at least one quarter of the length of the back plate.

In operation, the working surface of the brake pad engages the outer circumference of a wheel surface during a braking event to slow or stop rotation of the wheel. The lower surfaces of the inserts also contact the wheel surface to condition the wheel surface. The rubbing contact between the working surface of the brake pad and the lower surfaces of the conditioning inserts generates heat. This heat is conducted through the inserts to exposed portions of the heat fins that are outside of the brake pad. The heat is then dissipated from surfaces of the heat fins outside of the brake pad. This can help cool or reduce the temperature rise of the brake pad and/or inserts, which can reduce wear and tear of the brake system.

Figure 24:
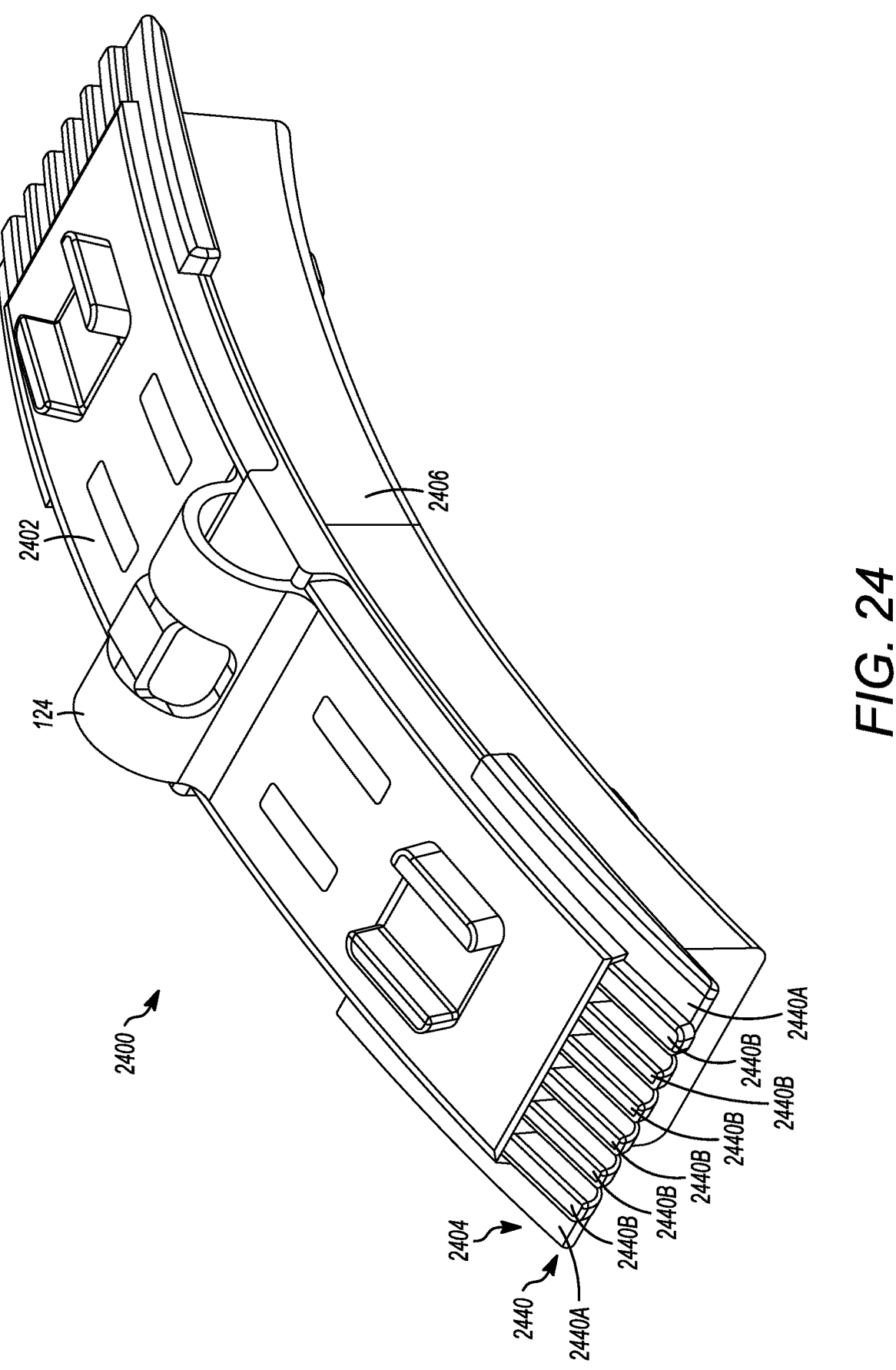
FIG. 24 illustrates a perspective view of another brake system.
Figure 25:
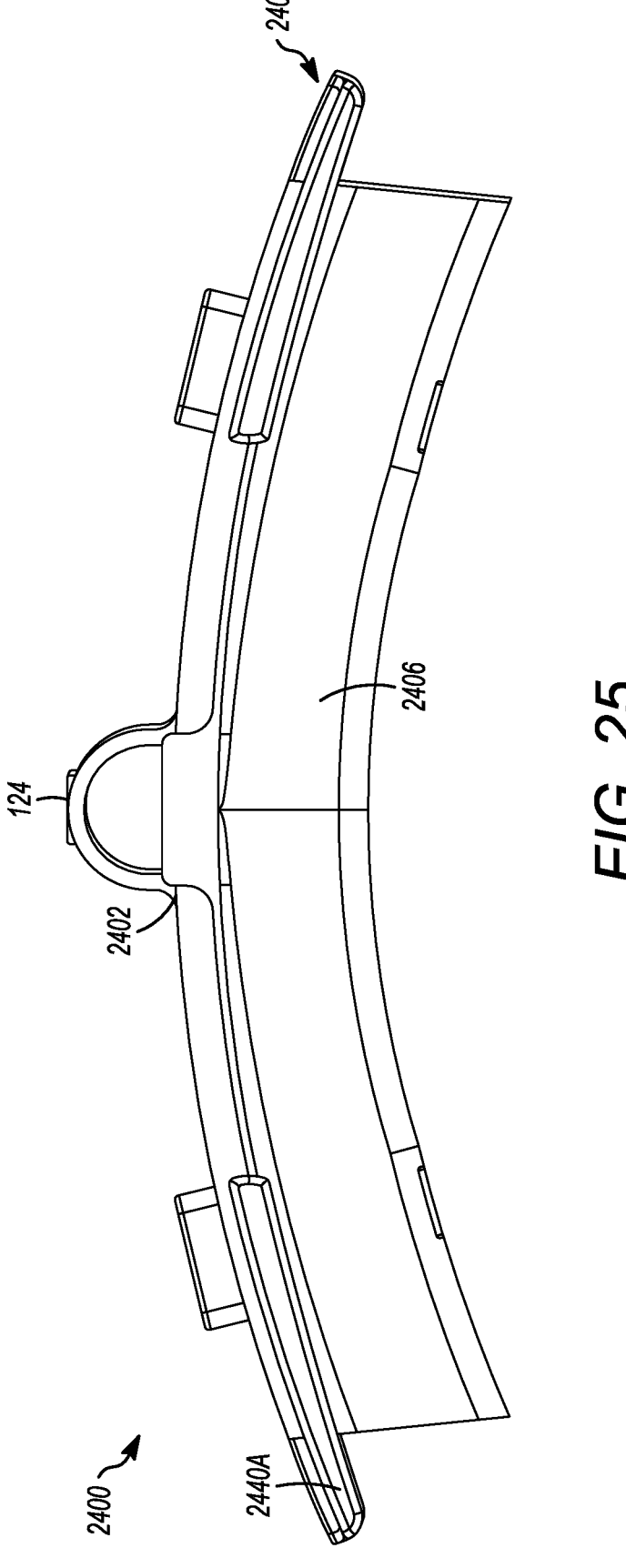
FIG. 25 illustrates an elevational view of an inner or outer side of the brake system shown in FIG. 24.
Figure 26:
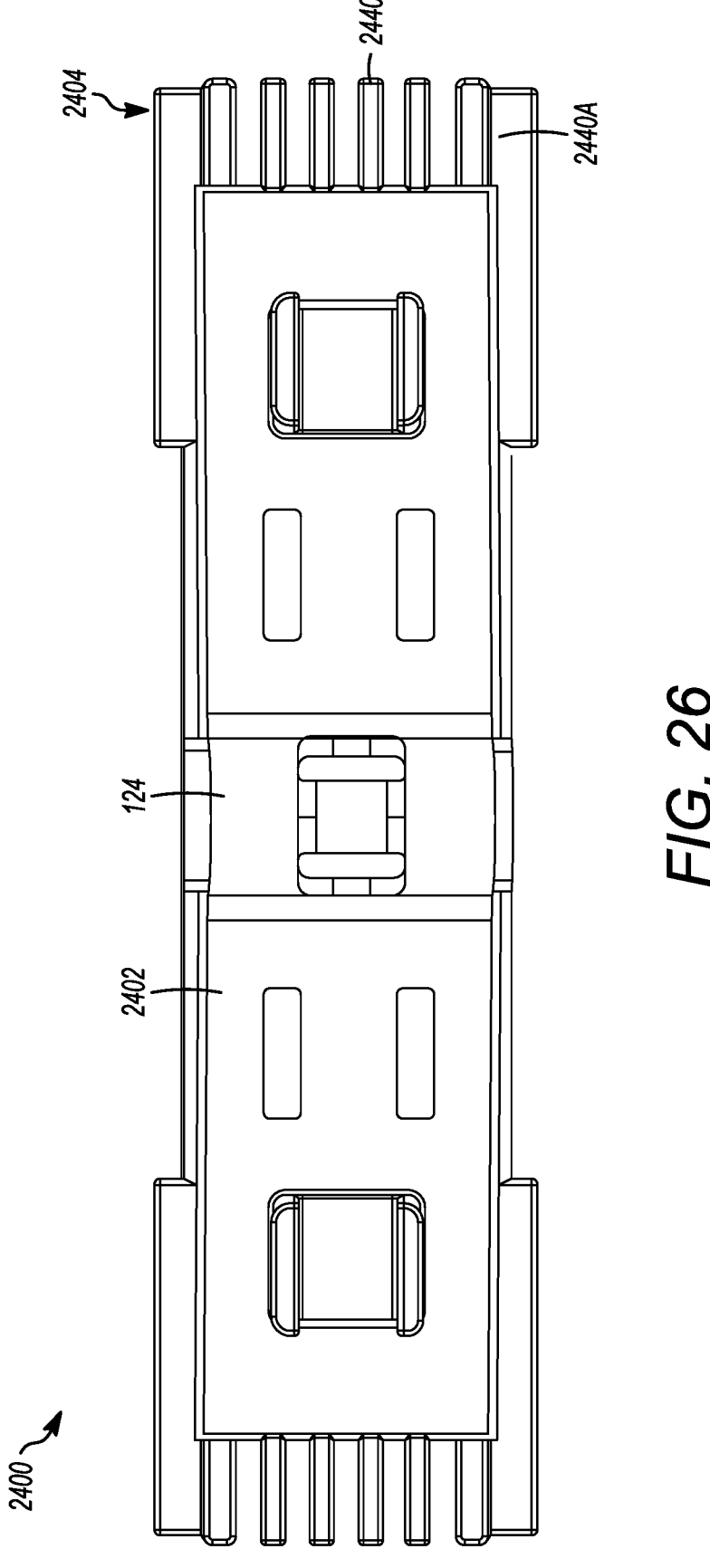
FIG. 26 illustrates a plan view of a top side of the brake system shown in FIG. 24.
Figure 27:
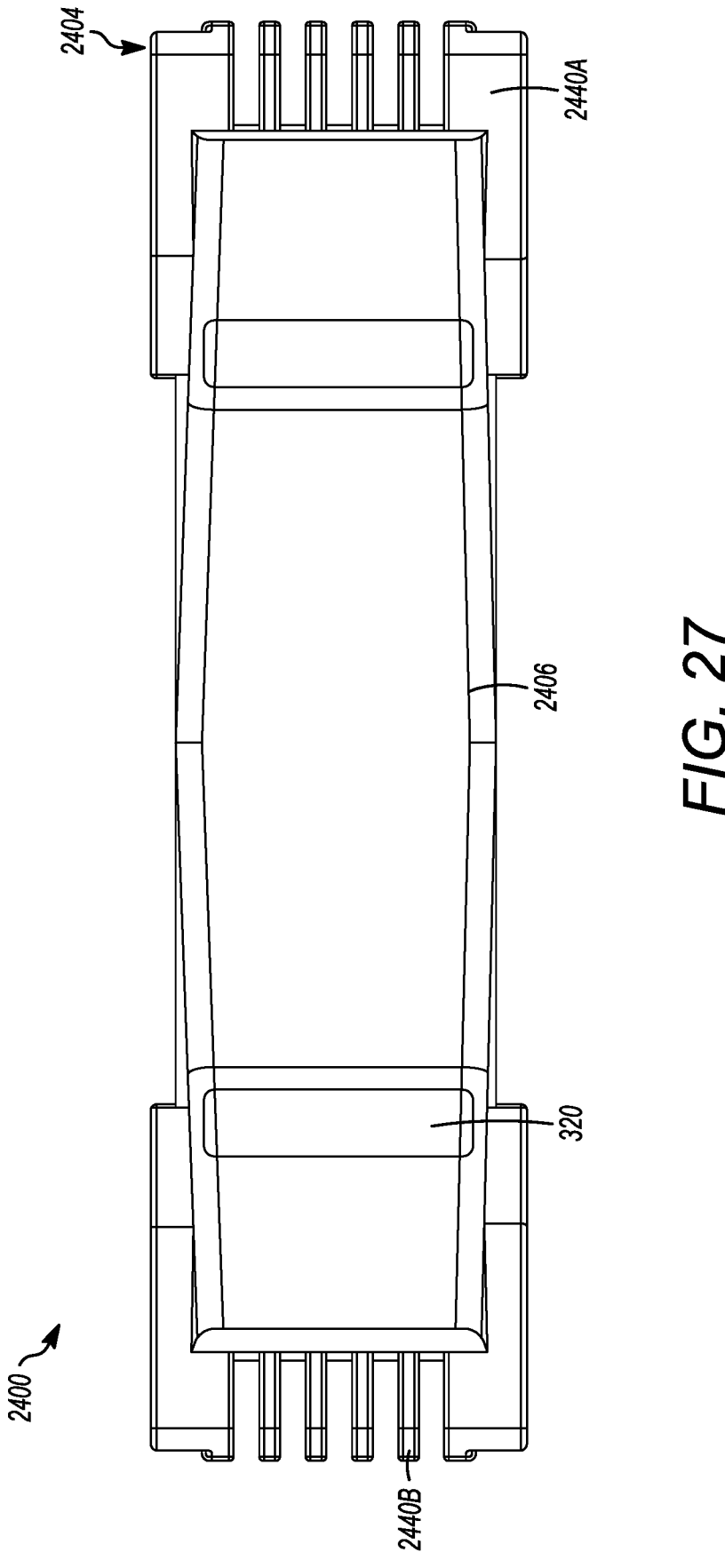
FIG. 27 illustrates a plan view of a bottom side of the brake system shown in FIG. 24.
Figure 28:
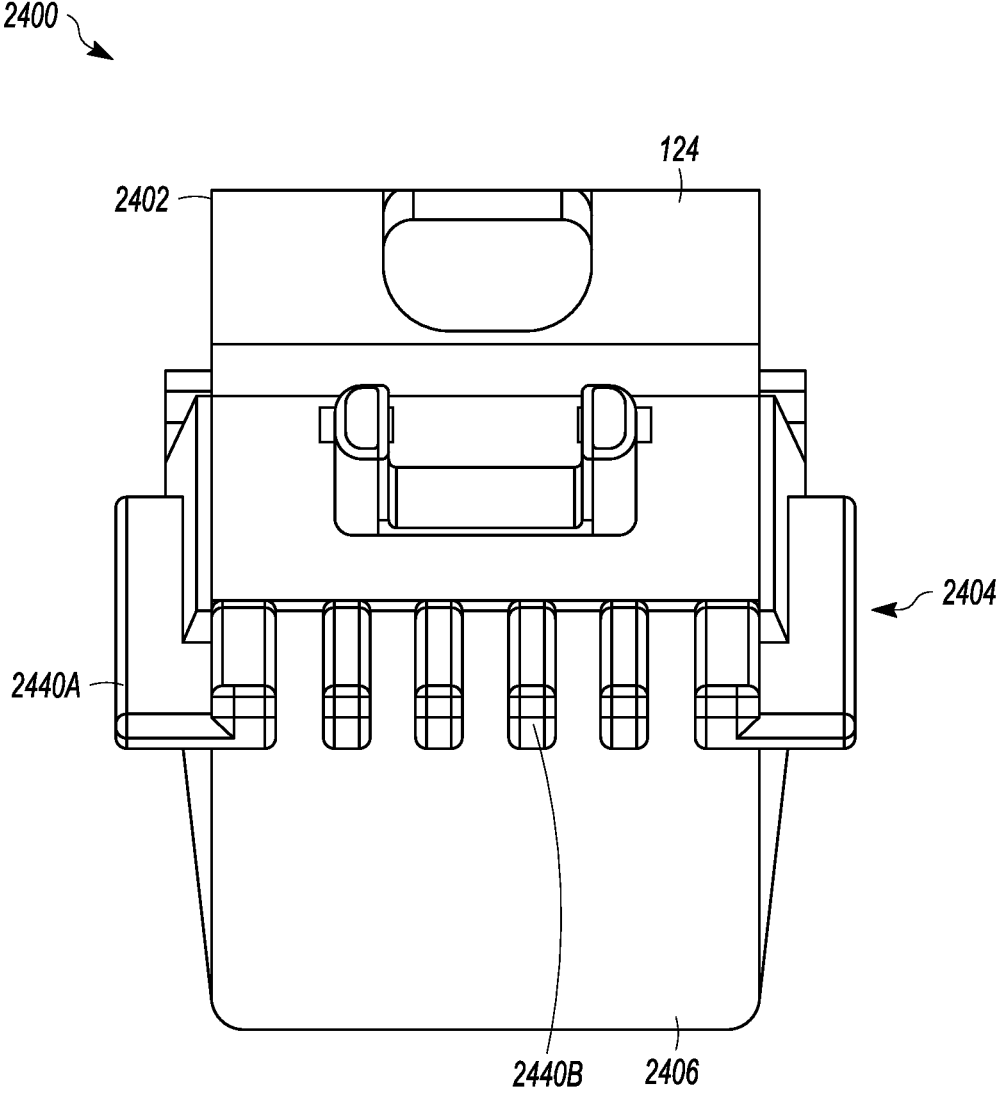
FIG. 28 illustrates an elevational view of an end of the brake system shown in FIG. 24.
Figure 29:
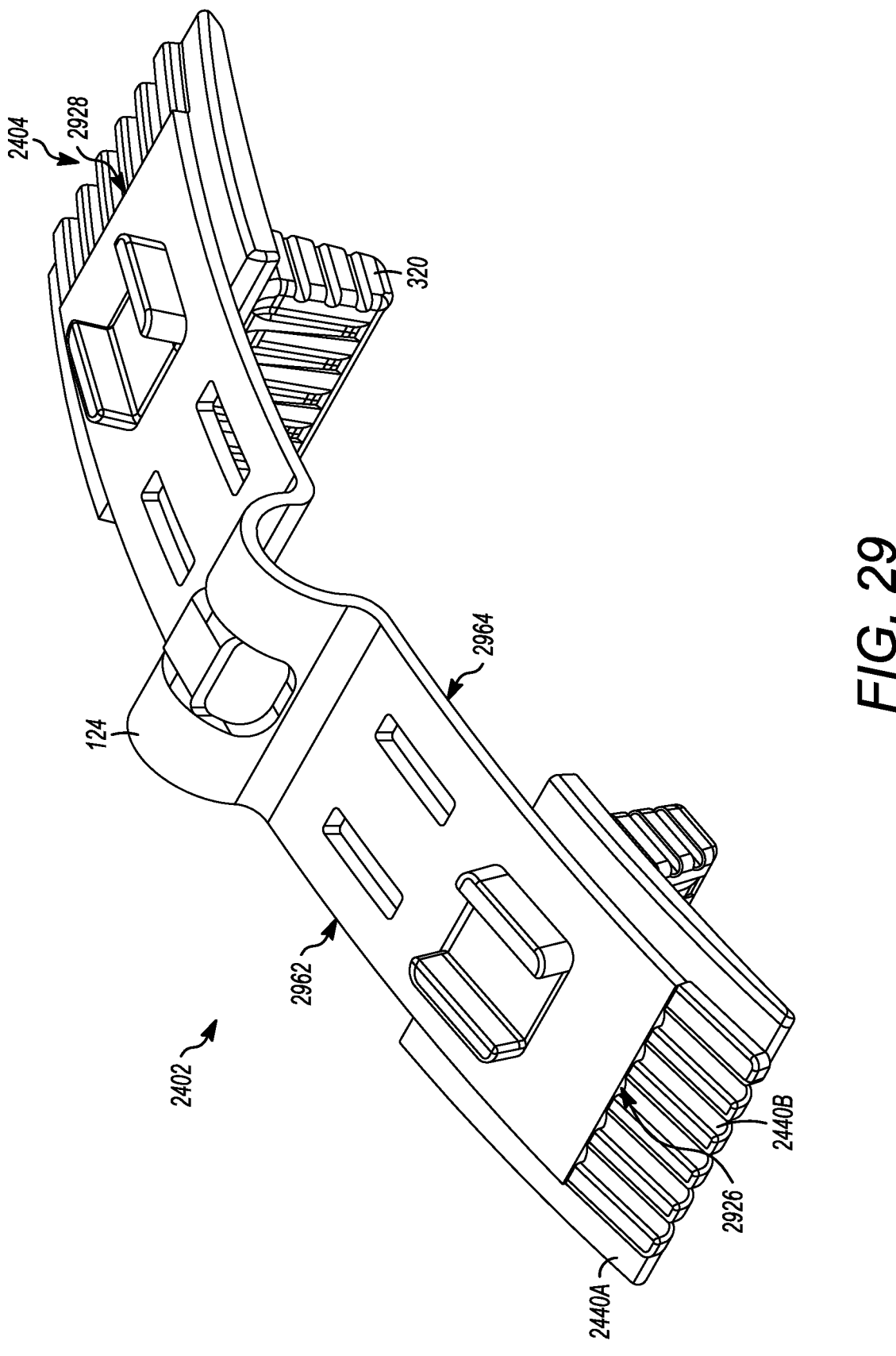
FIG. 29 illustrates a perspective view of a back plate of the brake system shown in FIG. 24.
Figure 30:
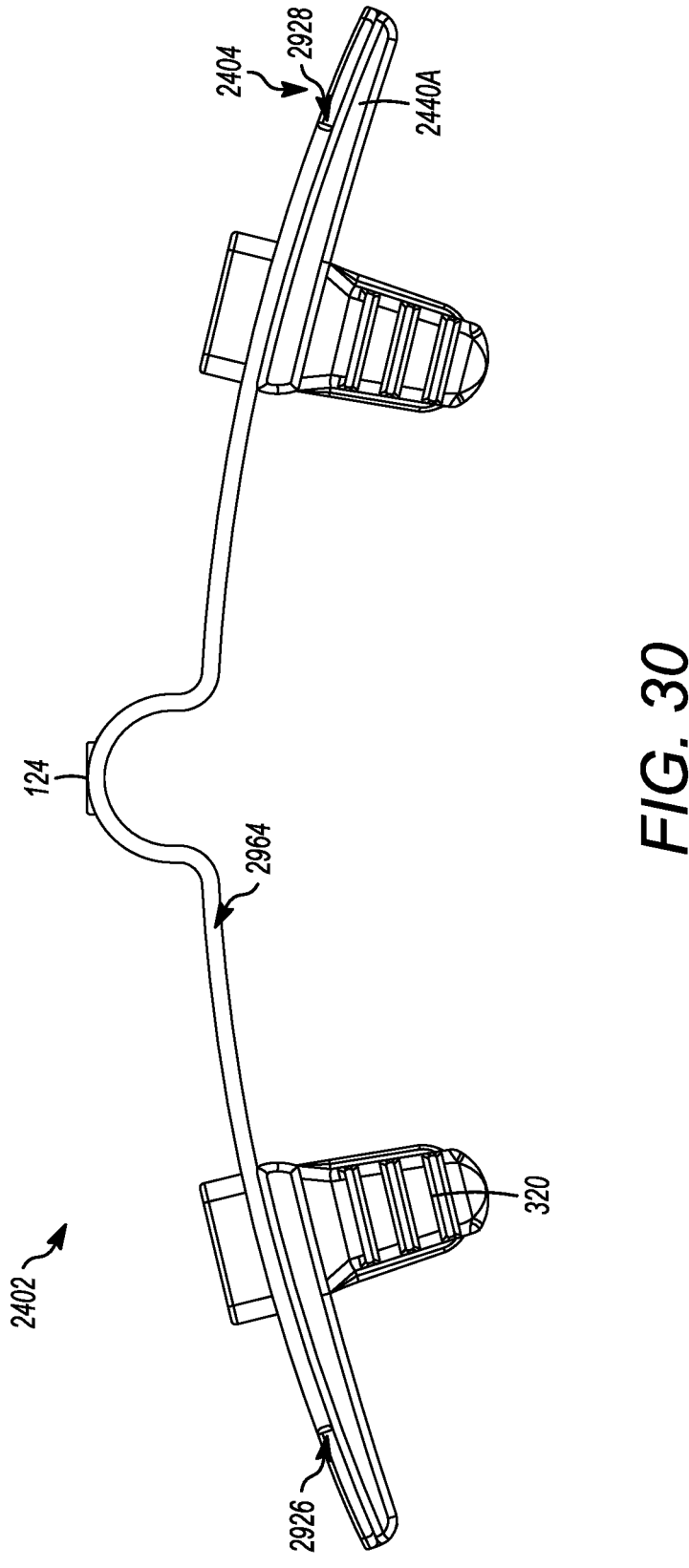
FIG. 30 illustrates an elevational view of an inner or outer side of the back plate shown in FIG. 29.
Figure 31:
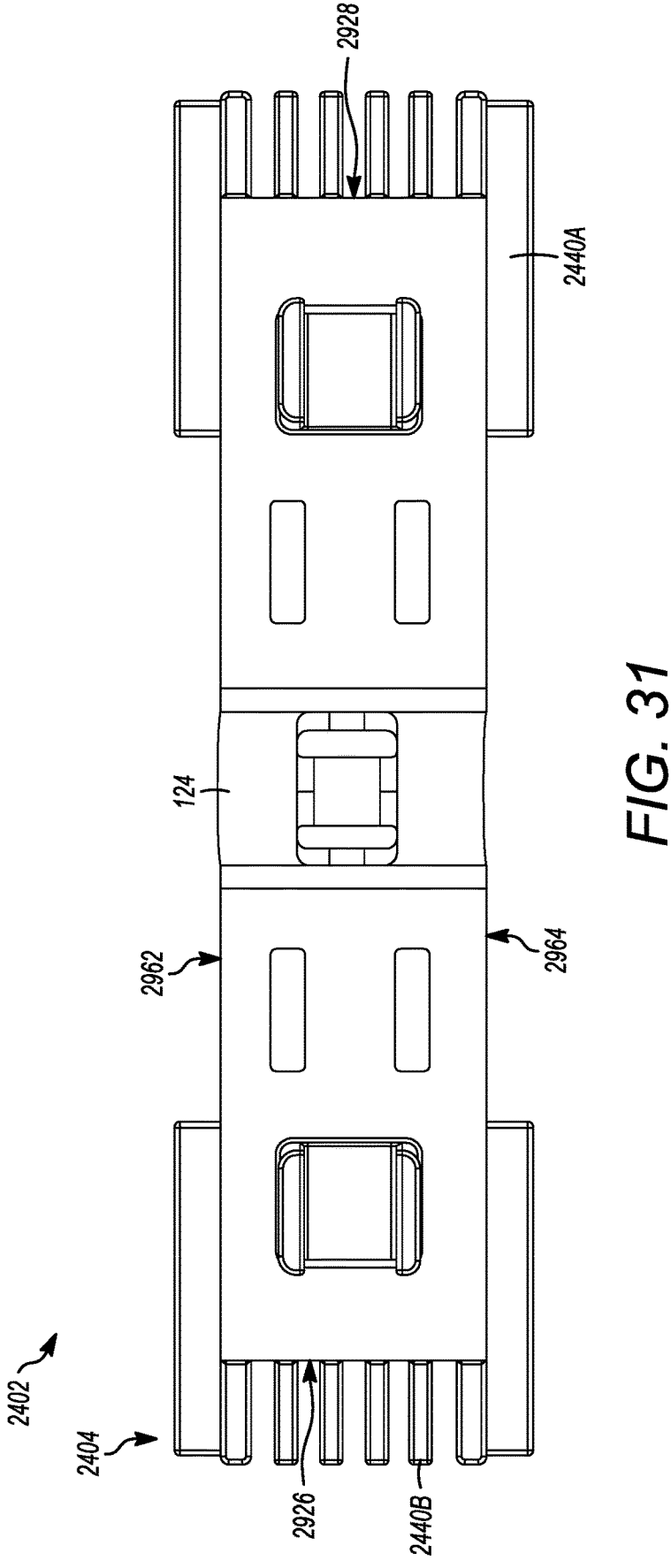
FIG. 31 illustrates a plan view of a top side of the back plate shown in FIG. 29.
Figure 32:
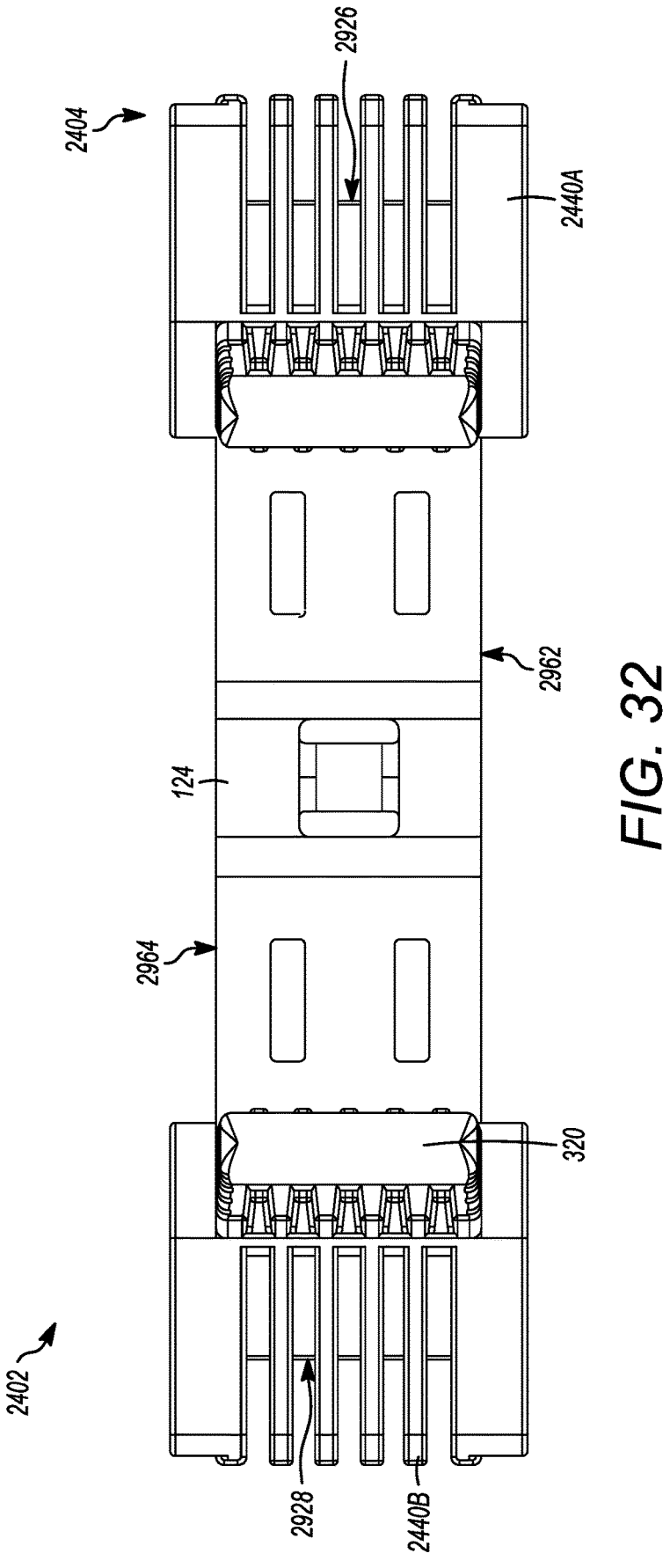
FIG. 32 illustrates a plan view of a bottom side of the back plate shown in FIG. 29.
Figure 33:
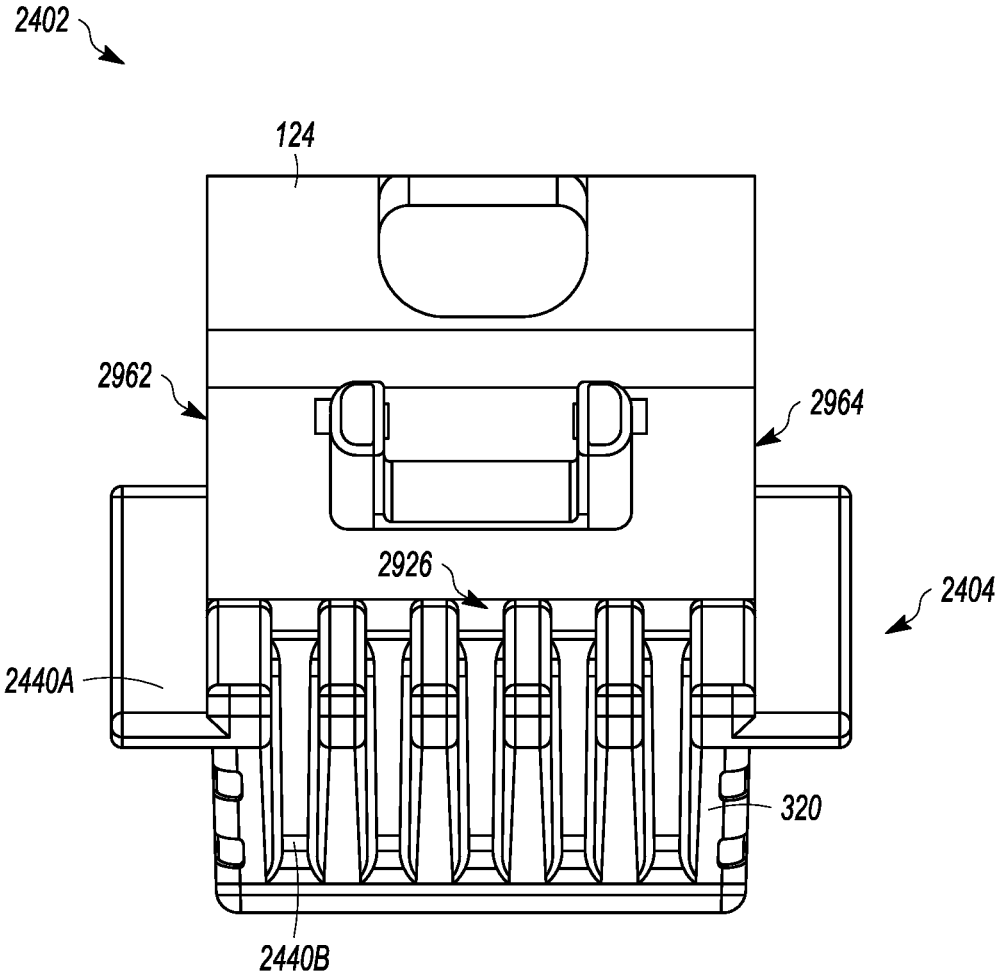
FIG. 33 illustrates an elevational view of an end of the back plate shown in FIG. 29.

FIGS. 24 through 28 illustrate another example of a brake system 2400 having a back plate 2402 with thermal management features 2404 and a composite brake pad 2406. FIGS. 29 through 33 illustrate an example of the back plate of the brake system shown in FIGS. 24 through 28. FIG. 24 illustrates a perspective view of the brake system, FIG. 25 illustrates an elevational view of an inner or outer side of the brake system, FIG. 26 illustrates a plan view of a top side of the brake system, FIG. 27 illustrates a plan view of a bottom side of the brake system, FIG. 28 illustrates an elevational view of an end of the brake system, FIG. 29 illustrates a perspective view of the back plate, FIG. 30 illustrates an elevational view of an inner or outer side of the back plate, FIG. 31 illustrates a plan view of a top side of the back plate, FIG. 32 illustrates a plan view of a bottom side of the back plate, and FIG. 33 illustrates an elevational view of an end of the back plate.

The brake system 2400 includes the back plate 2402 that may support the composite brake pad 2406. A head surface of the back plate engages a brake head and an opposite pad surface of the back plate is coupled with the brake pad, similar to as described above in connection with the brake system 100 shown in FIGS. 1 through 6. The brake pad may be formed from a composite material or another material on the pad surface of the back plate, also as described above. The back plate also includes one or more of the conditioning inserts 320 described above. The back plate also has an arcuate shape with the centrally-located coupler 124 and/or rejection lugs 130 described above. The coupler of the back plate 2402 has a curved or arcuate shape while the coupler of the back plate 102 has a square or polygon shape.

The thermal management features 2404 are formed from one or more thermally conductive materials, such as metal or a metal alloy (e.g., iron, an alloy containing iron, another metal, or another metal alloy). The thermal management features conduct the thermal energy in the conditioning inserts and/or in the brake pad to locations outside of the brake pad. For example, the thermal management features can conduct heat away from the conditioning inserts and out of the brake pads and dissipate the heat to the ambient environment outside of the brake system.

The thermal management features 2404 include heat fins that can be shaped as elongated tines or fingers coupled with the conditioning inserts and/or the back plate. In one example, the tines or fingers are coupled with the conditioning inserts. In another example, the tines or fingers are coupled with the back plate. Each of the tines or fingers may have width and height (or thickness) dimensions that are closer to each other than the length dimension of the tine or finger. In contrast to the planar or sheet-shaped heat fins of the brake systems 100, 1300 where the width dimension and the length dimension are much larger than the height (or thickness) dimension, the heat fins of the brake system 2400 are elongated tines or fingers 2440 (e.g., inner tines 2440A and outer tines 2440B). The tines may be elongated bodies that circumferentially and outwardly extend away from the conditioning inserts. The inner tines can outwardly extend away from the back plate from opposite ends 2926, 2928 of the back plate (shown in FIG. 29). Alternatively, the inner tines may be disposed beneath the back plate and may be coupled with the pad surface of the back plate. The inner tines may be spaced apart from each other along transverse directions. For example, the inner tines may have gaps between the tines along directions that are perpendicular or orthogonal to the circumferential directions in which the inner tines are elongated.

The outer tines may be disposed outside of the inner tines and/or the brake pad, and can be wider than the inner tines in the illustrated embodiment. For example, the outer tines also may be disposed outside of the back plate such that the outer tines are disposed outside of and coupled with lateral edges 2962, 2964 (shown in FIG. 29) of the back plate. These lateral edges can extend from one end of the back plate to the opposite end of the back plate. The heat tines may provide increased surface area (e.g., relative to the exposed portions of the conditioning inserts that are not enclosed by the brake pad) for the dissipation of heat outside of the brake pad. There are six inner heat tines and two outer heat tines in the illustrated example, but alternatively there may be fewer heat tines (as few as one heat tine) or more than eight heat tines.

The tines may protrude or otherwise extend beyond the components in which heat is generated during braking to carry the heat away from those components and to dissipate the heat out of the components. In the illustrated example, the tines protrude beyond the opposite ends of the brake pad. The tines may extend far beyond the brake pad to help dissipate heat. For example and similar to as shown in FIG. 4, the tines may extend beyond or outside of the brake pad by the extension length that is more than one third of the width of the back plate. Alternatively, the tines may extend beyond or outside of the brake pad by the extension length that is more than one half of the width of the back plate. Optionally, the extension length of the tines may be at least one twentieth, at least one fifteenth, at least one eleventh, at least one tenth, at least one eighth, or at least one quarter of the length of the back plate.

In operation, the working surface of the brake pad engages the outer circumference of a wheel surface during a braking event to slow or stop rotation of the wheel. The lower surfaces of the inserts also contact the wheel surface to condition the wheel surface. The rubbing contact between the working surface of the brake pad and the lower surfaces of the conditioning inserts generates heat. This heat is conducted through the inserts to exposed portions of the heat tines that are outside of the brake pad. The heat is then dissipated from surfaces of the heat fins outside of the brake pad. This can help cool or reduce the temperature rise of the brake pad and/or inserts, which can reduce wear and tear of the brake system.

Figure 34:
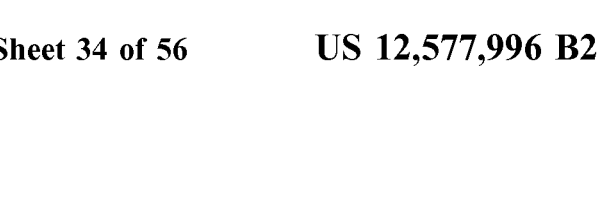
FIG. 34 illustrates a perspective view of another brake system.
Figure 35:
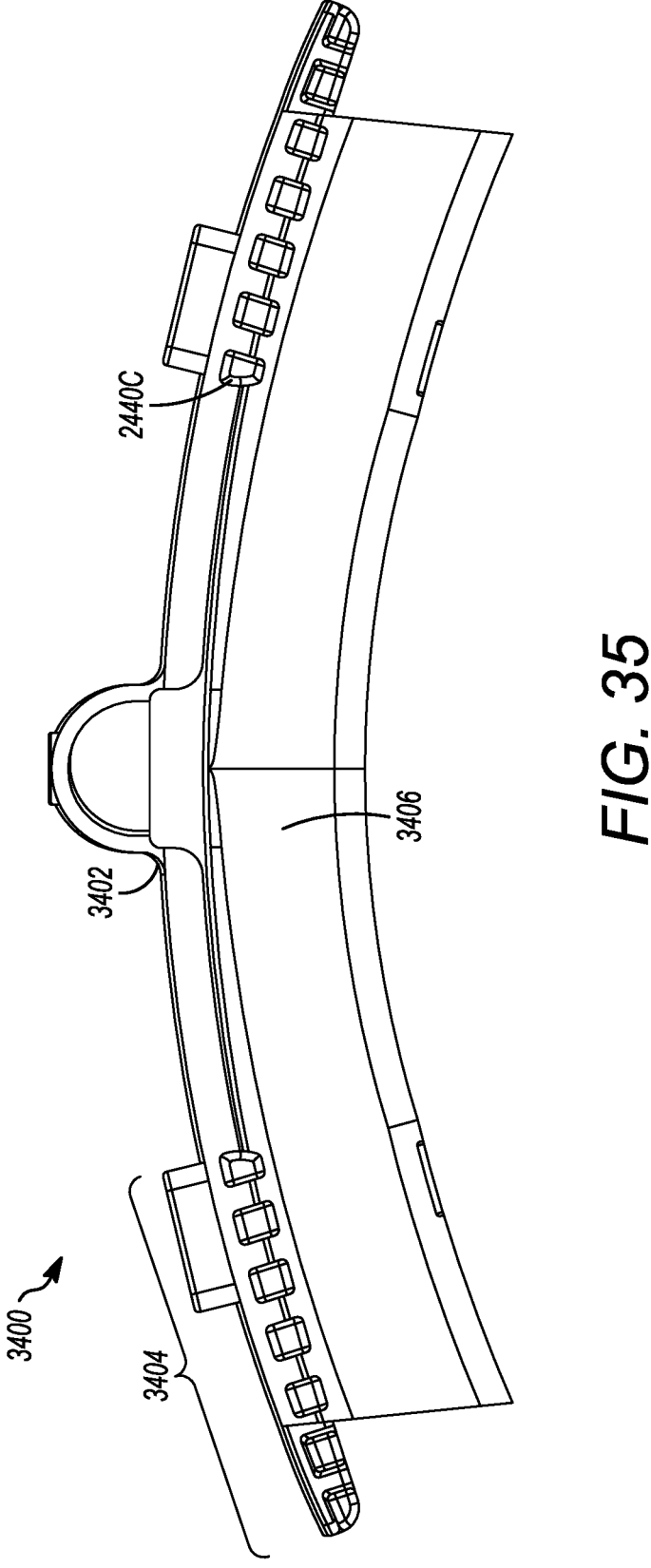
FIG. 35 illustrates an elevational view of an inner or outer side of the brake system shown in FIG. 34.
Figure 36:
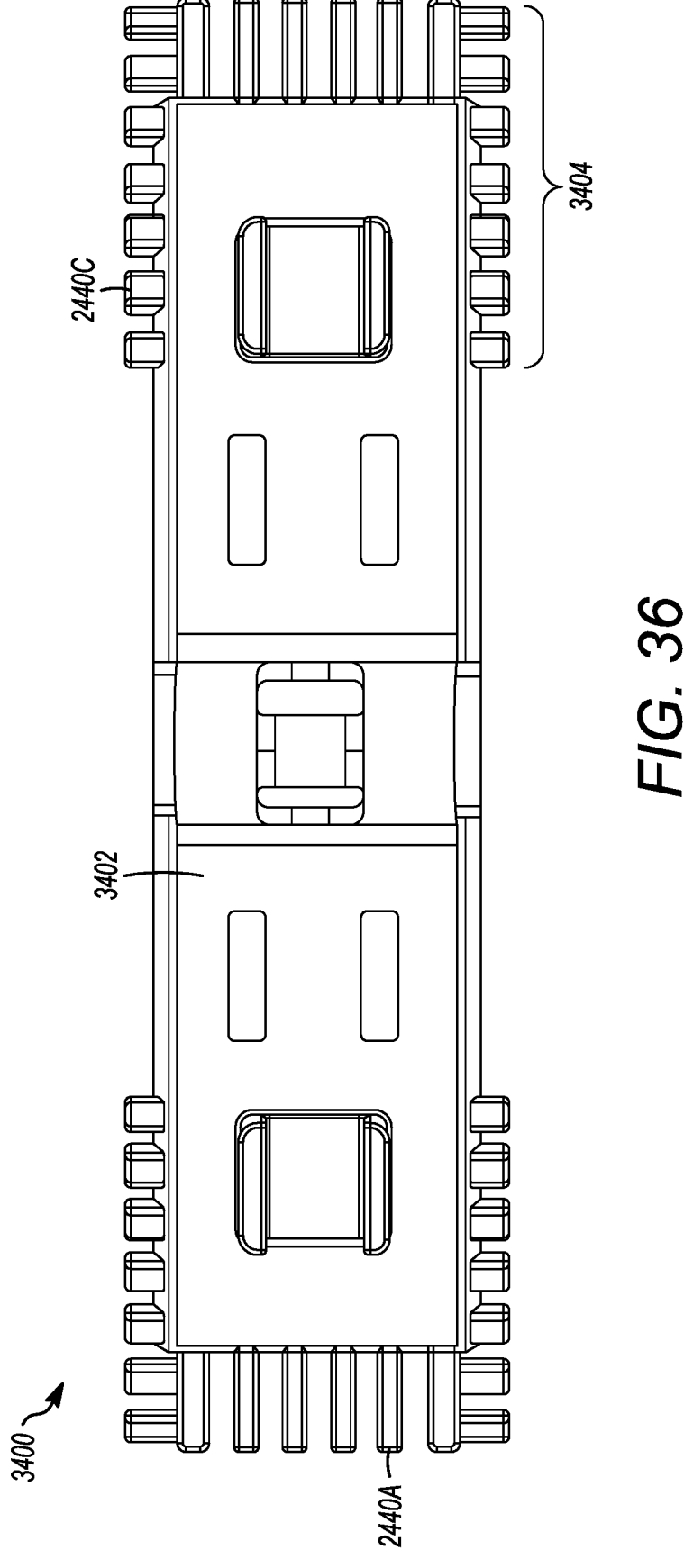
FIG. 36 illustrates a plan view of a top side of the brake system shown in FIG. 34.
Figure 37:
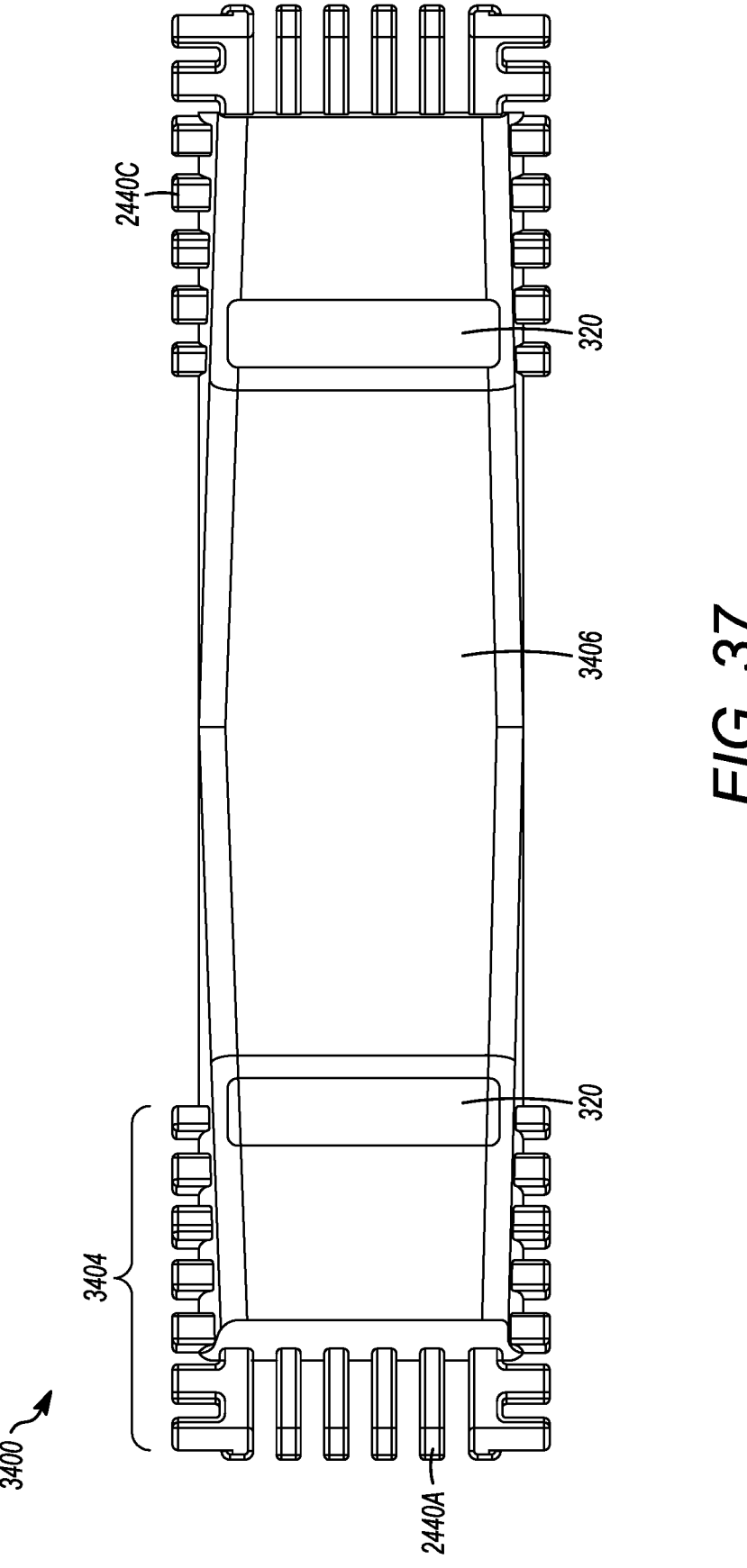
FIG. 37 illustrates a plan view of a bottom side of the brake system shown in FIG. 34.
Figure 38:
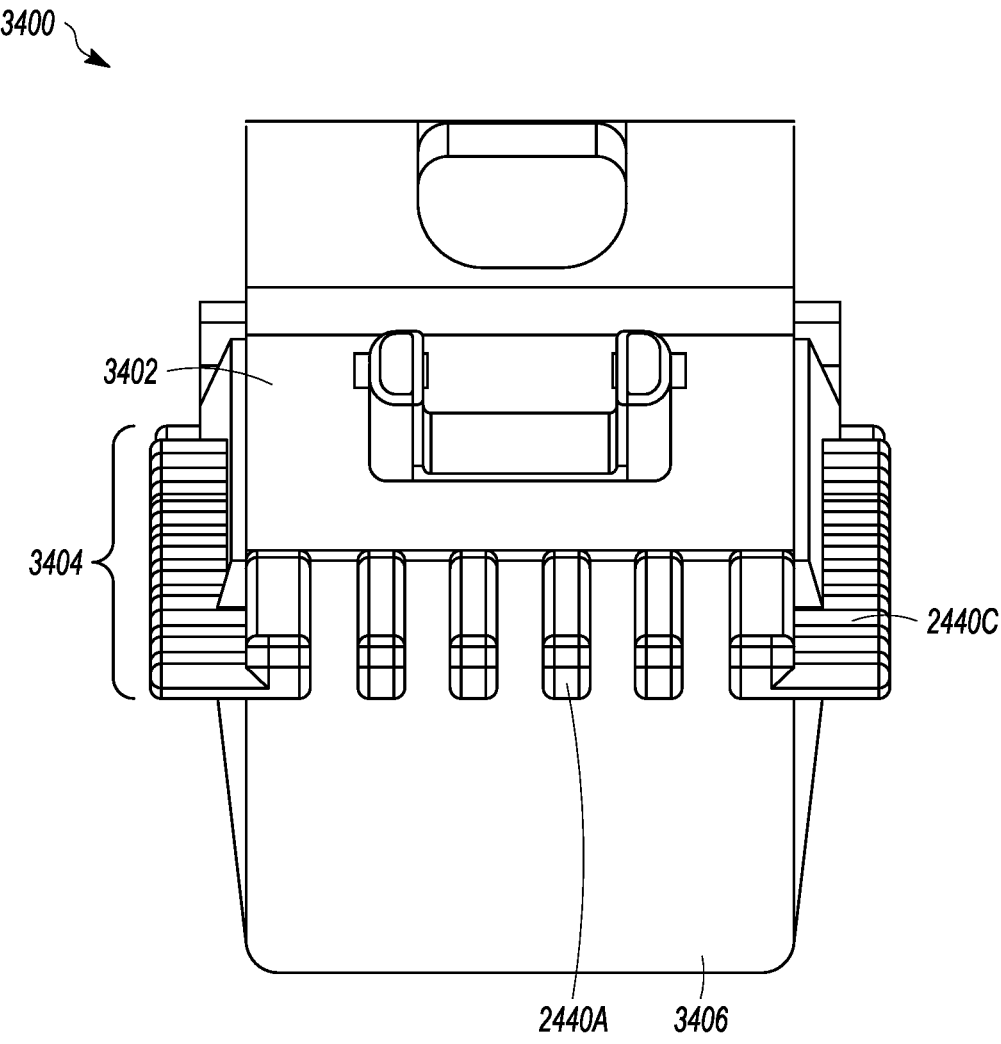
FIG. 38 illustrates an elevational view of an end of the brake system shown in FIG. 34.
Figure 39:
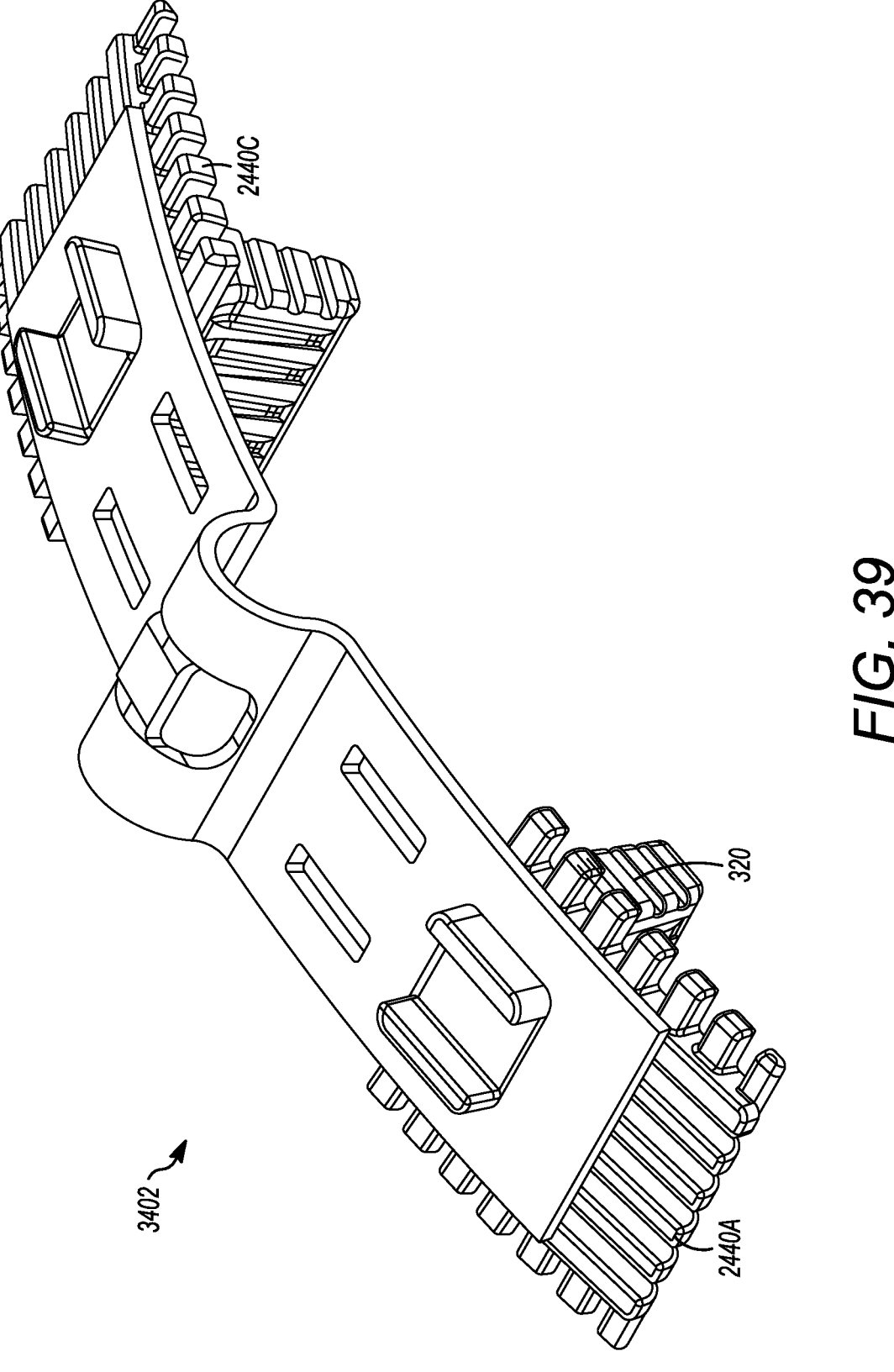
FIG. 39 illustrates a perspective view of a back plate of the brake system shown in FIGS. 34 through 38.
Figure 40:
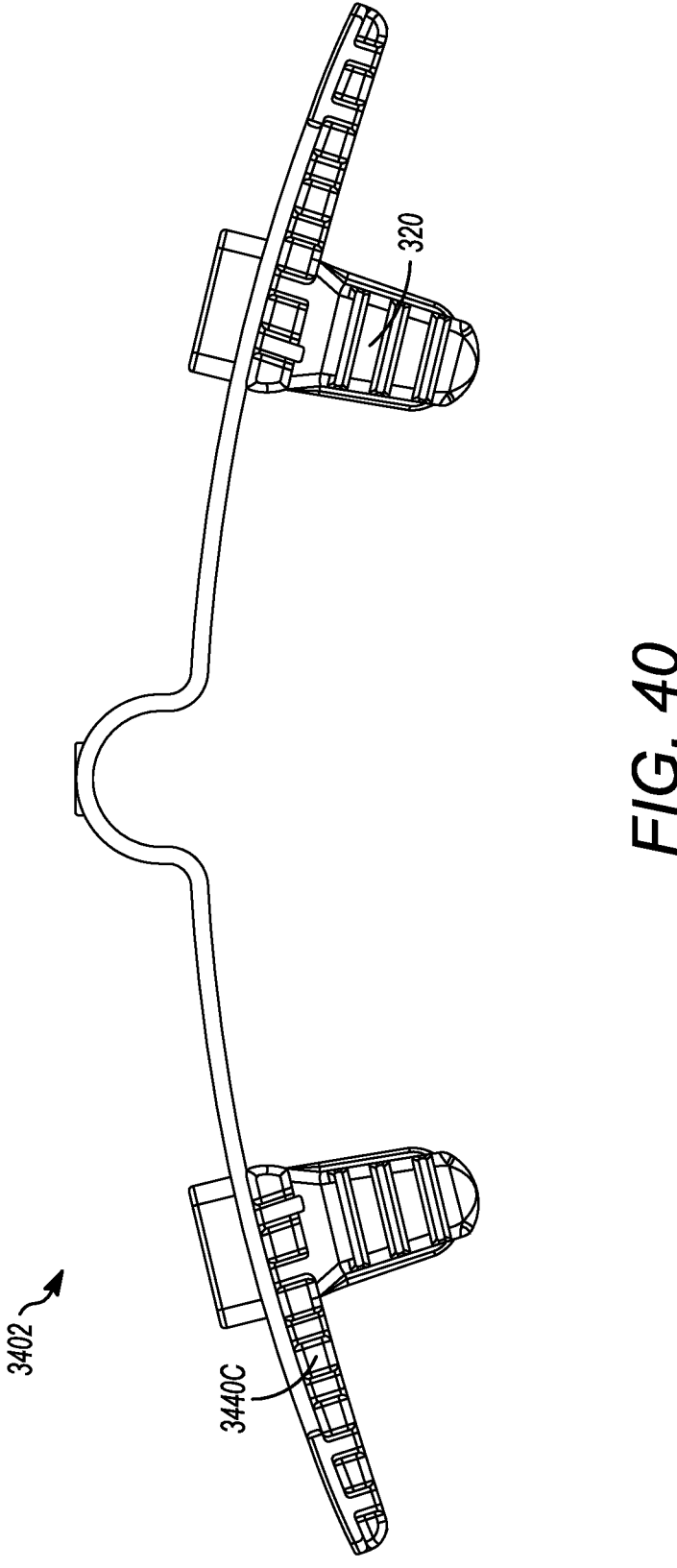
FIG. 40 illustrates an elevational view of an inner or outer side of the back plate shown in FIG. 39.
Figure 41:
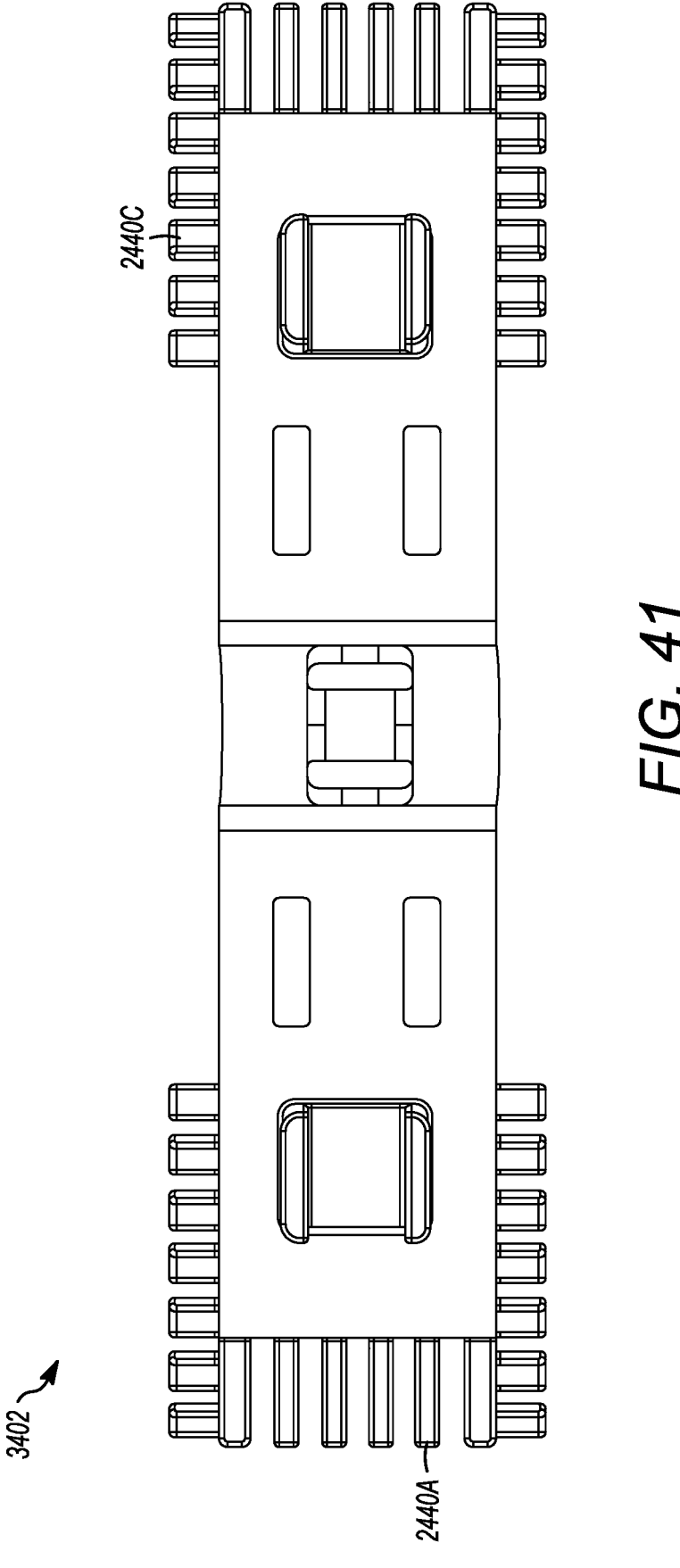
FIG. 41 illustrates a plan view of a top side of the back plate shown in FIG. 39.
Figure 42:
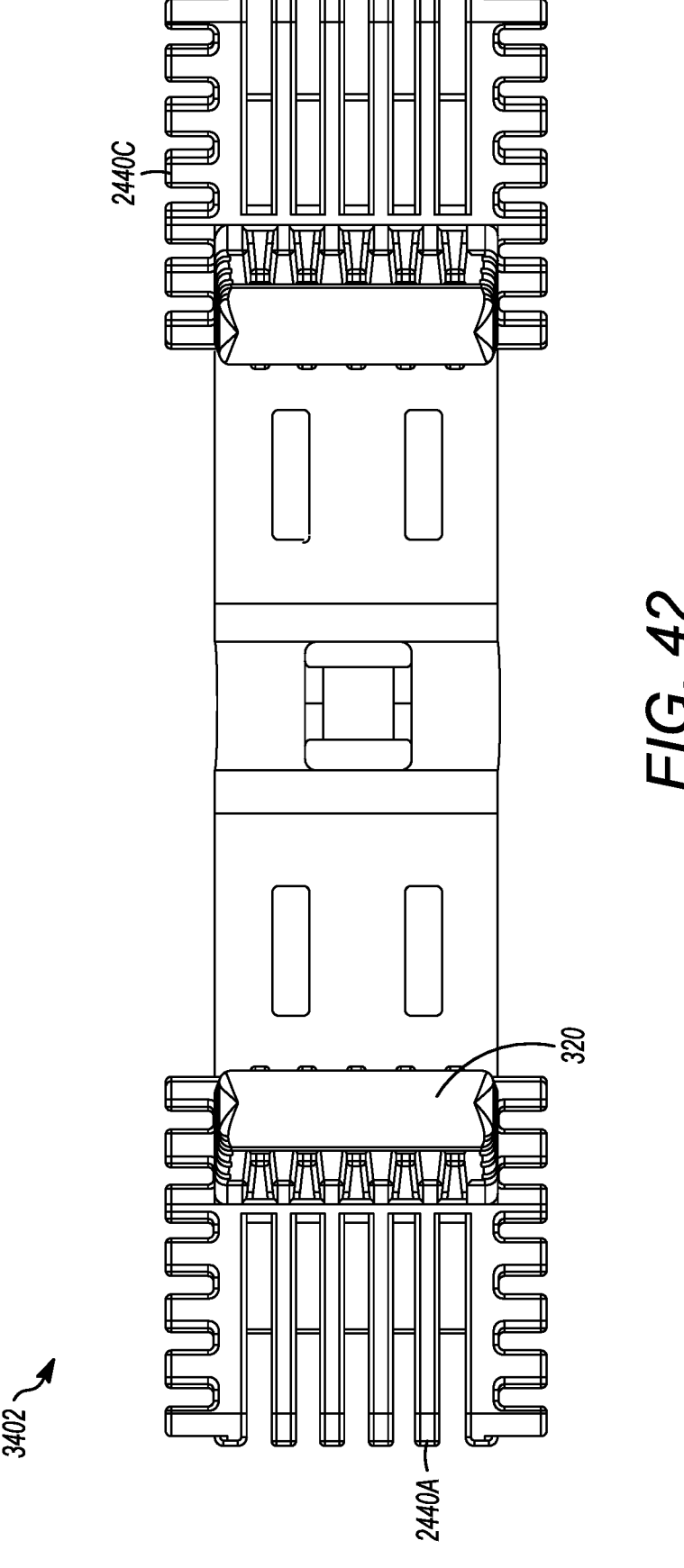
FIG. 42 illustrates a plan view of a bottom side of the back plate shown in FIG. 39.
Figure 43:
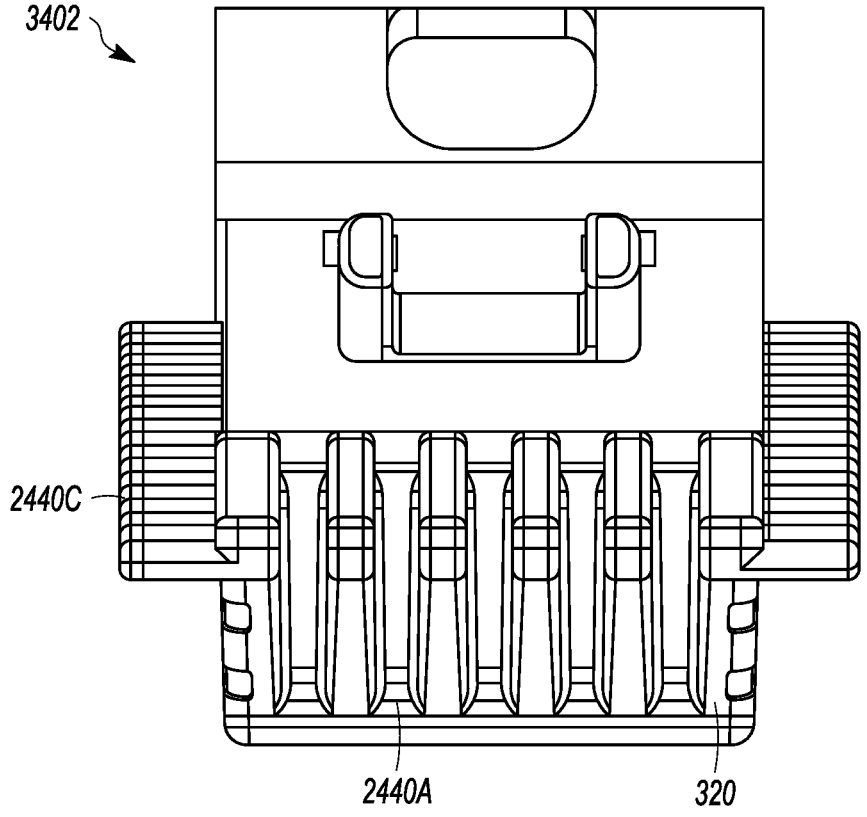
FIG. 43 illustrates an elevational view of an end of the back plate shown in FIG. 39.

FIGS. 34 through 38 illustrate another example of a brake system 3400 having a back plate 3402 with thermal management features 3404 and a composite brake pad 3406. FIGS. 39 through 43 illustrate an example of the back plate of the brake system shown in FIGS. 34 through 38. FIG. 34 illustrates a perspective view of the brake system, FIG. 35 illustrates an elevational view of an inner or outer side of the brake system, FIG. 36 illustrates a plan view of a top side of the brake system, FIG. 37 illustrates a plan view of a bottom side of the brake system, FIG. 38 illustrates an elevational view of an end of the brake system, FIG. 39 illustrates a perspective view of the back plate of the brake system shown in FIGS. 34 through 38, FIG. 40 illustrates an elevational view of an inner or outer side of the back plate, FIG. 41 illustrates a plan view of a top side of the back plate, FIG. 42 illustrates a plan view of a bottom side of the back plate, and FIG. 43 illustrates an elevational view of an end of the back plate.

The brake system 3400 includes the back plate 3402 that may support the composite brake pad 3406. A head surface of the back plate engages a brake head and an opposite pad surface of the back plate is coupled with the brake pad, similar to as described above in connection with the brake system 100 shown in FIGS. 1 through 6. The brake pad may be formed from a composite material or another material on the pad surface of the back plate, also as described above. The back plate also includes one or more of the conditioning inserts 320 described above. The back plate also has an arcuate shape with the centrally-located coupler and/or rejection lugs described above.

The thermal management features 3404 are formed from one or more thermally conductive materials, such as metal or a metal alloy (e.g., iron, an alloy containing iron, another metal, or another metal alloy). The thermal management features conduct the thermal energy in the conditioning inserts and/or in the brake pad to locations outside of the brake pad. For example, the thermal management features can conduct heat away from the conditioning inserts and out of the brake pads and dissipate the heat to the ambient environment outside of the brake system.

The thermal management features 3404 include heat fins that are elongated tines coupled with the conditioning inserts and/or the back plate. The thermal management features include the elongated inner tines 2440A described above. But, instead of including the elongated outer tines 2440B shown in FIG. 24, the thermal management features in this example include shorter transverse tines 2440C. Alternatively, the outer tines 2440B may be included and the transverse tines 2440C may laterally extend from the outer tines 2440B. The inner tines and transverse tines can be cantilevered beams that are elongated to outer ends. The inner tines are significantly longer than the transverse tines in the illustrated example. For example, each of the inner tines may be at least twice as long as each of the transverse tines, at least three times as long as each of the transverse tines, or at least four times as long as each of the transverse tines. Alternatively, the transverse tines may be as long or longer than the inner tines. The transverse tines extend to the outer ends along directions that are transverse (e.g., perpendicular) to the circumferential directions along which the inner tines are elongated.

The heat tines provide increased surface area (e.g., relative to the exposed portions of the conditioning inserts that are not enclosed by the brake pad) for the dissipation of heat outside of the brake pad. There are six inner heat tines and seven transverse heat tines along each side of each thermal management feature in the illustrated example. Alternatively, there may be fewer inner and/or transverse heat tines (as few as one inner or one transverse tine) or more than six inner heat tines and/or more than seven transverse heat tines.

The tines may protrude or otherwise extend beyond the components in which heat is generated during braking to carry the heat away from those components and to dissipate the heat out of the components. In the illustrated example, the tines 2440A protrude beyond the opposite ends of the brake pad. These tines may extend far beyond the brake pad to help dissipate heat. For example and similar to as shown in FIG. 4, these tines may extend beyond or outside of the brake pad by the extension length that is more than one third of the width of the back plate. Alternatively, these tines may extend beyond or outside of the brake pad by the extension length that is more than one half of the width of the back plate. Optionally, the extension length of these tines may be at least one twentieth, at least one fifteenth, at least one eleventh, at least one tenth, at least one eighth, or at least one quarter of the length of the back plate.

In operation, the working surface of the brake pad engages the outer circumference of a wheel surface during a braking event to slow or stop rotation of the wheel. The lower surfaces of the inserts also contact the wheel surface to condition the wheel surface. The rubbing contact between the working surface of the brake pad and the lower surfaces of the conditioning inserts generates heat. This heat is conducted through the inserts to exposed portions of the heat tines that are outside of the brake pad. The heat is then dissipated from surfaces of the heat fins outside of the brake pad. This can help cool or reduce the temperature rise of the brake pad and/or inserts, which can reduce wear and tear of the brake system.

Figure 44:
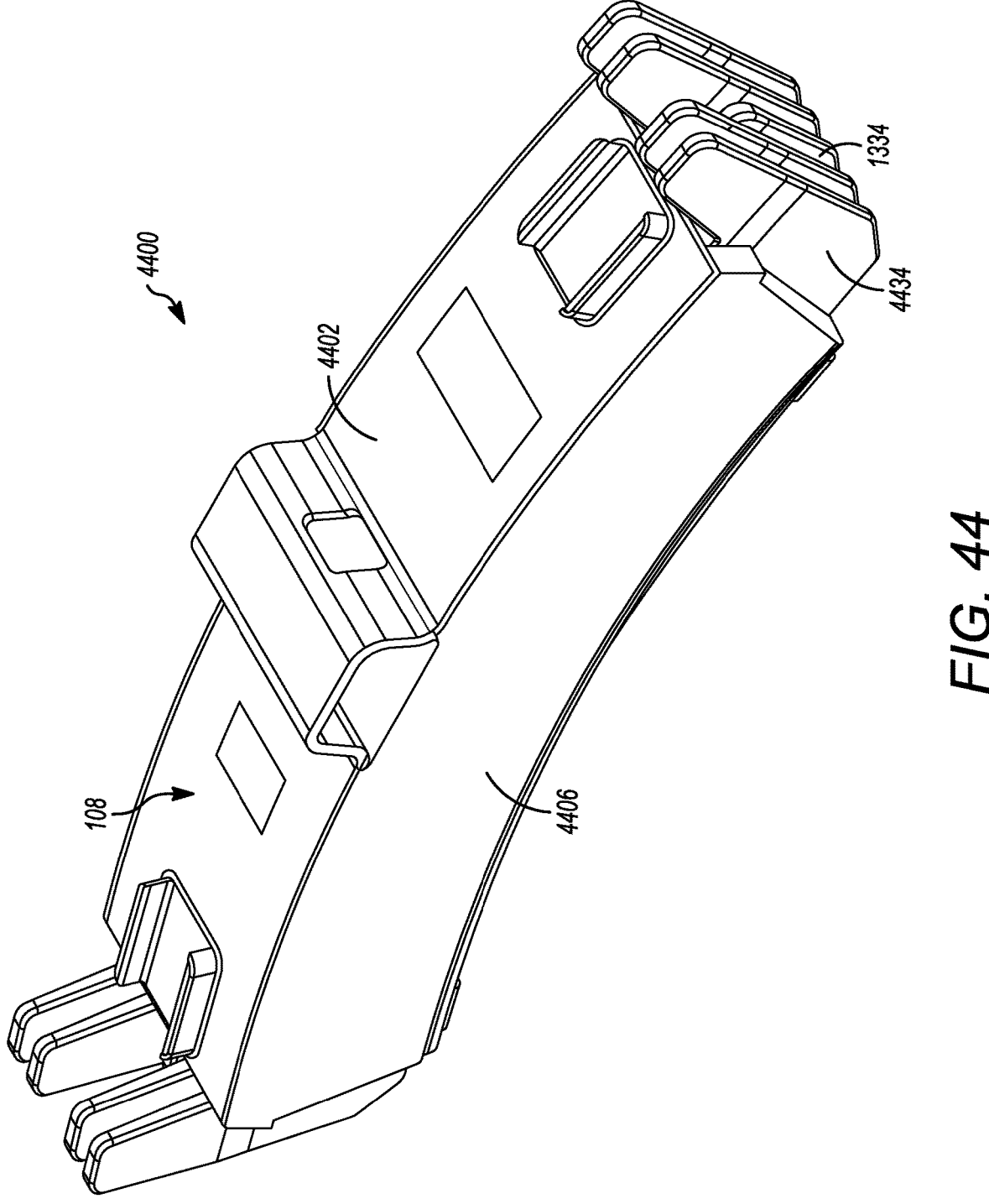
FIG. 44 illustrates a perspective view of another brake system.
Figure 45:
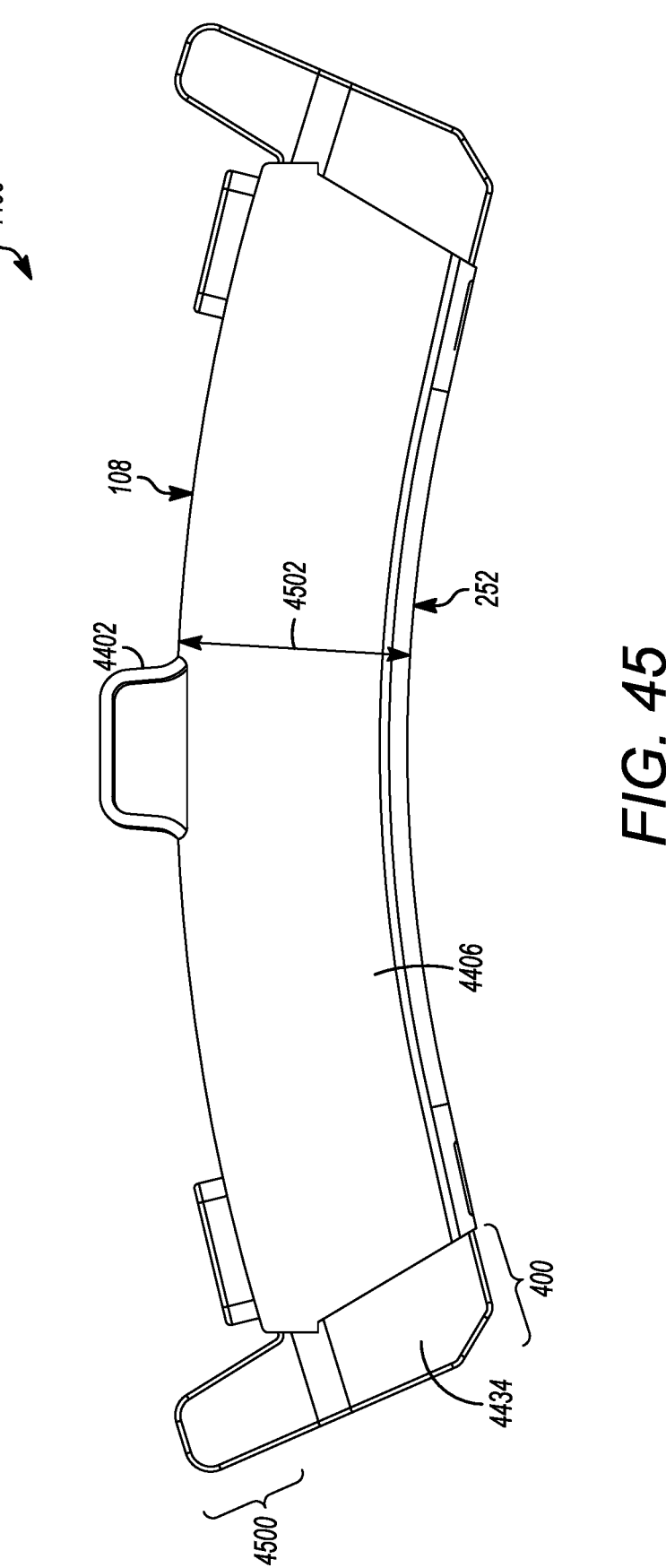
FIG. 45 illustrates an elevational view of an inner or outer side of the brake system shown in FIG. 44.
Figure 46:
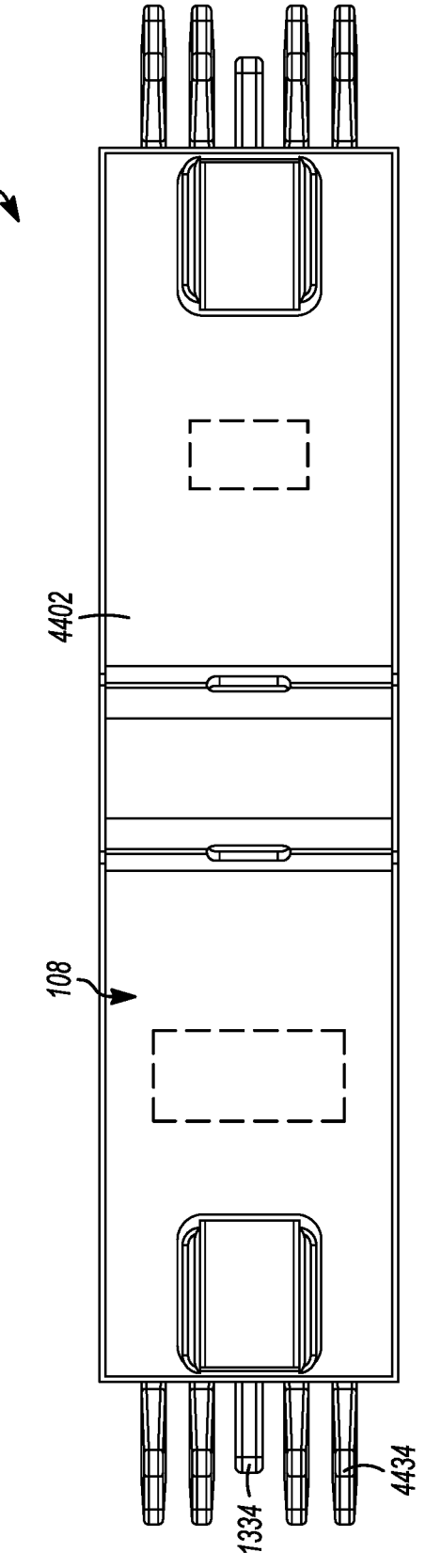
FIG. 46 illustrates a plan view of a top side of the brake system shown in FIG. 44.
Figure 47:
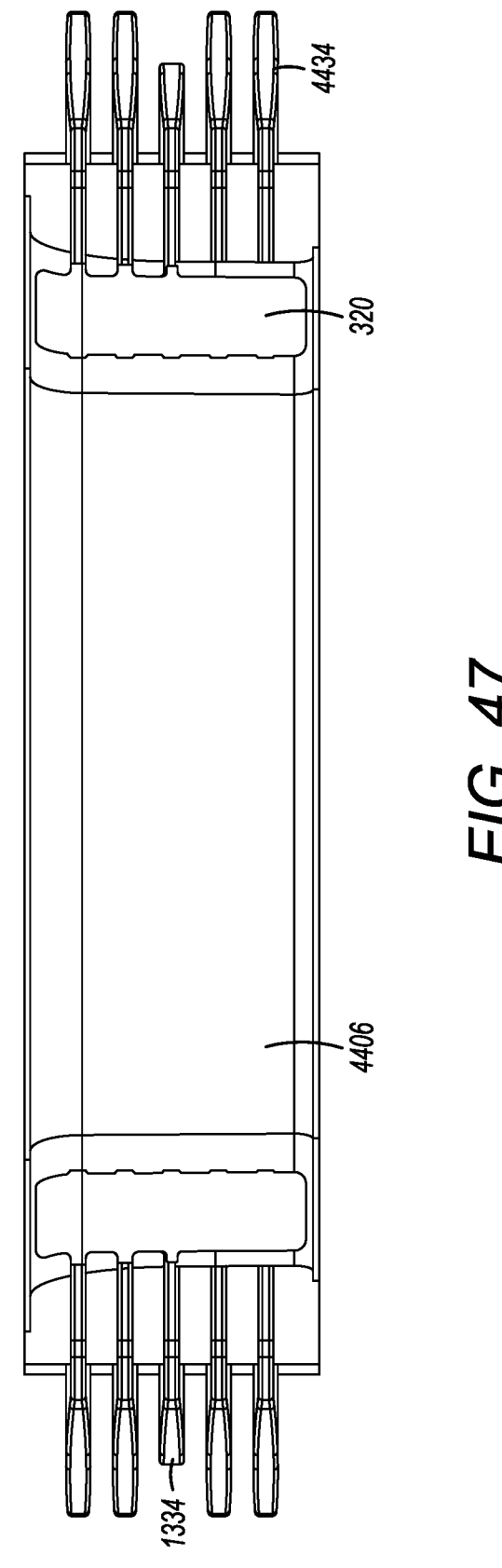
FIG. 47 illustrates a plan view of a bottom side of the brake system shown in FIG. 44.
Figure 48:
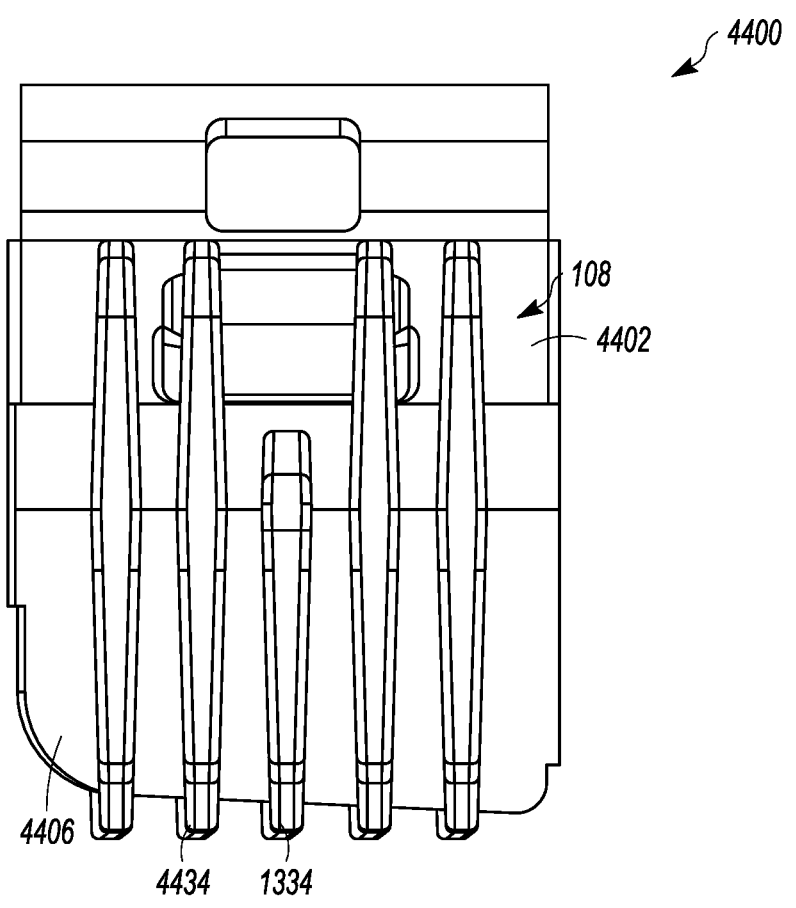
FIG. 48 illustrates an elevational view of an end of the brake system shown in FIG. 44.
Figure 49:
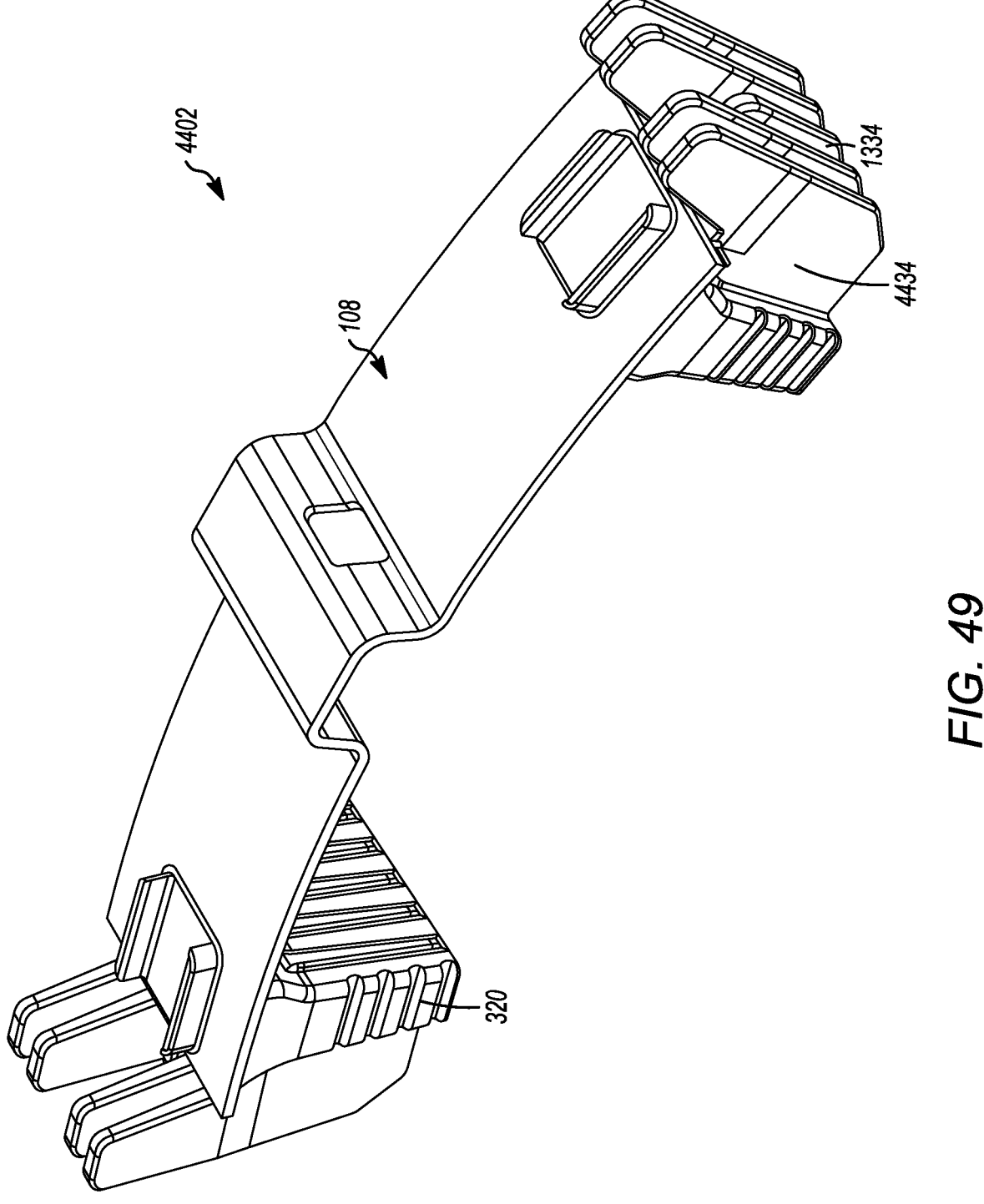
FIG. 49 illustrates a perspective view of a back plate of the brake system shown in FIGS. 44 through 48.
Figure 50:
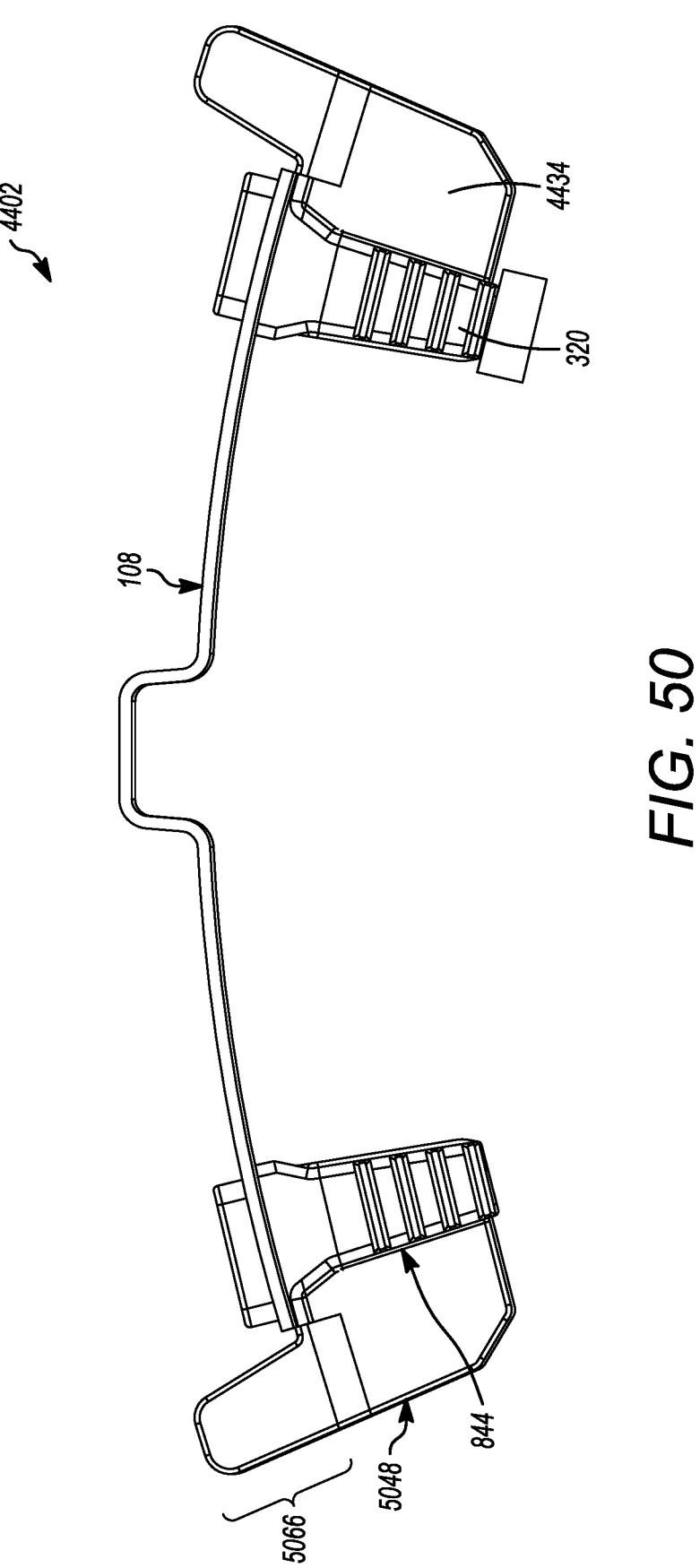
FIG. 50 illustrates an elevational view of an inner or outer side of the back plate shown in FIG. 49.
Figure 51:
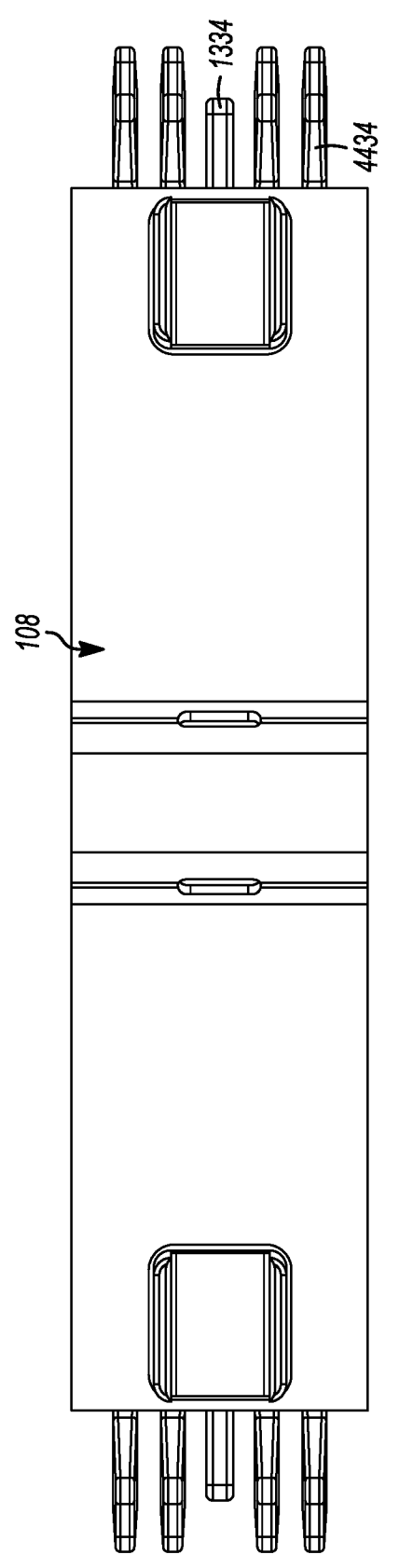
FIG. 51 illustrates a plan view of a top side of the back plate shown in FIG. 49.
Figure 52:
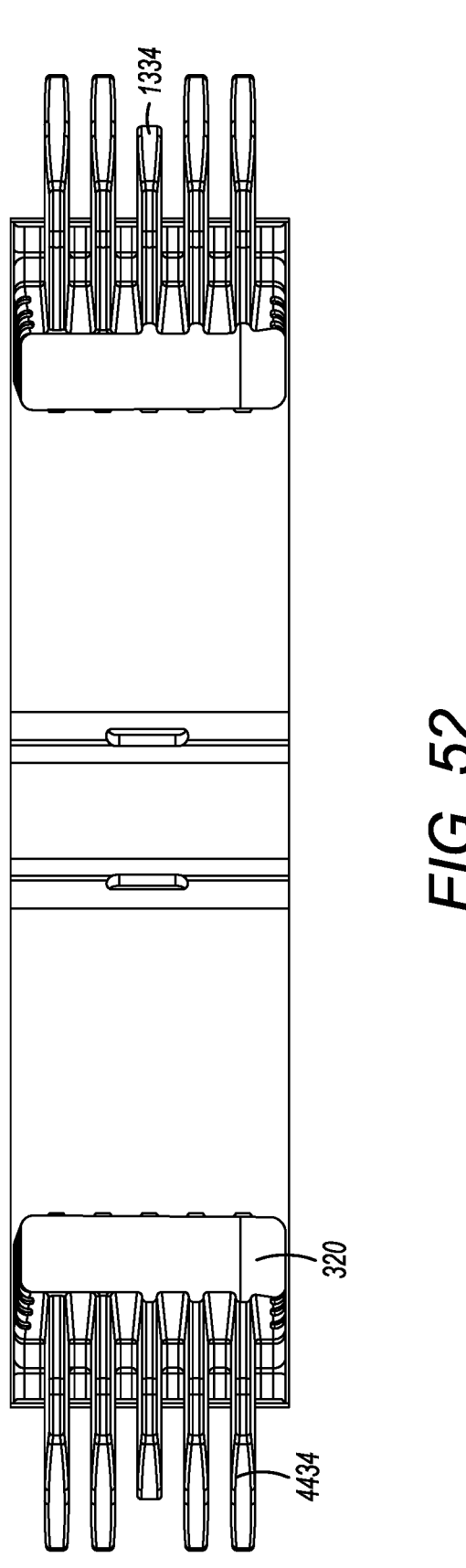
FIG. 52 illustrates a plan view of a bottom side of the back plate shown in FIG. 49.
Figure 53:
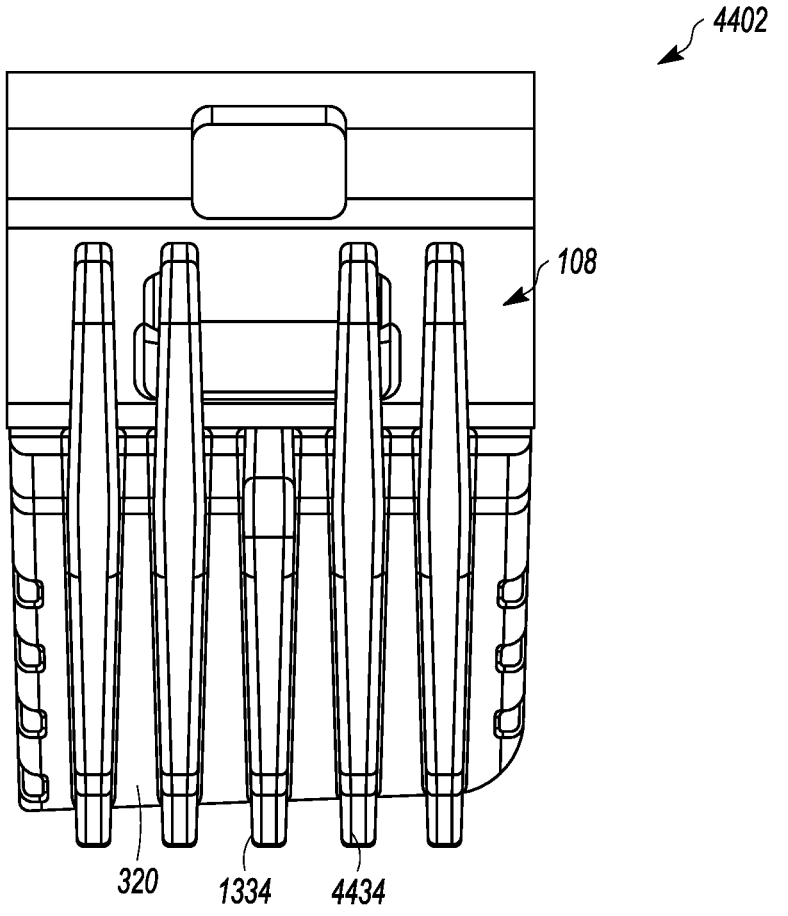
FIG. 53 illustrates an elevational view of an end of the back plate shown in FIG. 49.

FIGS. 44 through 48 illustrate another example of a brake system 4400 having a back plate 4402 with thermal management features 4404 and a composite brake pad 4406. FIGS. 49 through 53 illustrate an example of the back plate of the brake system shown in FIGS. 44 through 48. FIG. 44 illustrates a perspective view of the brake system, FIG. 45 illustrates an elevational view of an inner or outer side of the brake system, FIG. 46 illustrates a plan view of a top side of the brake system, FIG. 47 illustrates a plan view of a bottom side of the brake system, FIG. 48 illustrates an elevational view of an end of the brake system, FIG. 49 illustrates a perspective view of the back plate of the brake system shown in FIGS. 44 through 48, FIG. 50 illustrates an elevational view of an inner or outer side of the back plate, FIG. 51 illustrates a plan view of a top side of the back plate, FIG. 52 illustrates a plan view of a bottom side of the back plate, and FIG. 53 illustrates an elevational view of an end of the back plate.

The brake system 4400 includes the back plate 4402 that may support the composite brake pad 4406. A head surface of the back plate engages a brake head and an opposite pad surface of the back plate is coupled with the brake pad, similar to as described above in connection with the brake system 100 shown in FIGS. 1 through 6. The brake pad may be formed from a composite material or another material on the pad surface of the back plate, also as described above. The back plate also includes one or more of the conditioning inserts 320 described above. The back plate also has an arcuate shape with the centrally-located coupler and/or rejection lugs described above.

The thermal management features 4404 are formed from one or more thermally conductive materials, such as metal or a metal alloy (e.g., iron, an alloy containing iron, another metal, or another metal alloy). The thermal management features conduct the thermal energy in the conditioning inserts and/or in the brake pad to locations outside of the brake pad. For example, the thermal management features can conduct heat away from the conditioning inserts and out of the brake pads and dissipate the heat to the ambient environment outside of the brake system.

The thermal management features include heat fins 1334, 4434 (shown in FIG. 44) in the illustrated example. Each of the heat fins can be coupled with the conditioning inserts along the inner edge 844 (shown in FIG. 50). Each end of the back plate includes a single heat fin 1334, but alternatively can include more than a single heat fin 1334. The heat fins 4434 are different from the heat fins 1334 because the heat fins 4434 radially extend away from the working surface of the brake pad and/or the wheel above the head surface 108 of the back plate. As shown in FIG. 50, the heat fins include extension portions 5066 that extend above the back plate. These extension portions 5066 provide increases surface areas for the heat fins 4434 to dissipate heat relative to the heat fins 1334. In the illustrated example, there is a single smaller heat fin 1334 along a centerline of the back plate that extends from one end of the back plate to the opposite end of the back plate, with two larger heat fins 4434 on each side of each smaller heat fin 1334. Alternatively, there may be a different number and/or arrangement of the heat fins 1334 and/or 4434.

The heat fins may protrude or otherwise extend beyond the components in which heat is generated during braking to carry the heat away from those components and to dissipate the heat out of the components. In the illustrated example, the heat fins protrude beyond the opposite ends of the brake pad. The heat may extend far beyond the brake pad to help dissipate heat. For example, as shown in FIG. 45, the heat fins may extend beyond or outside of the brake pad by the extension length that is more than one third of the width of the back plate. Alternatively, the heat fins may extend beyond or outside of the brake pad by the extension length that is more than one half of the width of the back plate. Optionally, the extension length of the heat fins may be at least one twentieth, at least one fifteenth, at least one eleventh, at least one tenth, at least one eighth, or at least one quarter of the length of the back plate. With respect to the heat fins shown in this embodiment, the heat fins can vertically extend upward above the head surface 108 of the back plate by a height 4500. This height can be at least one quarter, at least one third, or at least one half of a height 4502 of the brake pad from the working surface 252 of the brake pad to the head surface of the back plate.

In operation, the working surface of the brake pad engages the outer circumference of a wheel surface during a braking event to slow or stop rotation of the wheel. The lower surfaces of the inserts also contact the wheel surface to condition the wheel surface. The rubbing contact between the working surface of the brake pad and the lower surfaces of the conditioning inserts generates heat. This heat is conducted through the inserts to exposed portions of the heat fins that are outside of the brake pad. The heat is then dissipated from surfaces of the heat fins outside of the brake pad. This can help cool or reduce the temperature rise of the brake pad and/or inserts, which can reduce wear and tear of the brake system.

Figure 54:
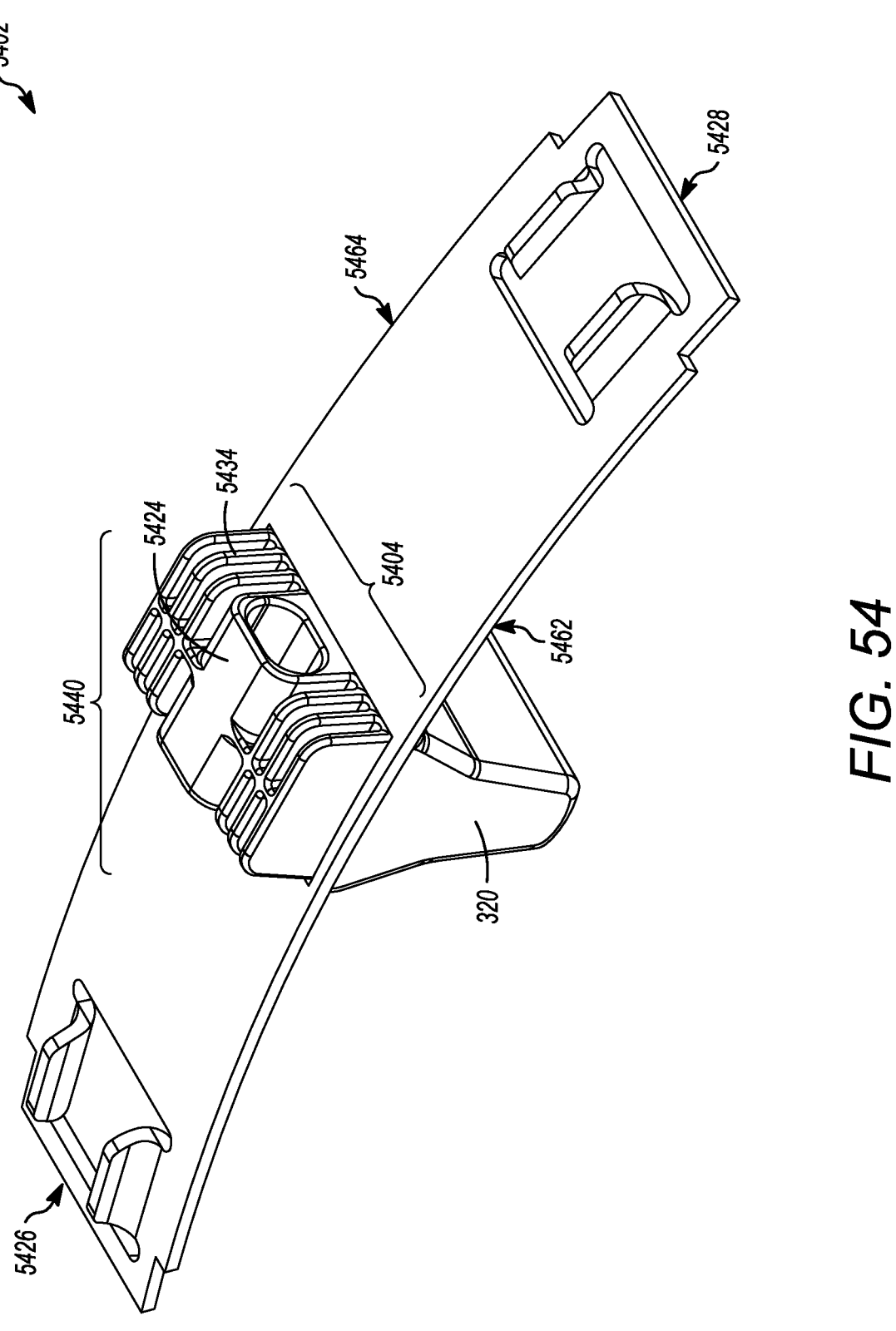
FIG. 54 illustrates a perspective view of another example of a back plate.

FIG. 54 illustrates a perspective view of another example of a back plate 5402 of a brake system. This back plate may be used in place of one or more of the other backplates described herein. The back plate is similar to the other back plates shown and/or described herein, except that the back plate includes a single conditioning insert 320. The conditioning insert is centrally located in that the insert is located midway between opposite ends 5426, 5428 of the back plate. Alternatively, the back plate may include more than one conditioning insert and/or the conditioning insert may not be centrally located on the back plate. The conditioning insert can extend through the back plate such that the conditioning insert is present on both sides (e.g., above and below) the back plate. For example, the back plate includes an opening or through hole 5404 located between the ends 5426, 5428 and opposite edges 5462, 5464 of the back plate (with each edge extending from one end to the other end and each end extending from one edge to the other edge). The conditioning insert may extend through this opening or through hole, as shown in FIG. 54.

The portion of the conditioning insert that extends above the back plate includes a thermal management feature 5440 formed as part of a keybridge or coupler 5424. In contrast to back plates that include the keybridge or coupler, the illustrated back plate does not include the keybridge or coupler but the conditioning insert includes the keybridge or coupler. The coupler is used to connect the back plate (by way of the conditioning insert) with the brake head. The thermal management feature of the conditioning insert includes several heat fins 5434 formed into the coupler. For example, these heat fins are planar bodies oriented parallel to each other and parallel to the opposite edges of the back plate. Each of these edges extends from one end of the back plate to the opposite end of the back plate. The heat fins are transversely oriented (e.g., perpendicular to) the opposite ends of the back plate.

In operation, the working surface of the brake pad engages the outer circumference of a wheel surface during a braking event to slow or stop rotation of the wheel. The lower surface of the insert also contacts the wheel surface to condition the wheel surface. The rubbing contact between the working surface of the brake pad and the lower surface of the conditioning insert generates heat. This heat is conducted through the insert to the heat fins and/or the keybridge or coupler. The increased surface area provided by the heat fins dissipates this heat out of the brake pad and brake system. Including the heat fins and the keybridge or coupler into the conditioning insert provides a continuous thermally conductive pathway to conduct heat out of the brake system. This single continuous thermally conductive pathway can conduct more heat and/or can conduct heat more rapidly from the insert to the ambient environment as the heat need not be conducted from the insert to the back plate, and then to the ambient environment. This can help cool or reduce the temperature rise of the brake pad and/or insert, which can reduce wear and tear of the brake system.

Figure 55:
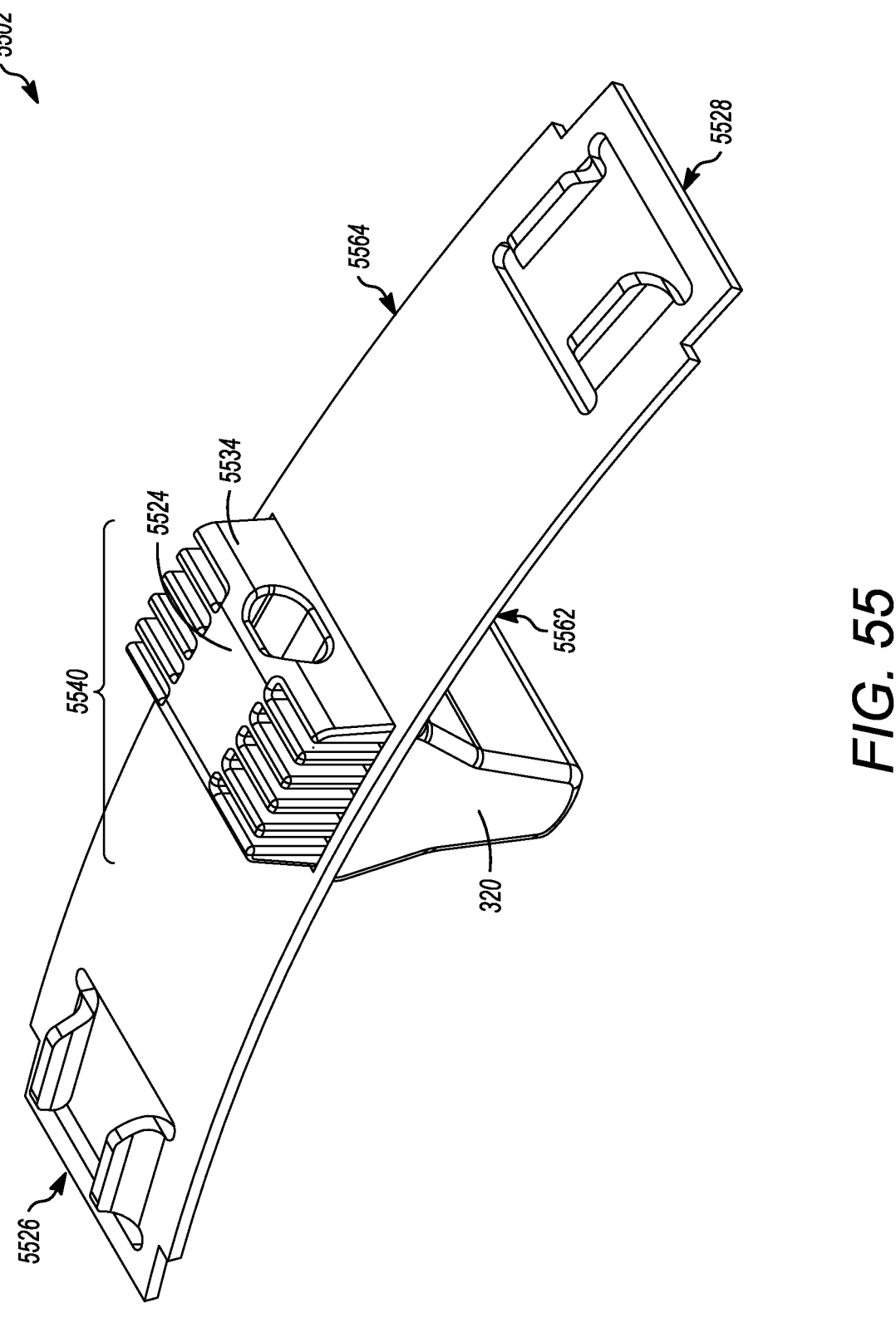
FIG. 55 illustrates a perspective view of another example of a back plate.

FIG. 55 illustrates a perspective view of another example of a back plate 5502 of a brake system. This back plate may be used in place of one or more of the other backplates described herein. The back plate is similar to one or more other back plates shown and/or described herein, except that the back plate includes a single conditioning insert 320. The conditioning insert is centrally located in that the insert is located midway between opposite ends 5526, 5528 of the back plate. Alternatively, the back plate may include more than one conditioning insert and/or the conditioning insert may not be centrally located on the back plate.

The conditioning insert includes a thermal management feature 5540 and a keybridge or coupler 5524 of the back plate. Similar to as described above in connection with FIG. 54, the conditioning insert may extend above and below the back plate, and extend through a opening or hole in the back plate. The portion of the conditioning insert that extends above the back plate can include the thermal management feature and/or keybridge or coupler. The coupler is used to connect the back plate (via the conditioning insert) with the brake head. The thermal management feature of the conditioning insert includes several heat fins 5534 formed into the conditioning insert. For example, these heat fins are planar bodies oriented parallel to each other and parallel to opposite ends 5526, 5528 of the back plate. Each of these ends extends from one edge 5562 of the back plate to an opposite edge 5564 of the back plate.

In operation, the working surface of the brake pad engages the outer circumference of a wheel surface during a braking event to slow or stop rotation of the wheel. The lower surface of the insert also contacts the wheel surface to condition the wheel surface. The rubbing contact between the working surface of the brake pad and the lower surface of the conditioning insert generates heat. This heat is conducted through the insert to the heat fins of the insert. The increased surface area provided by the heat fins and/or the continuous thermally conductive pathway to the heat fins dissipates this heat out of the brake pad and brake system. This can help cool or reduce the temperature rise of the brake pad and/or insert, which can reduce wear and tear of the brake system.

Figure 56:
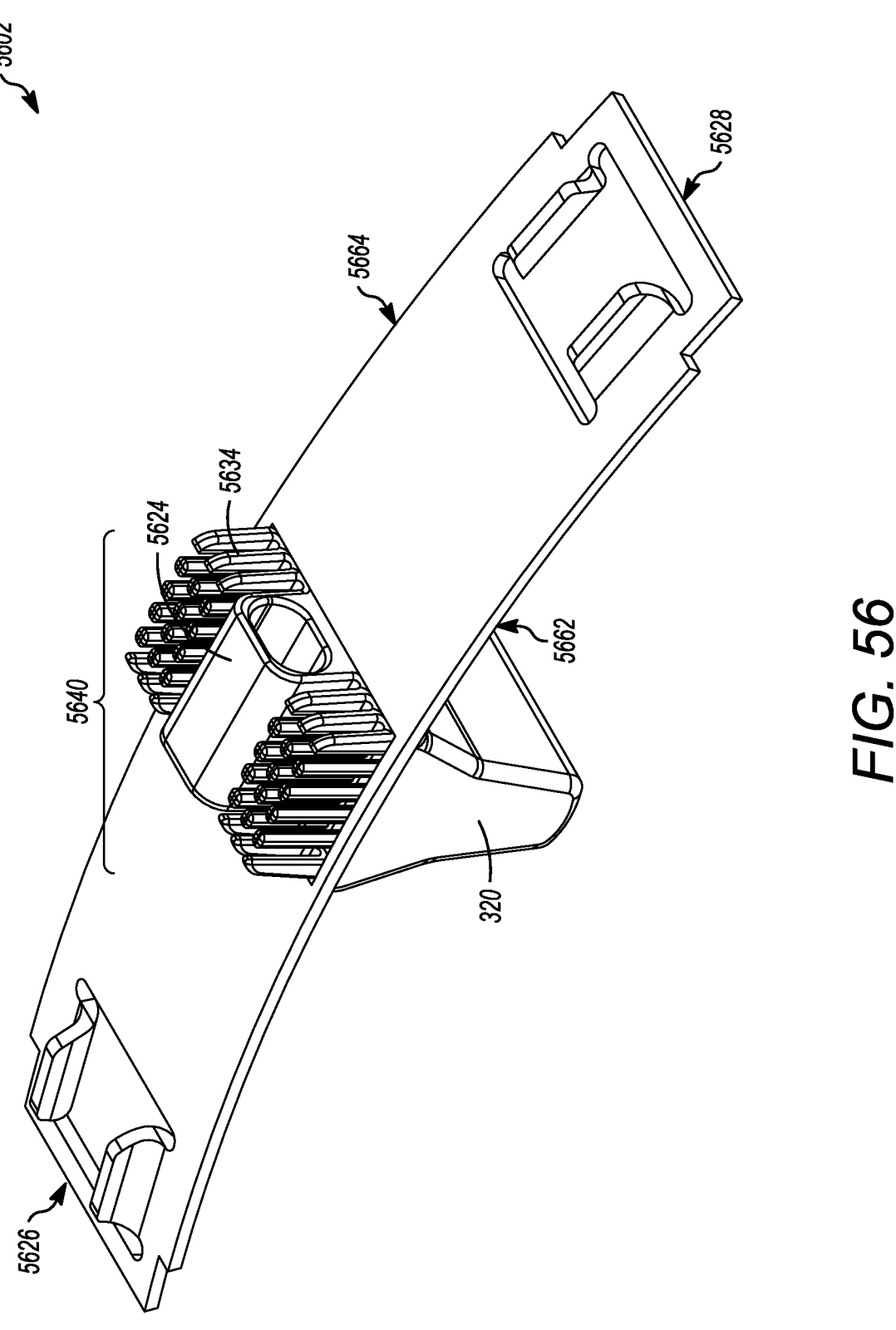
FIG. 56 illustrates a perspective view of another example of a back plate.

FIG. 56 illustrates a perspective view of another example of a back plate 5602 of a brake system. This back plate may be used in place of one or more of the other backplates described herein. The back plate includes a single conditioning insert 320. The conditioning insert is centrally located in that the insert is located midway between opposite ends 5626, 5628 of the back plate. Alternatively, the back plate may include more than one conditioning insert and/or the conditioning insert may not be centrally located on the back plate. As described above in connection with FIG. 54, the back plate includes an opening or through hole with the conditioning insert extending through the opening or hole. As shown, the conditioning insert extends above, through, and below the back plate.

The insert includes a thermal management feature 5640 and a keybridge or coupler 5624. The coupler is used to connect the back plate (via the insert) with the brake head. The thermal management feature of the insert includes several heat tines 5634 formed into the coupler. For example, these heat tines are elongated bodies oriented parallel to each other. The tines are oriented transversely (e.g., perpendicularly) to opposite ends 5626, 5628 of the back plate and to opposite edges 5662, 5564 of the back plate.

In operation, the working surface of the brake pad engages the outer circumference of a wheel surface during a braking event to slow or stop rotation of the wheel. The lower surface of the insert also contacts the wheel surface to condition the wheel surface. The rubbing contact between the working surface of the brake pad and the lower surface of the conditioning insert generates heat. This heat is conducted through the insert to the tines. The increased surface area provided by the tines dissipates this heat out of the brake pad and brake system. The continuous thermally conductive pathway to the tines provided by the insert also helps dissipate heat out of the brake pad and brake system. This can help cool or reduce the temperature rise of the brake pad and/or insert, which can reduce wear and tear of the brake system.

A method for forming one or more of the brake systems described herein can include, at a first step, forming a back plate that may support a composite brake pad. This back plate can be formed to include one or more of the conditioning inserts shown and/or described herein. The back plate can be formed by casting the shape of the back plate from iron or another metal, and then shaving or otherwise grinding off excess material from the casting. The method also can include, at a second step (which may be subsequent to the first step) forming the composite brake pad in contact with the back plate and at least partially around the composite insert(s). The brake pad can be formed by placing the back plate with conditioning insert(s) into a mold and pouring the material forming the brake pad in the mold. This material can flow around the conditioning inserts and cure (or otherwise solidify) to form bonds with the back plate and/or conditioning inserts. Portions of the brake pad can be ground away or otherwise removed to expose bottom surfaces of the inserts. The back plate can then be coupled with a brake head for use of the brake pad and conditioning insert(s) in braking and conditioning a surface of a wheel, as described herein.

In one embodiment, a vehicle brake system is provided that includes (or is formed from) a back plate that may support a composite pad, at least one conditioning insert coupled to the back plate and that may contact a surface of a wheel during a braking event and thereby to condition at least a portion of the surface of the wheel, and fins coupled with the at least one conditioning insert and that may conduct heat generated by contact of the at least one conditioning insert with the at least the portion of the surface of the wheel away from the at least one conditioning insert.

The back plate can be elongated along a length direction from a first end to a second end, and the fins are planar bodies oriented parallel to the length direction of the back plate. The brake system also may include the composite pad, and the fins can be partially, but not entirely, embedded within the composite pad. The at least one conditioning insert can include first and second conditioning inserts. A first set of the fins can extend from one side of the first conditioning insert toward the first end of the back plate and a second set of the fins can extend from one side of the second conditioning insert toward the second end of the back plate.

The fins can circumferentially and outwardly extend from the at least one conditioning insert to outer edges of the fins. The fins can radially extend toward the surface of the wheel from radially outward edges to radially inward edges. The fins can include respective notches at the radially outward edges. The back plate can be elongated along a length direction from a first end to a second end. The fins can be elongated tines outwardly extending from one or both of the first end or the second end of the back plate. The back plate can extend between opposite edges with each of the edges extending from the first end of the back plate to the second end of the back plate. At least one of the elongated tines can be disposed outward of one or both of the first edge or the second edge.

The brake system also can include the composite pad, and the elongated tines can be outside of the composite pad. A first set of the elongated tines can be oriented along the length direction of the back plate and a second set of the elongated tines can be oriented along an orthogonal direction to the length direction.

In one embodiment, a vehicle brake system is provided. The system can include a back plate that may support a composite pad, at least one conditioning insert coupled to the back plate and that may contact a surface of a wheel during a braking event and thereby to condition at least a portion of the surface of the wheel, and thermal transfer bodies coupled with the at least one conditioning insert and that may conduct heat generated by contact of the at least one conditioning insert with the at least the portion of the surface of the wheel away from the at least one conditioning insert.

The back plate can be elongated along a length direction from a first end to a second end. The thermal transfer bodies can be planar bodies oriented parallel to the length direction of the back plate. The back plate can be elongated along a length direction from a first end to a second end. The thermal transfer bodies can be elongated tines outwardly extending from one or both of the first end or the second end of the back plate. The back plate can extend between opposite edges with each of the edges extending from the first end of the back plate to the second end of the back plate. At least one of the elongated tines can be disposed outward of one or both of the first edge and/or the second edge.

A first set of the elongated tines can be oriented along the length direction of the back plate and a second set of the elongated tines can be oriented along an orthogonal direction to the length direction. The system also can include the composite pad, and the thermal transfer bodies can be partially but not entirely embedded within the composite pad. The system also can include the composite pad, and the thermal transfer bodies can be entirely outside of the composite pad.

In one embodiment, a method is provided that includes forming or obtaining a back plate that may support a composite pad, forming or obtaining at least one conditioning insert coupled to the back plate in a position to contact a surface of a wheel during a braking event and thereby to condition at least a portion of the surface of the wheel, and forming or obtaining thermal transfer bodies with the at least one conditioning insert in positions to conduct heat generated by contact of the at least one conditioning insert with the at least the portion of the surface of the wheel away from the at least one conditioning insert.

The back plate can be formed as elongated along a length direction from a first end to a second end, and the thermal transfer bodies can be formed as planar bodies oriented parallel to the length direction of the back plate. The back plate can be formed as elongated along a length direction from a first end to a second end, and the thermal transfer bodies can be formed as elongated tines outwardly extending from one or both of the first end or the second end of the back plate. The method also can include forming the composite pad such that the thermal transfer bodies are (a) partially but not entirely embedded within the composite pad or (b) entirely outside of the composite pad.

In one embodiment, a method of operating a vehicle includes (with a brake control system of the vehicle) actuating a braking device to cause a composite pad portion of the braking device to contact a wheel surface. The braking device includes a back plate, the composite pad portion attached to the back plate, at least one conditioning insert coupled to the back plate, and thermal transfer bodies coupled with the at least one conditioning insert. The method also includes (with the at least one conditioning insert and while the braking device is actuated) contacting the wheel surface to condition at least a portion of the wheel surface. The method also includes (with the thermal transfer bodies and while the braking device is actuated) conducting heat generated by contact of the at least one conditioning insert with the at least the portion of wheel surface away from the at least one conditioning insert.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
a back plate extending along opposite circumferential directions and configured to support a composite pad that moves radially with respect to a disc and contacts a circumferential surface of the disc to slow or stop rotation of the disc; and
elongated tines coupled with the back plate, including elongated tines disposed at a first circumferential end of the back plate and elongated tines disposed at a second circumferential end of the back plate,
wherein the elongated tines disposed at the first circumferential end and the elongated tines disposed at the second circumferential end:
extend away from each other and are elongated in the opposite circumferential directions, and
are configured to conduct heat generated by contact of the composite pad with the circumferential surface of the disc away from the composite pad.

2. The system of claim 1, wherein the back plate has a pad surface configured to face the disc and be coupled with the composite pad, the elongated tines coupled with the pad surface of the back plate.

3. The system of claim 1, further comprising at least one conditioning insert coupled to the back plate and configured to contact a surface of the disc during a braking event and condition at least a portion of the surface of the disc, the elongated tines connected with the at least one conditioning insert.

4. The system of claim 1, wherein the elongated tines have width dimensions and height dimensions that are closer to each other than length dimensions of the elongated tines.

5. The system of claim 1, wherein the elongated tines are cantilevered beams.

6. The system of claim 1, wherein the elongated tines include inner tines and outer tines disposed laterally outside of the inner tines.

7. The system of claim 6, wherein the outer tines are larger than the inner tines.

8. The system of claim 6, wherein the outer tines are coupled with opposite lateral edges of the back plate, and the inner tines are located between the opposite lateral edges of the back plate.

9. The system of claim 6, further comprising transverse tines extending along directions transverse to the circumferential directions along which the elongated tines extend, wherein the transverse tines are shorter than the elongated tines.

10. The system of claim 1, wherein the elongated tines are configured to be uniformly separated from the circumferential surface of the disc.

11. The system of claim 1, wherein:
the elongated tines disposed at the first circumferential end of the back plate protrude or extend circumferentially beyond the first circumferential end; and
the elongated tines disposed at the second circumferential end of the back plate protrude or extend circumferentially beyond the second circumferential end.

12. A system, comprising:
a back plate extending along opposite circumferential directions and configured to support a composite pad that moves radially with respect to a disc and contacts a circumferential surface of a the disc to slow or stop rotation of the disc; and
at least one conditioning insert coupled to the back plate and configured to contact a surface of the disc during the braking event and condition at least a portion of the surface of the disc; and
elongated tines coupled with one or more of the back plate or the at least one conditioning insert, including elongated tines disposed at a first circumferential end of the back plate and elongated tines disposed at a second circumferential end of the back plate,
wherein the elongated tines disposed at the first circumferential end and the elongated tines disposed at the second circumferential end:
extend away from each other in the opposite circumferential directions; and
are configured to conduct heat generated by contact of the composite pad with the circumferential surface of the disc away from the composite pad.

13. The system of claim 12, wherein the back plate has a pad surface configured to face the disc and be coupled with the composite pad, the elongated tines coupled with the pad surface of the back plate.

14. The system of claim 12, wherein the elongated tines have width dimensions and height dimensions that are closer to each other than length dimensions of the elongated tines.

15. The system of claim 12, wherein the elongated tines are cantilevered beams.

16. The system of claim 12, wherein the elongated tines include inner tines and outer tines disposed laterally outside of the inner tines.

17. The system of claim 16, wherein the outer tines are larger than the inner tines.

18. The system of claim 16, wherein the outer tines are coupled with opposite lateral edges of the back plate, and the inner tines are located between the opposite lateral edges of the back plate.

19. The system of claim 16, further comprising transverse tines extending along directions transverse to the circumferential directions along which the elongated tines extend, wherein the transverse tines are shorter than the elongated tines.

20. A system, comprising:
a back plate extending along opposite circumferential directions and configured to support a composite pad that moves radially with respect to a disc and contacts a circumferential surface of the disc to slow or stop rotation of the disc; and
elongated tines coupled with the back plate, including elongated tines disposed at a first circumferential end of the back plate and elongated tines disposed at a second circumferential end of the back plate,
wherein the elongated tines disposed at the first circumferential end and the elongated tines disposed at the second circumferential end:

extend away from each other and are formed as cantile-
vered beams that are elongated in the opposite circum-
ferential directions, and are configured to conduct heat generated by contact of the
composite pad with the circumferential surface of the
disc away from the composite pad.

21. The system of claim 20, wherein the back plate has a
pad surface configured to face the disc and be coupled with
the composite pad, the elongated tines coupled with the pad
surface of the back plate.

22. The system of claim 20, wherein the elongated tines
have width dimensions and height dimensions that are closer
to each other than length dimensions of the elongated tines.

\* \* \* \* \*